US012002448B2

(12) United States Patent
Kappus et al.

(10) Patent No.: US 12,002,448 B2
(45) Date of Patent: Jun. 4, 2024

(54) ACOUSTIC TRANSDUCER STRUCTURES

(71) Applicant: Ultraleap Limited, Bristol (GB)

(72) Inventors: Brian Kappus, Campbell, CA (US); Benjamin John Oliver Long, Bristol (GB)

(73) Assignee: ULTRALEAP LIMITED, Bristol (GB)

( * ) Notice: Subject to any disclaimer, the term of this patent is extended or adjusted under 35 U.S.C. 154(b) by 0 days.

(21) Appl. No.: 18/352,981

(22) Filed: Jul. 14, 2023

(65) Prior Publication Data

US 2023/0368771 A1 Nov. 16, 2023

Related U.S. Application Data

(63) Continuation of application No. 17/134,505, filed on Dec. 28, 2020, now Pat. No. 11,715,453.

(60) Provisional application No. 62/954,171, filed on Dec. 27, 2019, provisional application No. 62/953,577, filed on Dec. 25, 2019.

(51) Int. Cl.

*G10K 11/34* (2006.01)
*G10K 15/02* (2006.01)
*G10K 15/04* (2006.01)

(52) U.S. Cl.

CPC ............ *G10K 11/346* (2013.01); *G10K 15/02* (2013.01); *G10K 15/04* (2013.01)

(58) Field of Classification Search

CPC ...... G10K 11/346; G10K 15/02; G10K 15/04; G10K 11/025; G10K 11/22; H04R 2217/03

See application file for complete search history.

(56) References Cited

U.S. PATENT DOCUMENTS 4,218,921 A 8/1980 Berge
4,760,525 A 7/1988 Webb
(Continued)

FOREIGN PATENT DOCUMENTS

CA 2470115 A1 6/2003
CA 2909804 A1 11/2014
(Continued)

OTHER PUBLICATIONS

"Welcome to Project Soli" video, https://atap.google.com/#project-soli Accessed Nov. 30, 2018, 2 pages.
(Continued)

*Primary Examiner* — Daniel Pihulic
(74) *Attorney, Agent, or Firm* — Koffsky Schwalb LLC; Mark I. Koffsky

(57) ABSTRACT

Defining critical spacing is necessary for steering of parametric audio. Comparing steering measurements both with and without a waveguide leads to a conclusion that the diffuse phyllotactic grating lobe contributes audio and is to blame for poor steering. In addition, the waveguide needs to function with correct phase offsets to achieve the steering required for performance. Arranging tubes so that the array configuration changes from rectilinear to another distribution is useful when the waveguide is short of critical spacing or constrained for space. Array designs may also capitalize on rectilinear transducer design while having the benefits of a transducer tiling that has irrational spacing to promote the spread of grating lobe energy.

20 Claims, 42 Drawing Sheets

(56) References Cited

U.S. PATENT DOCUMENTS

| | | | |
|---|---|---|---|
| 4,771,205 | A | 9/1988 | Mequio |
| 4,881,212 | A | 11/1989 | Takeuchi |
| 5,226,000 | A | 7/1993 | Moses |
| 5,235,986 | A | 8/1993 | Maslak |
| 5,243,344 | A | 9/1993 | Koulopoulos |
| 5,329,682 | A | 7/1994 | Thurn |
| 5,371,834 | A | 12/1994 | Tawel |
| 5,422,431 | A | 6/1995 | Ichiki |
| 5,426,388 | A | 6/1995 | Flora |
| 5,477,736 | A | 12/1995 | Lorraine |
| 5,511,296 | A | 4/1996 | Dias |
| 5,729,694 | A | 3/1998 | Holzrichter |
| 5,859,915 | A | 1/1999 | Norris |
| 6,029,518 | A | 2/2000 | Oeftering |
| 6,193,936 | B1 | 2/2001 | Gardner |
| 6,216,538 | B1 | 4/2001 | Yasuda |
| 6,436,051 | B1 | 8/2002 | Morris |
| 6,503,204 | B1 | 1/2003 | Sumanaweera |
| 6,647,359 | B1 | 11/2003 | Verplank |
| 6,771,294 | B1 | 8/2004 | Pulli |
| 6,772,490 | B2 | 8/2004 | Toda |
| 6,800,987 | B2 | 10/2004 | Toda |
| 7,107,159 | B2 | 9/2006 | German |
| 7,109,789 | B2 | 9/2006 | Spencer |
| 7,182,726 | B2 | 2/2007 | Williams |
| 7,225,404 | B1 | 5/2007 | Zilles |
| 7,284,027 | B2 | 10/2007 | Jennings, III |
| 7,345,600 | B1 | 3/2008 | Fedigan |
| 7,487,662 | B2 | 2/2009 | Schabron |
| 7,497,662 | B2 | 3/2009 | Mollmann |
| 7,577,260 | B1 | 8/2009 | Hooley |
| 7,692,661 | B2 | 4/2010 | Cook |
| RE42,192 | E | 3/2011 | Schabron |
| 7,966,134 | B2 | 6/2011 | German |
| 8,000,481 | B2 | 8/2011 | Nishikawa |
| 8,123,502 | B2 | 2/2012 | Blakey |
| 8,269,168 | B1 | 9/2012 | Axelrod |
| 8,279,193 | B1 | 10/2012 | Birnbaum |
| 8,351,646 | B2 | 1/2013 | Fujimura |
| 8,369,973 | B2 | 2/2013 | Risbo |
| 8,594,350 | B2 | 11/2013 | Hooley |
| 8,607,922 | B1 | 12/2013 | Werner |
| 8,782,109 | B2 | 7/2014 | Tsutsui |
| 8,823,674 | B2 | 9/2014 | Birnbaum |
| 8,833,510 | B2 | 9/2014 | Koh |
| 8,884,927 | B1 | 11/2014 | Cheatham, III |
| 9,208,664 | B1 | 12/2015 | Peters |
| 9,267,735 | B2 | 2/2016 | Funayama |
| 9,421,291 | B2 | 8/2016 | Robert |
| 9,612,658 | B2 | 4/2017 | Subramanian |
| 9,662,680 | B2 | 5/2017 | Yamamoto |
| 9,667,173 | B1 | 5/2017 | Kappus |
| 9,816,757 | B1 | 11/2017 | Zielinski |
| 9,841,819 | B2 | 12/2017 | Carter |
| 9,863,699 | B2 | 1/2018 | Corbin, III |
| 9,898,089 | B2 | 2/2018 | Subramanian |
| 9,945,818 | B2 | 4/2018 | Ganti |
| 9,958,943 | B2 | 5/2018 | Long |
| 9,977,120 | B2 | 5/2018 | Carter |
| 10,101,811 | B2 | 10/2018 | Carter |
| 10,101,814 | B2 | 10/2018 | Carter |
| 10,133,353 | B2 | 11/2018 | Eid |
| 10,140,776 | B2 | 11/2018 | Schwarz |
| 10,146,353 | B1 | 12/2018 | Smith |
| 10,168,782 | B1 | 1/2019 | Tchon |
| 10,268,275 | B2 | 4/2019 | Carter |
| 10,281,567 | B2 | 5/2019 | Carter |
| 10,318,008 | B2 | 6/2019 | Sinha |
| 10,444,842 | B2 | 10/2019 | Long |
| 10,469,973 | B2 | 11/2019 | Hayashi |
| 10,496,175 | B2 | 12/2019 | Long |
| 10,497,358 | B2 | 12/2019 | Tester |
| 10,510,357 | B2 | 12/2019 | Kovesi |
| 10,520,252 | B2 | 12/2019 | Momen |
| 10,523,159 | B2 | 12/2019 | Megretski |
| 10,531,212 | B2 | 1/2020 | Long |
| 10,535,174 | B1 | 1/2020 | Rigiroli |
| 10,569,300 | B2 | 2/2020 | Hoshi |
| 10,593,101 | B1 | 3/2020 | Han |
| 10,657,704 | B1 | 5/2020 | Han |
| 10,685,538 | B2 | 6/2020 | Carter |
| 10,755,538 | B2 | 8/2020 | Carter |
| 10,818,162 | B2 | 10/2020 | Carter |
| 10,911,861 | B2 | 2/2021 | Buckland |
| 10,915,177 | B2 | 2/2021 | Carter |
| 10,921,890 | B2 | 2/2021 | Subramanian |
| 10,930,123 | B2 | 2/2021 | Carter |
| 10,943,578 | B2 | 3/2021 | Long |
| 11,048,329 | B1 | 6/2021 | Lee |
| 11,098,951 | B2 | 8/2021 | Kappus |
| 11,113,860 | B2 | 9/2021 | Rigiroli |
| 11,169,610 | B2 | 11/2021 | Sarafianou |
| 11,189,140 | B2 | 11/2021 | Long |
| 11,204,644 | B2 | 12/2021 | Long |
| 11,276,281 | B2 | 3/2022 | Carter |
| 11,531,395 | B2 | 12/2022 | Kappus |
| 11,543,507 | B2 | 1/2023 | Carter |
| 11,550,395 | B2 | 1/2023 | Beattie |
| 11,550,432 | B2 | 1/2023 | Carter |
| 11,553,295 | B2 | 1/2023 | Kappus |
| 11,715,453 | B2 * | 8/2023 | Kappus .................. G10K 15/02 367/138 |
| 2001/0007591 | A1 | 7/2001 | Pompei |
| 2001/0033124 | A1 | 10/2001 | Norris |
| 2002/0149570 | A1 | 10/2002 | Knowles |
| 2003/0024317 | A1 | 2/2003 | Miller |
| 2003/0144032 | A1 | 7/2003 | Brunner |
| 2003/0182647 | A1 | 9/2003 | Radeskog |
| 2004/0005715 | A1 | 1/2004 | Schabron |
| 2004/0014434 | A1 | 1/2004 | Haardt |
| 2004/0052387 | A1 | 3/2004 | Norris |
| 2004/0091119 | A1 | 5/2004 | Duraiswami |
| 2004/0210158 | A1 | 10/2004 | Organ |
| 2004/0226378 | A1 | 11/2004 | Oda |
| 2004/0264707 | A1 | 12/2004 | Yang |
| 2005/0052714 | A1 | 3/2005 | Klug |
| 2005/0056851 | A1 | 3/2005 | Althaus |
| 2005/0212760 | A1 | 9/2005 | Marvit |
| 2005/0226437 | A1 | 10/2005 | Pellegrini |
| 2005/0267695 | A1 | 12/2005 | German |
| 2005/0273483 | A1 | 12/2005 | Dent |
| 2006/0085049 | A1 | 4/2006 | Cory |
| 2006/0090955 | A1 | 5/2006 | Cardas |
| 2006/0091301 | A1 | 5/2006 | Trisnadi |
| 2006/0164428 | A1 | 7/2006 | Cook |
| 2007/0036492 | A1 | 2/2007 | Lee |
| 2007/0094317 | A1 | 4/2007 | Wang |
| 2007/0177681 | A1 | 8/2007 | Choi |
| 2007/0214462 | A1 | 9/2007 | Boillot |
| 2007/0236450 | A1 | 10/2007 | Colgate |
| 2007/0263741 | A1 | 11/2007 | Erving |
| 2008/0012647 | A1 | 1/2008 | Risbo |
| 2008/0027686 | A1 | 1/2008 | Mollmann |
| 2008/0084789 | A1 | 4/2008 | Altman |
| 2008/0130906 | A1 | 6/2008 | Goldstein |
| 2008/0152191 | A1 | 6/2008 | Fujimura |
| 2008/0226088 | A1 | 9/2008 | Aarts |
| 2008/0273723 | A1 | 11/2008 | Hartung |
| 2008/0300055 | A1 | 12/2008 | Lutnick |
| 2009/0093724 | A1 | 4/2009 | Pernot |
| 2009/0116660 | A1 | 5/2009 | Croft, III |
| 2009/0232684 | A1 | 9/2009 | Hirata |
| 2009/0251421 | A1 | 10/2009 | Bloebaum |
| 2009/0319065 | A1 | 12/2009 | Risbo |
| 2010/0013613 | A1 | 1/2010 | Weston |
| 2010/0016727 | A1 | 1/2010 | Rosenberg |
| 2010/0030076 | A1 | 2/2010 | Vortman |
| 2010/0044120 | A1 | 2/2010 | Richter |
| 2010/0066512 | A1 | 3/2010 | Rank |
| 2010/0085168 | A1 | 4/2010 | Kyung |
| 2010/0103246 | A1 | 4/2010 | Schwerdtner |
| 2010/0109481 | A1 | 5/2010 | Buccafusca |
| 2010/0199232 | A1 | 8/2010 | Mistry |
| 2010/0231508 | A1 | 9/2010 | Cruz-Hernandez |

(56) References Cited

U.S. PATENT DOCUMENTS

2010/0262008 A1 10/2010 Roundhill
2010/0302015 A1 12/2010 Kipman
2010/0321216 A1 12/2010 Jonsson
2011/0006888 A1 1/2011 Bae
2011/0010958 A1 1/2011 Clark
2011/0051554 A1 3/2011 Varray
2011/0066032 A1 3/2011 Vitek
2011/0199342 A1 8/2011 Vartanian
2011/0310028 A1 12/2011 Camp, Jr.
2012/0057733 A1 3/2012 Morii
2012/0063628 A1 3/2012 Rizzello
2012/0066280 A1 3/2012 Tsutsui
2012/0223880 A1 9/2012 Birnbaum
2012/0229400 A1 9/2012 Birnbaum
2012/0229401 A1 9/2012 Birnbaum
2012/0236689 A1 9/2012 Brown
2012/0243374 A1 9/2012 Dahl
2012/0249409 A1 10/2012 Toney
2012/0249474 A1 10/2012 Pratt
2012/0299853 A1 11/2012 Dagar
2012/0307649 A1 12/2012 Park
2012/0315605 A1 12/2012 Cho
2013/0035582 A1 2/2013 Radulescu
2013/0079621 A1 3/2013 Shoham
2013/0094678 A1 4/2013 Scholte
2013/0100008 A1 4/2013 Marti
2013/0101141 A1* 4/2013 McElveen .............. H04S 3/002
381/123
2013/0173658 A1 7/2013 Adelman
2013/0331705 A1 12/2013 Fraser
2014/0027201 A1 1/2014 Islam
2014/0104274 A1 4/2014 Hilliges
2014/0139071 A1 5/2014 Yamamoto
2014/0168091 A1 6/2014 Jones
2014/0201666 A1 7/2014 Bedikian
2014/0204002 A1 7/2014 Bennet
2014/0265572 A1 9/2014 Siedenburg
2014/0267065 A1 9/2014 Levesque
2014/0269207 A1 9/2014 Baym
2014/0269208 A1 9/2014 Baym
2014/0269214 A1 9/2014 Baym
2014/0270305 A1 9/2014 Baym
2014/0320436 A1 10/2014 Modarres
2014/0361988 A1 12/2014 Katz
2014/0369514 A1 12/2014 Baym
2015/0002477 A1 1/2015 Cheatham, III
2015/0005039 A1 1/2015 Liu
2015/0006645 A1 1/2015 Oh
2015/0007025 A1 1/2015 Sassi
2015/0013023 A1 1/2015 Wang
2015/0019299 A1 1/2015 Harvey
2015/0022466 A1 1/2015 Levesque
2015/0029155 A1 1/2015 Lee
2015/0066445 A1 3/2015 Lin
2015/0070147 A1 3/2015 Cruz-Hernandez
2015/0070245 A1 3/2015 Han
2015/0078136 A1 3/2015 Sun
2015/0081110 A1 3/2015 Houston
2015/0084929 A1 3/2015 Lee
2015/0110310 A1 4/2015 Minnaar
2015/0130323 A1 5/2015 Harris
2015/0168205 A1 6/2015 Lee
2015/0192995 A1 7/2015 Subramanian
2015/0220199 A1 8/2015 Wang
2015/0226537 A1 8/2015 Schorre
2015/0226831 A1 8/2015 Nakamura
2015/0241393 A1 8/2015 Ganti
2015/0248787 A1 9/2015 Abovitz
2015/0258431 A1 9/2015 Stafford
2015/0277610 A1 10/2015 Kim
2015/0293592 A1 10/2015 Cheong
2015/0304789 A1 10/2015 Babayoff
2015/0323667 A1 11/2015 Przybyla
2015/0331576 A1 11/2015 Piya
2015/0332075 A1 11/2015 Burch
2016/0019762 A1 1/2016 Levesque
2016/0019879 A1 1/2016 Daley
2016/0026253 A1 1/2016 Bradski
2016/0044417 A1 2/2016 Clemen, Jr.
2016/0124080 A1 5/2016 Carter
2016/0138986 A1 5/2016 Carlin
2016/0175701 A1 6/2016 Froy
2016/0175709 A1 6/2016 Idris
2016/0189702 A1 6/2016 Blanc
2016/0242724 A1 8/2016 Lavallee
2016/0246374 A1 8/2016 Carter
2016/0249150 A1 8/2016 Carter
2016/0291716 A1 10/2016 Boser
2016/0306423 A1 10/2016 Uttermann
2016/0320843 A1 11/2016 Long
2016/0339132 A1 11/2016 Cosman
2016/0374562 A1 12/2016 Vertikov
2017/0002839 A1 1/2017 Bukland
2017/0004819 A1 1/2017 Ochiai
2017/0018171 A1* 1/2017 Carter ..................... G06F 3/016
2017/0024921 A1 1/2017 Beeler
2017/0052148 A1 2/2017 Estevez
2017/0123487 A1 5/2017 Hazra
2017/0123499 A1 5/2017 Eid
2017/0140552 A1 5/2017 Woo
2017/0144190 A1 5/2017 Hoshi
2017/0153707 A1 6/2017 Subramanian
2017/0168586 A1 6/2017 Sinha
2017/0181725 A1 6/2017 Han
2017/0193768 A1 7/2017 Long
2017/0193823 A1 7/2017 Jiang
2017/0211022 A1 7/2017 Reinke
2017/0236506 A1 8/2017 Przybyla
2017/0270356 A1 9/2017 Sills
2017/0279951 A1 9/2017 Hwang
2017/0336860 A1 11/2017 Smoot
2017/0366908 A1 12/2017 Long
2018/0035891 A1 2/2018 Van Soest
2018/0039333 A1 2/2018 Carter
2018/0047259 A1 2/2018 Carter
2018/0074580 A1 3/2018 Hardee
2018/0081439 A1 3/2018 Daniels
2018/0101234 A1 4/2018 Carter
2018/0139557 A1 5/2018 Ochiai
2018/0146306 A1 5/2018 Benattar
2018/0151035 A1 5/2018 Maalouf
2018/0166063 A1 6/2018 Long
2018/0181203 A1 6/2018 Subramanian
2018/0182372 A1 6/2018 Tester
2018/0190007 A1 7/2018 Panteleev
2018/0246576 A1 8/2018 Long
2018/0253627 A1 9/2018 Baradel
2018/0267156 A1 9/2018 Carter
2018/0304310 A1 10/2018 Long
2018/0309515 A1 10/2018 Murakowski
2018/0310111 A1 10/2018 Kappus
2018/0350339 A1 12/2018 Macours
2018/0361174 A1 12/2018 Radulescu
2019/0038496 A1 2/2019 Levesque
2019/0091565 A1 3/2019 Nelson
2019/0163275 A1 5/2019 Iodice
2019/0175077 A1 6/2019 Zhang
2019/0187244 A1 6/2019 Riccardi
2019/0196578 A1 6/2019 Iodice
2019/0196591 A1 6/2019 Long
2019/0197840 A1 6/2019 Kappus
2019/0197841 A1 6/2019 Carter
2019/0197842 A1 6/2019 Long
2019/0204925 A1 7/2019 Long
2019/0206202 A1 7/2019 Carter
2019/0235628 A1 8/2019 Lacroix
2019/0257932 A1 8/2019 Carter
2019/0310710 A1 10/2019 Deeley
2019/0342654 A1 11/2019 Buckland
2020/0042091 A1 2/2020 Long
2020/0080776 A1 3/2020 Kappus
2020/0082804 A1 3/2020 Kappus
2020/0103974 A1 4/2020 Carter
2020/0117229 A1 4/2020 Long

(56) References Cited

U.S. PATENT DOCUMENTS

| | | | | |
|---|---|---|---|---|
| 2020/0193269 | A1 | 6/2020 | Park | |
| 2020/0218354 | A1 | 7/2020 | Beattie | |
| 2020/0257371 | A1 | 8/2020 | Sung | |
| 2020/0294299 | A1 | 9/2020 | Rigiroli | |
| 2020/0302760 | A1 | 9/2020 | Carter | |
| 2020/0320347 | A1 | 10/2020 | Nikolenko | |
| 2020/0327418 | A1 | 10/2020 | Lyons | |
| 2020/0380832 | A1 | 12/2020 | Carter | |
| 2021/0037332 | A1 | 2/2021 | Kappus | |
| 2021/0043070 | A1 | 2/2021 | Carter | |
| 2021/0109712 | A1 | 4/2021 | Long | |
| 2021/0111731 | A1 | 4/2021 | Long | |
| 2021/0112353 | A1 | 4/2021 | Kappus | |
| 2021/0141458 | A1 | 5/2021 | Sarafianou | |
| 2021/0165491 | A1 | 6/2021 | Sun | |
| 2021/0170447 | A1 | 6/2021 | Buckland | |
| 2021/0183215 | A1 | 6/2021 | Carter | |
| 2021/0201884 | A1* | 7/2021 | Kappus | G10K 11/22 |
| 2021/0225355 | A1 | 7/2021 | Long | |
| 2021/0303072 | A1 | 9/2021 | Carter | |
| 2021/0303758 | A1 | 9/2021 | Long | |
| 2021/0334706 | A1 | 10/2021 | Yamaguchi | |
| 2021/0381765 | A1 | 12/2021 | Kappus | |
| 2021/0397261 | A1 | 12/2021 | Kappus | |
| 2022/0035479 | A1 | 2/2022 | Lasater | |
| 2022/0083142 | A1 | 3/2022 | Brown | |
| 2022/0095068 | A1 | 3/2022 | Kappus | |
| 2022/0113806 | A1 | 4/2022 | Long | |
| 2022/0155949 | A1 | 5/2022 | Ring | |
| 2022/0198892 | A1 | 6/2022 | Carter | |
| 2022/0236806 | A1 | 7/2022 | Carter | |
| 2022/0252550 | A1 | 8/2022 | Catsis | |
| 2022/0300028 | A1 | 9/2022 | Long | |
| 2022/0300070 | A1 | 9/2022 | Iodice | |
| 2022/0329250 | A1 | 10/2022 | Long | |
| 2022/0393095 | A1 | 12/2022 | Chilles | |
| 2023/0036123 | A1 | 2/2023 | Long | |
| 2023/0075917 | A1 | 3/2023 | Pittera | |
| 2023/0117919 | A1 | 4/2023 | Iodice | |
| 2023/0124704 | A1 | 4/2023 | Buckland | |
| 2023/0168228 | A1 | 6/2023 | Kappus | |
| 2023/0215248 | A1 | 7/2023 | Lowther | |
| 2023/0368771 | A1* | 11/2023 | Kappus | G10K 15/04 |

FOREIGN PATENT DOCUMENTS

| | | | | |
|---|---|---|---|---|
| CN | 101986787 | | 3/2011 | |
| CN | 102459900 | | 5/2012 | |
| CN | 102591512 | | 7/2012 | |
| CN | 103797379 | | 5/2014 | |
| CN | 103984414 | A | 8/2014 | |
| CN | 107340871 | A | 11/2017 | |
| CN | 107407969 | A | 11/2017 | |
| CN | 107534810 | A | 1/2018 | |
| EP | 0057594 | A2 | 8/1982 | |
| EP | 309003 | | 3/1989 | |
| EP | 0696670 | A1 | 2/1996 | |
| EP | 1875081 | A1 | 1/2008 | |
| EP | 1911530 | | 4/2008 | |
| EP | 2271129 | A1 | 1/2011 | |
| EP | 1461598 | B1 | 4/2014 | |
| EP | 3207817 | A1 | 8/2017 | |
| EP | 3216231 | B1 | 8/2019 | |
| EP | 3916525 | | 12/2021 | |
| GB | 2464117 | | 4/2010 | |
| GB | 2513884 | A | 11/2014 | |
| GB | 2530036 | | 3/2016 | |
| JP | 2008074075 | | 4/2008 | |
| JP | 2010109579 | | 5/2010 | |
| JP | 2011172074 | | 9/2011 | |
| JP | 2012048378 | A | 3/2012 | |
| JP | 5477736 | B2 | 4/2014 | |
| JP | 2015035657 | A | 2/2015 | |
| JP | 2016035646 | | 3/2016 | |
| JP | 2017168086 | | 9/2017 | |
| JP | 6239796 | | 11/2017 | |
| KR | 20120065779 | | 6/2012 | |
| KR | 20130055972 | | 5/2013 | |
| KR | 1020130055972 | | 5/2013 | |
| KR | 20160008280 | | 1/2016 | |
| KR | 20200082449 | A | 7/2020 | |
| WO | 9118486 | | 11/1991 | |
| WO | 9639754 | | 12/1996 | |
| WO | 03050511 | A | 6/2003 | |
| WO | 2005017965 | | 2/2005 | |
| WO | 2007144801 | A2 | 12/2007 | |
| WO | 2009071746 | A1 | 6/2009 | |
| WO | 2009112866 | | 9/2009 | |
| WO | 2010003836 | | 1/2010 | |
| WO | 2010139916 | | 12/2010 | |
| WO | 2011132012 | A1 | 10/2011 | |
| WO | 2012023864 | | 2/2012 | |
| WO | 2012104648 | A1 | 8/2012 | |
| WO | 2013179179 | | 12/2013 | |
| WO | 2014181084 | A1 | 11/2014 | |
| WO | 2015006467 | | 1/2015 | |
| WO | 2015039622 | | 3/2015 | |
| WO | 2015127335 | | 8/2015 | |
| WO | 2015194510 | | 12/2015 | |
| WO | 2016007920 | | 1/2016 | |
| WO | 2016073936 | | 5/2016 | |
| WO | 2016095033 | A1 | 6/2016 | |
| WO | 2016099279 | | 6/2016 | |
| WO | 2016132141 | | 8/2016 | |
| WO | 2016132144 | | 8/2016 | |
| WO | 2016137675 | | 9/2016 | |
| WO | 2016162058 | | 10/2016 | |
| WO | 2017172006 | | 10/2017 | |
| WO | 2018109466 | A1 | 6/2018 | |
| WO | WO-2018168562 | A1 * | 9/2018 | A61B 8/13 |
| WO | 2020049321 | A2 | 3/2020 | |
| WO | 2021130505 | A1 | 7/2021 | |
| WO | WO-2021130505 | A1 * | 7/2021 | G10K 11/025 |
| WO | 2021260373 | A1 | 12/2021 | |

OTHER PUBLICATIONS

A. B. Vallbo, Receptive field characteristics of tactile units with myelinated afferents in hairy skin of human subjects, Journal of Physiology (1995), 483.3, pp. 783-795.

A. Sand, Head-Mounted Display with Mid-Air Tactile Feedback, Proceedings of the 21st ACM Symposium on Virtual Reality Software and Technology, Nov. 13-15, 2015 (8 pages).

Aksel Sveier et al.,Pose Estimation with Dual Quaternions and Iterative Closest Point, 2018 Annual American Control Conference (ACC) (8 pages).

Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).

Alexander, J. et al. (2011), Adding Haptic Feedback to Mobile TV (6 pages).

Almusawi et al., "A new artificial neural network approach in solving inverse kinematics of robotic arm (denso vp6242)." Computational intelligence and neuroscience 2016 (2016). (Year: 2016).

Amanda Zimmerman, The gentle touch receptors of mammalian skin, Science, Nov. 21, 2014, vol. 346 Issue 6212, p. 950.

Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].

Aoki et al., Sound location of stero reproduction with parametric loudspeakers, Applied Acoustics 73 (2012) 1289-1295 (7 pages).

Ashish Shrivastava et al., Learning from Simulated and Unsupervised Images through Adversarial Training, Jul. 19, 2017, pp. 1-16.

Azad et al., Deep domain adaptation under deep label scarcity. arXiv preprint arXiv:1809.08097 (2018) (Year: 2018).

(56) References Cited

OTHER PUBLICATIONS

Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al., "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (dated Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
DeSilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report dated Sep. 22, 2021, 15 pages.
EPO Communication for Application 18 811 906.9 (dated Nov. 29, 2021) (15 pages).
EPO Examination Report 17 748 4656.4 (dated Jan. 12, 2021) (16 pages).
EPO Examination Search Report 17 702 910.5 (dated Jun. 23, 2021) 10 pages.
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (dated 2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.

(56) References Cited

OTHER PUBLICATIONS

Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOctober 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=GB (Accessed May 29, 2022).
Hua J, Qin H., Haptics-based dynamic implicit solid modeling, IEEE Trans Vis Comput Graph. Sep.-Oct. 2004;10 (5):574-86.
Hyunjae Gil, Whiskers: Exploring the Use of Ultrasonic Haptic Cues on the Face, CHI 2018, Apr. 21-26, 2018, Montréal, QC, Canada.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, dated Apr. 11, 2019, 14 pages.
International Search Report and Written Opinion for Application No. PCT/GB2018/053739, dated Jun. 4, 2019, 16 pages.
International Search Report and Written Opinion for Application No. PCT/GB2019/050969, dated Jun. 13, 2019, 15 pages.
International Search Report and Written Opinion for Application No. PCT/GB2019/051223, dated Aug. 8, 2019, 15 pages.
International Search Report and Written Opinion for Application No. PCT/GB2019/052510, dated Jan. 14, 2020, 25 pages.
Invitation to Pay Additional Fees for PCT/GB2022/051821 (dated Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Office Action dated Apr. 8, 2020, for U.S. Appl. No. 16/198,959 (pp. 1-17).

(56) References Cited

OTHER PUBLICATIONS

Office Action dated Apr. 16, 2020 for US App. No. 15/839, 184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pags 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for US App. No. 15/960, 113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for US App. No. 15/960, 113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK; 25 pages.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Papoulis, A. (1977). Signal Analysis. The University of Michigan: McGraw-Hill, pp. 92-93.
Partial International Search Report for Application No. PCT/GB2018/053735, dated Apr. 12, 2019, 14 pages.
Partial ISR for Application No. PCT/GB2020/050013 dated May 19, 2020 (16 pages).
Partial ISR for PCT/GB2023/050001 (Mar. 31, 2023) 13 pages.
Patricio Rodrigues, E., Francisco de Oliveira, T., Yassunori Matuda, M., & Buiochi, F. (2019, September). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 dated Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Prabhu, K. M. (2013). Window Functions and Their Applications in Signal Processing . CRC Press., pp. 87-127.
Rakkolainen et al., A Survey of Mid-Air Ultrasound Haptics and Its Applications (IEEE Transactions on Haptics), vol. 14, No. 1, 2021, 18 pages.
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).

(56) References Cited

OTHER PUBLICATIONS

Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Nuttall, A. (Feb. 1981). Some windows with very good sidelobe behavior. IEEE Transactions on Acoustics, Speech, and Signal Processing.
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Mar. 22, 2023 for U.S. Appl. No. 17/354,636 (pp. 1-5).
Office Action (Non-Final Rejection) dated Apr. 1, 2022 for U.S. Appl. No. 16/229,091 (pp. 1-10).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 2, 2022 for U.S. Appl. No. 17/068,831 (pp. 1-10).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https:// doi.org/ 10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Confer-

(56) References Cited

OTHER PUBLICATIONS ence on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
Jonaschatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
JP Office Action for JP 2020-534355 (dated Dec. 6, 2022) (8 pages).
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Keisuke Hasegawa, Electronically steerable ultrasound-driven long narrow air stream, Applied Physics Letters 111, 064104 (2017).

(56) References Cited

OTHER PUBLICATIONS

Keisuke Hasegawa, Midair Ultrasound Fragrance Rendering, IEEE Transactions on Visualization and Computer Graphics, vol. 24, No. 4, Apr. 2018 1477.
Keisuke Hasegawa,, Curved acceleration path of ultrasound-driven air flow, J. Appl. Phys. 125, 054902 (2019).
Ken Wada, Ring Buffer Basics (2013) 6 pages.
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015) 95 pages.
Mahdi Rad et al., Feature Mapping for Learning Fast and Accurate 3D Pose Inference from Synthetic Images, Mar. 26, 2018, pp. 1-14.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: I0.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mohamed Yacine Tsalamlal, Non-Intrusive Haptic Interfaces: State-of-the Art Survey, HAID 2013, LNCS 7989, pp. 1-9, 2013.
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Notice of Allowance dated Feb. 23, 2023 for U.S. Appl. No. 18/060,556 (pp. 1-10).
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).

* cited by examiner

1500

2250

2200

3230

ACOUSTIC TRANSDUCER STRUCTURES

PRIOR APPLICATIONS

This application claims the benefit of: (1) U.S. Provisional Patent Application No. 62/953,577, filed Dec. 25, 2019; and (2) U.S. Provisional Patent Application No. 62/954,171, filed on Dec. 27, 2019, both of which are incorporated by reference in its entirety.

FIELD OF THE DISCLOSURE

The present disclosure relates generally to improved techniques in acoustic transducer structures used in mid-air haptic systems.

BACKGROUND

As discussed herein, the term "phased array" refers to a group of transmitters which project into the same space and can be individually addressed. By selecting specific signals or, in the case of a monochromatic array, phases and amplitudes, the group of transmitters can shape the emitted field. In the case of an ultrasound phased array in air, the sound field can be focused, made to diverge, shaped into beams, and generally rearranged into many other forms. Uses for shaped and steered ultrasonic fields include mid-air haptics, directional audio, and the imaging of physical materials and scenes.

Steering via a phased array can encounter grating lobes when element spacing is above critical spacing. This results in sound energy being projected in unintended directions. To bring the array closer to critical spacing an acoustic waveguide structure can be used. Jager et al. (2017 IEEE) demonstrated beam steering using a waveguide structure. While Jager shows a reduction in grating lobes, it does not realize or demonstrate consequences with respect to haptics or parametric audio.

Further, described herein are array designs that are intended to capitalize on rectilinear transducer design, yet have the benefits of a transducer tiling that has irrational spacing to promote the spread of grating lobe energy.

Arranging the transducers of an emitting phased array system generates unwanted extra features depending on such parameters as wavelength, element size, separation distance between elements and geometric uniformity of spacing.

As the wavelength is decreased, the element size and separation distance when measured in wavelengths increases. Above a certain size, grating lobes appear and distort the output, which at the extremes creates extra output focus points that are unwanted.

For commercial reasons it may be necessary to set the frequency independently of the size and spacing of the elements, wherein with a structure with geometric uniformity of spacing, when actuated to produce a focus unwanted extra output focus points appear. In this case, the only modifiable parameter is the uniformity of the geometry. However, commercially, it is beneficial to create transducers that do not waste material, have high packing density and minimize the number and complexity of steps required for manufacture.

SUMMARY

One key innovation disclosed herein is recognizing that approaching critical spacing is necessary for steering of parametric audio. When looking at ultrasound simulation or measurement data, it is not apparent that the diffuse phyllotactic grating lobe contributes as much audio as it does. Nor does measurement of the audio alone lead to the conclusion that grating lobes are to blame for the poor steering. It takes comparing steering measurements both with and without a waveguide to come to that conclusion. In addition, the waveguide needs to be functioning with correct phase offsets to achieve the steering required for performance.

In addition, Jager et al. only demonstrates operation using equal-length tubes and does not discuss other possibilities. In this disclosure, different-length tubes are equally functional and allow for a much wider variety of shapes. Also, arranging tubes so that the array configuration changes from rectilinear to another distribution is a non-obvious use and has benefits when the waveguide is short of critical spacing or constrained for space.

Further, this disclosure describes array designs intended to capitalize on rectilinear transducer design while having the benefits of a transducer tiling that has irrational spacing to promote the spread of grating lobe energy.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1A:
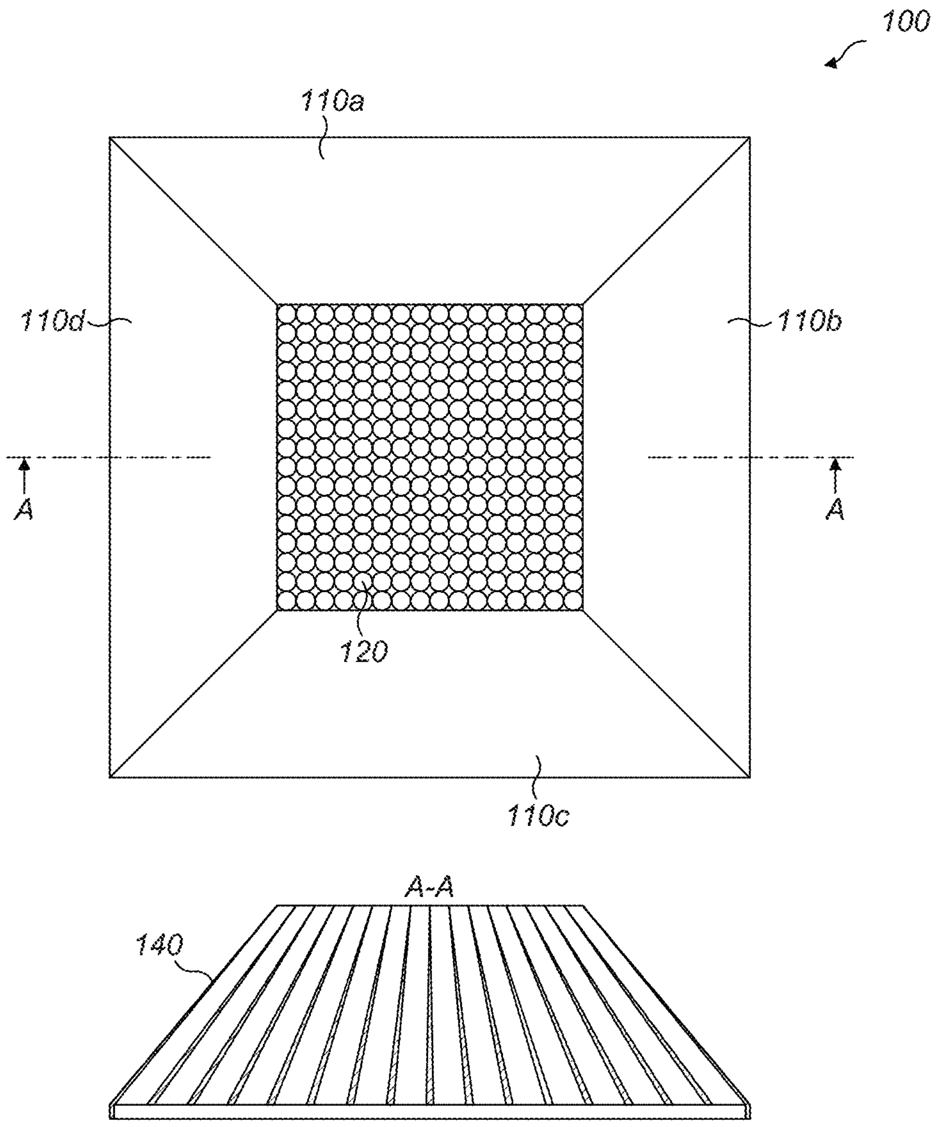
FIGS. 1A, 1B, and 1C show an arrangement of a waveguide.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Steering of an Ultrasonic Phased Array Using an Acoustic Waveguide Structure

A. Introduction

A limitation encountered when working with an ultrasonic phased array is the phenomena of grating lobes. This is the effect wherein certain arrangements of transducers produce leakage of energy in unintended directions taking the form of an erroneous lobe of output. To illustrate this effect, consider a linear array of transducers with spacing a from center-to-center. When they are all producing ultrasound in phase, they produce a field similar to a line source, where a section taken perpendicularly to the array of transducers will reveal a circular diverging wave front, but in the plane of the transducers there will be a substantially linear wave front projecting directly away from the transducers. Now, consider another direction at angle θ from the vertical in that plane. The distance along that direction before an emitted spherically diverging wave front from one transducer connects with another transducer is given by d=α sin θ. When this distance is equal to one wavelength then along that direction every wave is adding constructively. The result of this constructive interference at that angle is a grating lobe. The angle this occurs is given by $$\theta = \sin^{-1}\frac{\lambda}{a},$$

where λ is the wavelength of the ultrasound. This illustrates that the grating lobe, in this instance, is dependent on the spacing a and how it compares to the wavelength λ. If, for instance, a is smaller than λ, a solution does not exist and therefore a grating lobe will not exist in this arrangement and emission scenario.

Grating lobes in phased arrays have been studied extensively and careful analysis shows that all grating lobes will be eliminated regardless of arrangement when the spacing of transducers is equal to or smaller than half of the wavelength (½λ) (Wooh & Shi, 1999). This is referred to as 'critical spacing'. A linear or planar array with transducers spaced at critical spacing will be able to achieve desired fields without grating lobe artefacts. As demonstrated above, grating lobes for a beam produced at a right angle directly away from the array, vanish as the system approaches a wavelength (λ) spacing, or double that of critical spacing. If moving or steering the beam in any direction other than directly perpendicular however, in that arrangement, grating lobes will immediately appear when the system starts to steer. In between wavelength spacing (λ) and critical spacing (½λ) there exists a class of arrays which can steer to increasingly larger angles without grating lobes. This could be beneficial if large steering angles are not required as larger transducers tend to provide stronger acoustic fields. So, fewer would be required, simplifying the design of the system.

The geometry of ultrasonic transducers is dictated by many factors including the materials used, the actuating element, matching layers, resonant cavities, and many other aspects of the transducer element design. It can be difficult to design a transducing element which can achieve critical spacing. In addition, an oddly shaped elements may prevent arrangements which mitigate secondary focusing from grating lobes such as a phyllotactic spiral. The invention presented here is a series of tubes, or waveguide paths, which can be mounted directly atop a transducer or array of transducers which direct the acoustic output to a second aperture at the opposite end of the waveguide. From the perspective of the produced acoustic field, it is as if the transducer aperture has been substantially replaced by this second aperture in terms of the geometric arrangement of the phased array. In one such geometric arrangement, the waveguide can be used to adjust the spatial arrangement of transducers from, for example, rectilinear to a phyllotactic spiral. In another arrangement, the open aperture can be reduced so that critical spacing can be achieved.

Figure 1B:
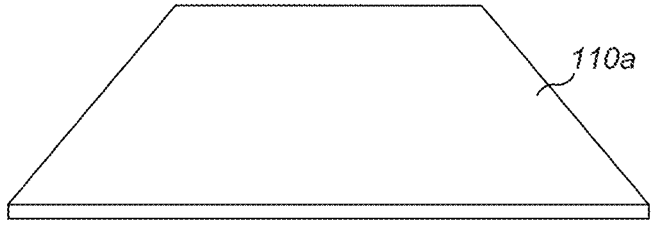
Figure 1C:
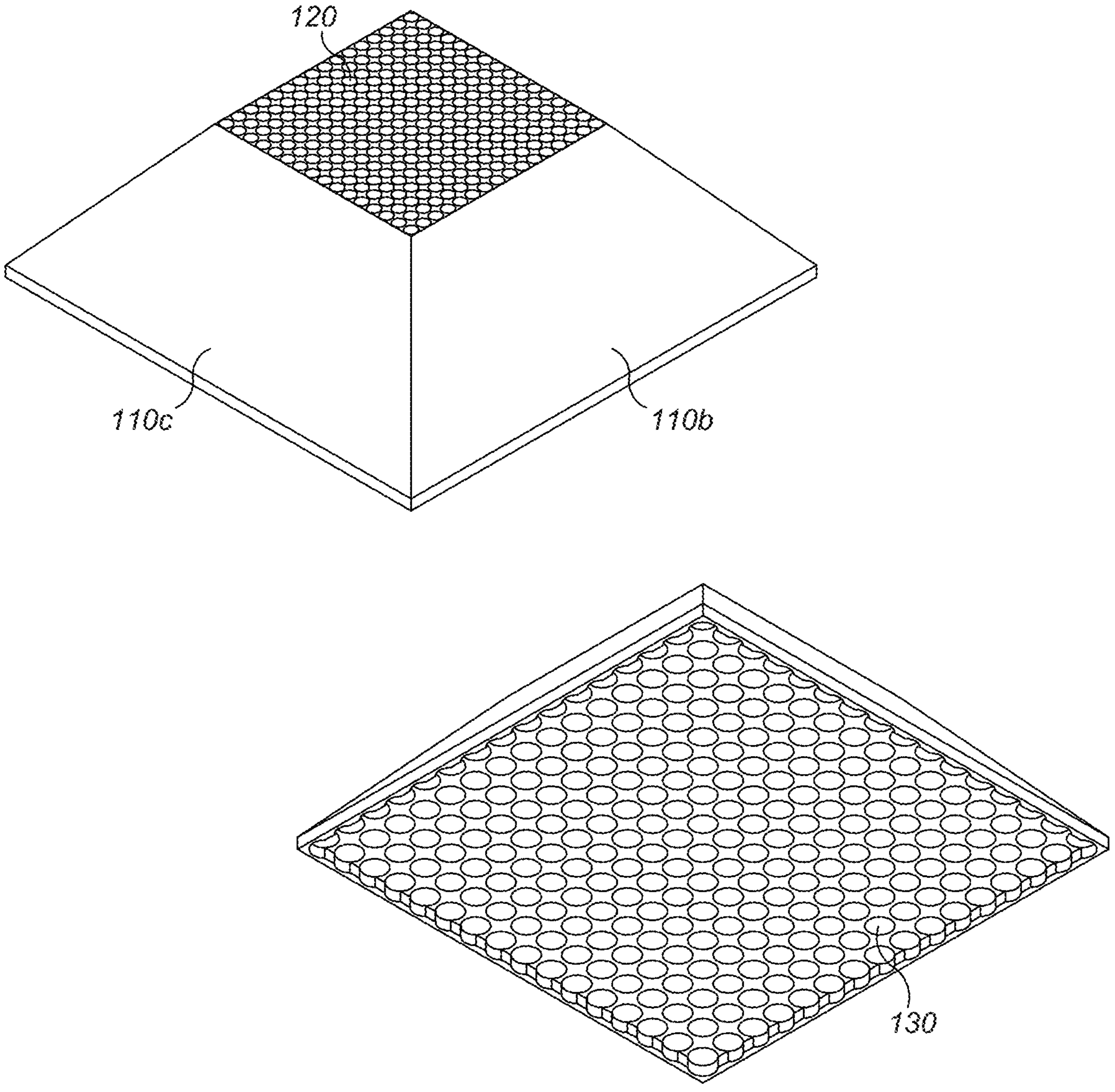

FIGS. 1A, 1B, and 1C show an example arrangement 100 of this innovation in various views. Shown is a rectilinear array with tapering openings 120, 130 on the upper and lower sides with a cross section shown via A-A 140 in FIG. 1A. These openings 120 130 are surrounded by members 110*a*, 110*b*, 110*c*, 110*d* as shown in FIGS. 1A, 1B, and 1C.

Specifically, this waveguide couples to a 16×16 rectilinear array 120 of 1 cm diameter circular transducers spaced at 1.03 cm which operate at 40 kHz. The waveguide forms straight-line tapering paths to circular openings with 5 mm spacing. At sea level and standard conditions, the wavelength of 40 kHz is 8.6 mm. The waveguide therefore transforms the apparent geometry of the array from 1.2λ spacing to 0.58λ spacing, much closer to the 0.5λ critical spacing. In other words, this shows an example waveguide that transforms a 16×16 rectilinear array of 10 mm 40 kHz transducers to near critical (5 mm) spacing.

Figure 2:
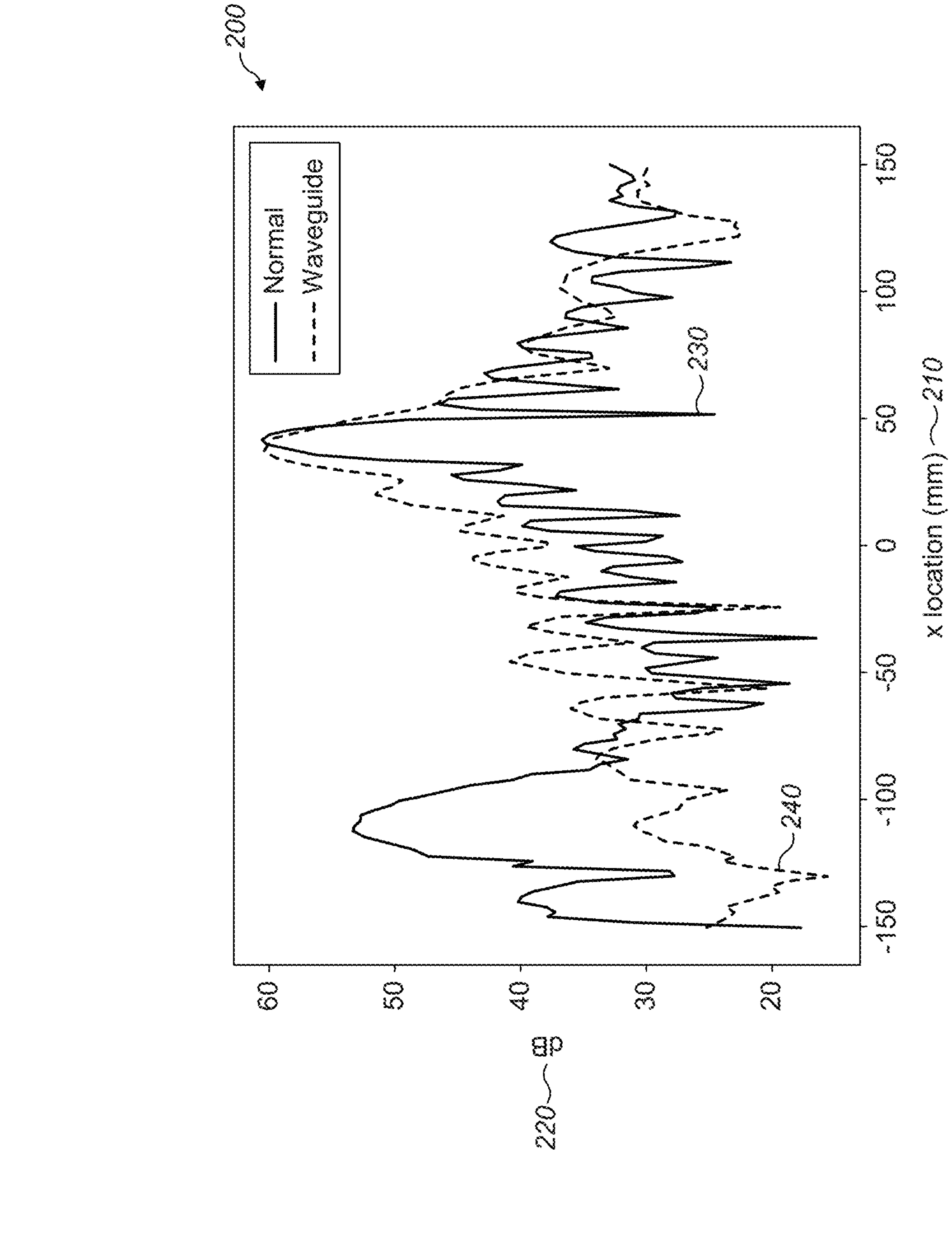
FIG. 2 shows a grating lobe suppression simulation.
Figure 3:
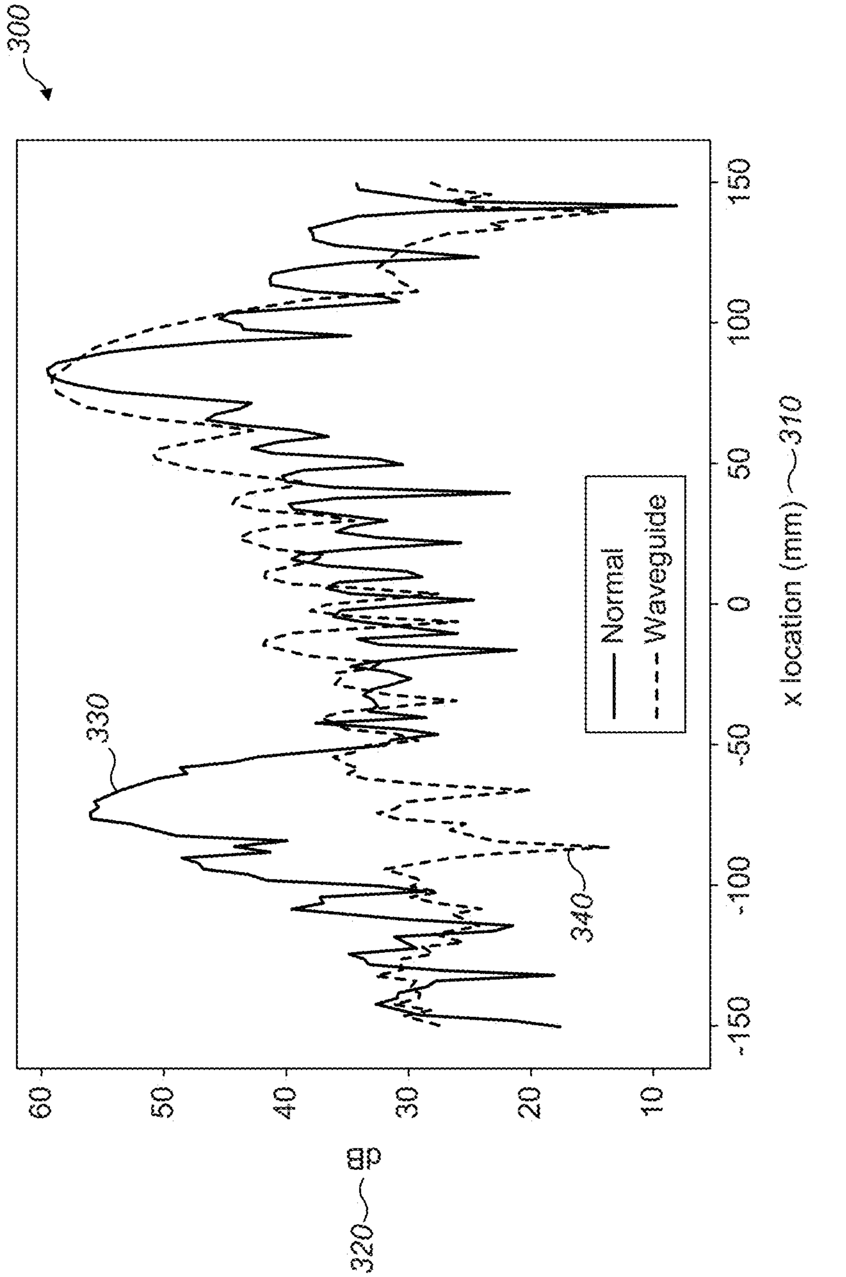
FIG. 3 shows a grating lobe suppression simulation.

FIG. 2 and FIG. 3 show the effectiveness of this new, tighter spacing. FIG. 2 shows a graph 200 of grating lobe suppression that is focused at [x,y,z]=[40 mm, 0,150 mm]. The x-axis 210 is location in mm. The y-axis 220 is in db. A normal plot 230 is compared to a waveguide plot 240.

In FIG. 2, a focus point is projected at [x, y, z]=[40 mm, 0, 150 mm] and a microphone is swept across the x-dimension at z=150 mm. A clear focus point is observed at x=40 mm in both the regular and waveguide arrangement. However, for the widely spaced regular arrangement, a secondary focus caused by the grating lobe is readily apparent at x=−110 mm. The tighter spacing enabled by the waveguide prevents the creation of a secondary focus.

FIG. 3 shows another example of grating lobe suppression via graph 300 of a similar experimental measurement with the focus projected at x=80 mm. The x-axis 310 is location in mm. The y-axis 320 is in db. A normal plot 330 is compared to a waveguide plot 340.

FIG. 3 illustrates the necessity to approach critical spacing when steering to larger angles—in this case the secondary focus is nearly the same magnitude as the intended focus. Once again, the tight spacing enabled by the waveguide eliminates the grating lobe.

Figure 4:
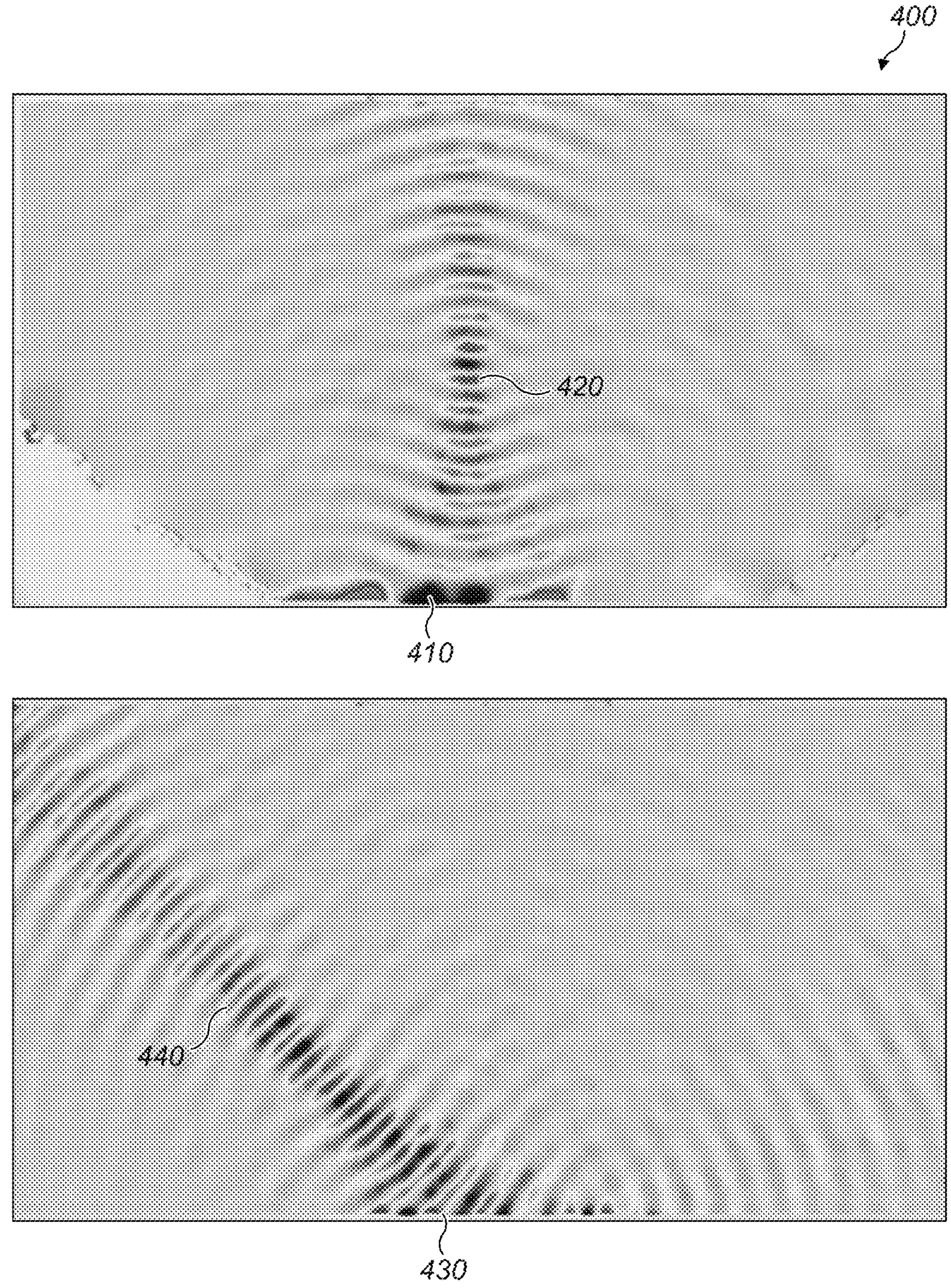
FIG. 4 shows laser doppler vibrometer scan images.

A further experimental verification is shown in FIG. 4, which is a series 400 of a scanning laser doppler vibrometer scan images 410 430 of the acoustic field. This method directly images the acoustic field without potentially disturbing the field with a solid microphone. As with the microphone data, no grating lobe is observed without steering 420 and even when steered to a 45° angle 440

B. Waveguides for Focused Ultrasound

Mid-air haptics uses specialized high-pressure acoustic fields, typically modulated foci, to produce a vibrotactile sensation on the human body. Grating lobes can cause secondary fields which are also modulated, thereby creating haptics in unintended places.

Figure 5:
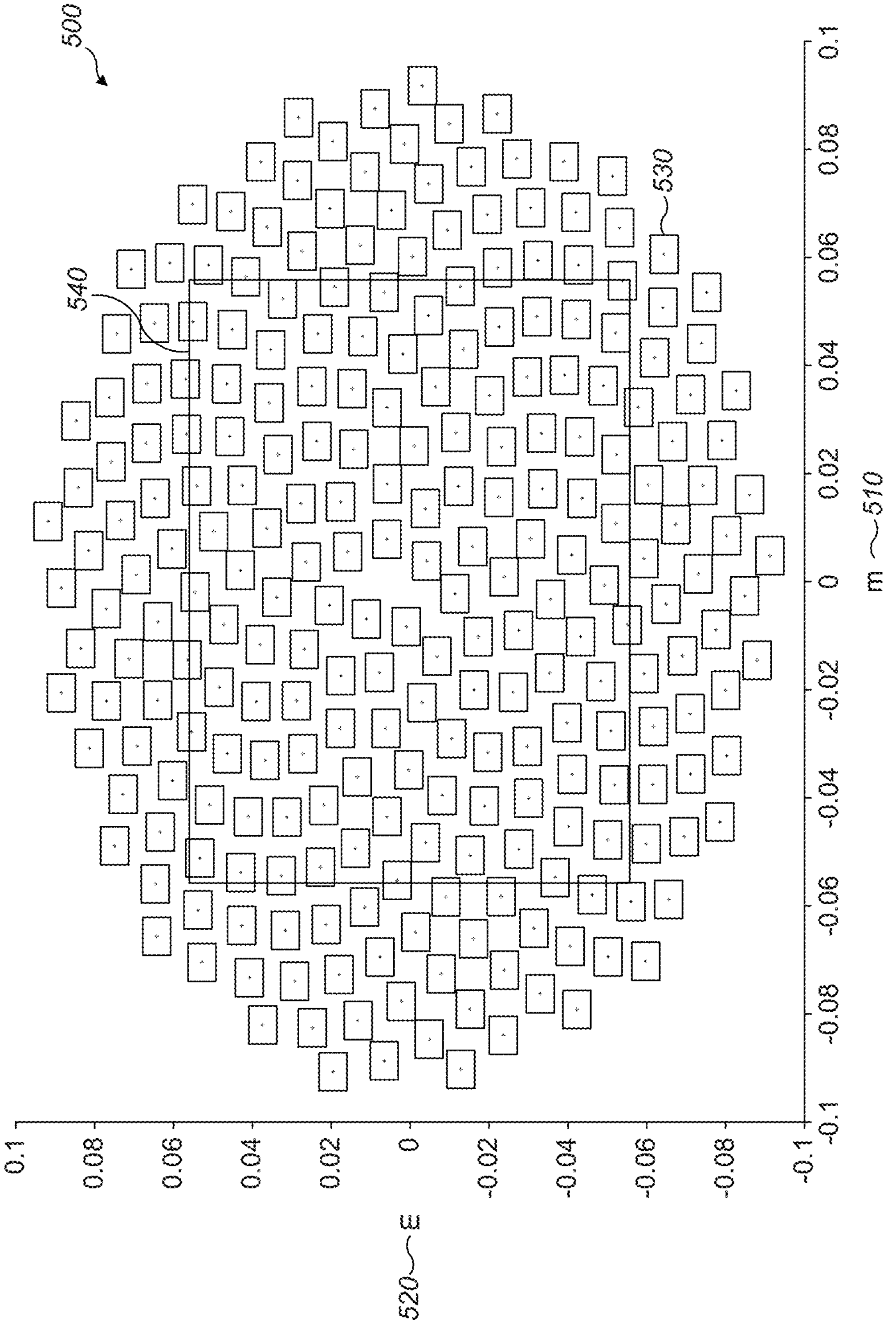
FIG. 5 shows an arrangement of transducers as a phyllotactic spiral.

One method to prevent grating lobes from forming secondary foci is to arrange the emitting array into a pseudo-random arrangement. FIG. 5 shows one such arrangement 500 of 7 mm transducers 530 as a phyllotactic spiral. The x-axis 510 and the y-axis 520 are in meters. The inset square 540 illustrates the extent of an array of the same transducers packed into a rectilinear arrangement. This arrangement contains no regular spatial frequencies and therefore prevents grating lobes from forming secondary foci.

Figure 6:
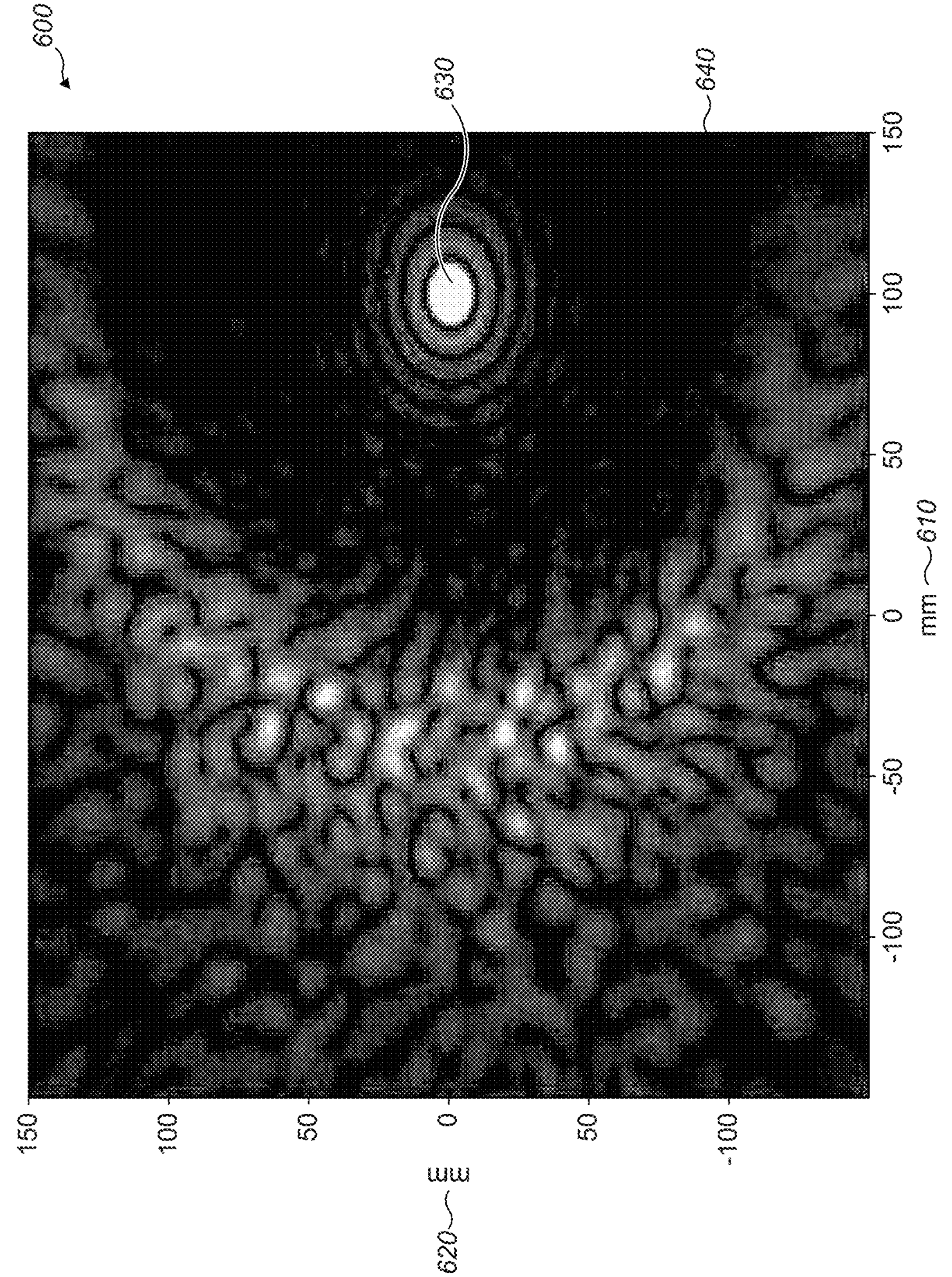
FIG. 6 shows the effect of FIG. 5 in simulation.

FIG. 6 shows the effect of FIG. 5 in simulation 600. The x-axis 610 and y-axis 620 are in mm. The grayscale is in pressure (arbitrary) units. Here, the field in the x-y plane 640 parallel to the array at z=20 cm is simulated when a focus 630 is placed at x=10 cm and z=20 cm. The grating lobe focus in a rectilinear array of similar density would appear at approximately x=5 cm. The phyllotactic arrangement distributes this secondary focus to a large arc in the negative x domain. Without a tight focus, the grating lobe will not produce a haptic sensation.

One distinct downside of the phyllotactic arrangement is the large spacing required. The inset square 540 in FIG. 5 shows the extent of an array if the same transducers were packed rectilinearly. The increased size of the phyllotactic spiral arrangement might prevent the use of such an array in integrations which are tight on space, as well as likely increase the cost of manufacture.

Using a waveguide structure, it is possible to use connect a rectilinear transducer array to a phyllotactic spiral-arranged or similarly pseudo-random exit pattern which distributes grating lobe energy. In one arrangement, design consists of a straight-line tube from each transducer to the closest exit aperture. Depending on the size and shape of the exit arrangement, this may require iterative design to prevent crossing of tubes. This will also likely create different length tubes requiring measured or simulated phase offsets to be included in steering calculations (discussed below).

A pseudo-random arrangement is not required, however, when the exit apertures are near critical spacing. For haptics, however, this can lead to some drawbacks. For instance, with a reduced exit aperture, the effective depth of focus will increase at similar distances. Without a tight focus, peak pressure will be lower and potentially provide a reduced haptic effect. At the same time, with increased steering ability provided by the critical spacing, focus shape will be maintained through large steering angles close to the array. Depending on the application, a waveguide can be designed which optimizes the interplay between reduced grating lobes, depth of focus, and exit aperture size.

C. Waveguides for Parametric Audio

Parametric audio is an effect whereby audible sound is produced by nonlinear distortion in the air when ultrasound at varying frequencies is present. By controlling the short-wavelength field of ultrasound, the resulting audio can be controlled to a degree not possible using conventional loudspeakers.

The most common use of the parametric audio effect is to produce beams of audio which follow beams of ultrasound. Within the beam, audio is being produced in every volume element in proportion to the magnitude and relative frequencies present. After the audible sound is produced, it spreads out more due to its larger wavelength relative to the ultrasound. The largest magnitude of audible sound, however, will exist within the ultrasound beam, so only in a direction that will be reinforced through further parametric audio generation.

Figure 7A:
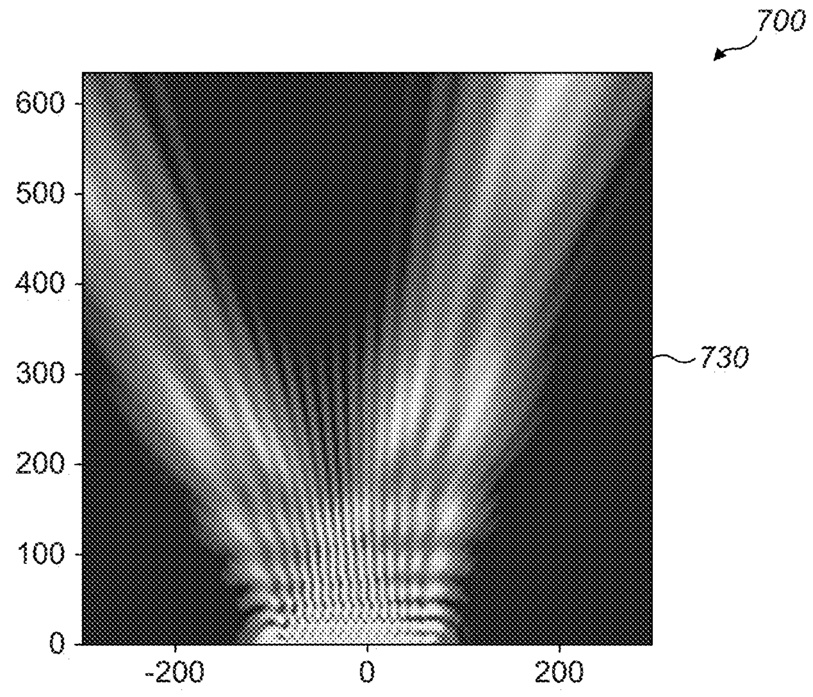
FIGS. 7A and 7B illustrate an ultrasonic acoustic simulation of a rectilinear array.
Figure 7B:
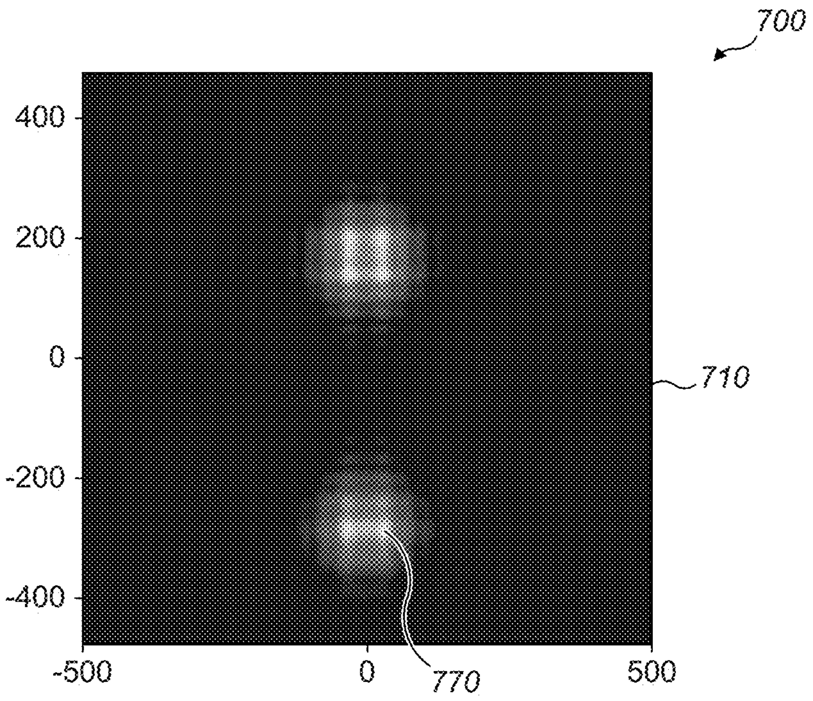

FIGS. 7A and 7B illustrate an ultrasonic acoustic simulation 700 of a rectilinear array at 1.2λ spacing producing a beam at 30° steering angle. A grating lobe beam is clearly visible, directed away from the steering direction. In FIG. 7A, the simulation 730 shows two audio beams, each directed along its own ultrasonic beam. The net result will be two diverging audio beams which will limit the perceived directionality of the system and its ability to target specific users. In FIG. 7B, the simulation 730 shows a grating lobe 770 that appears in the negative-y steering angle.

Figure 8A:
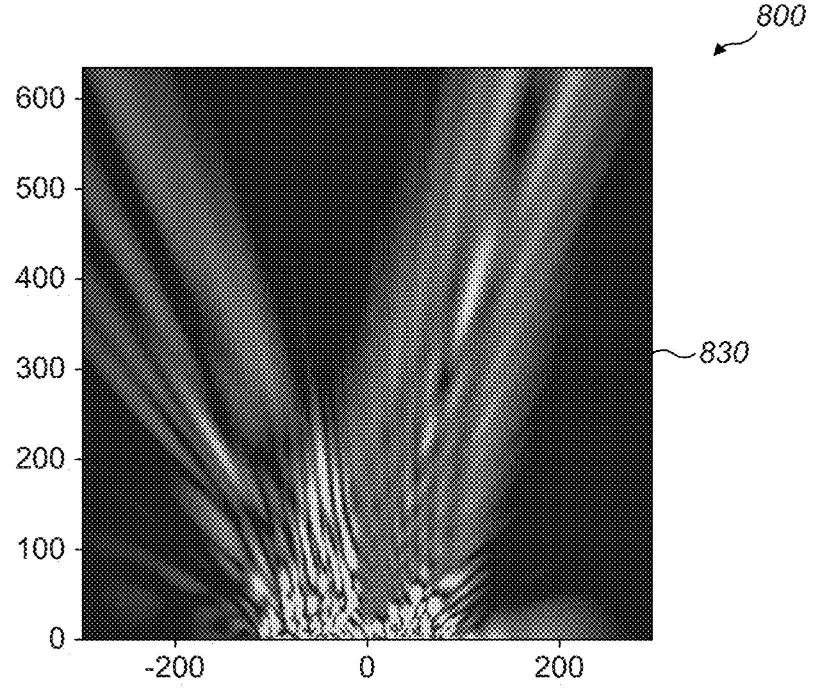
FIGS. 8A and 8B illustrate an ultrasonic acoustic simulation using an array in a phyllotactic spiral arrangement.
Figure 8B:
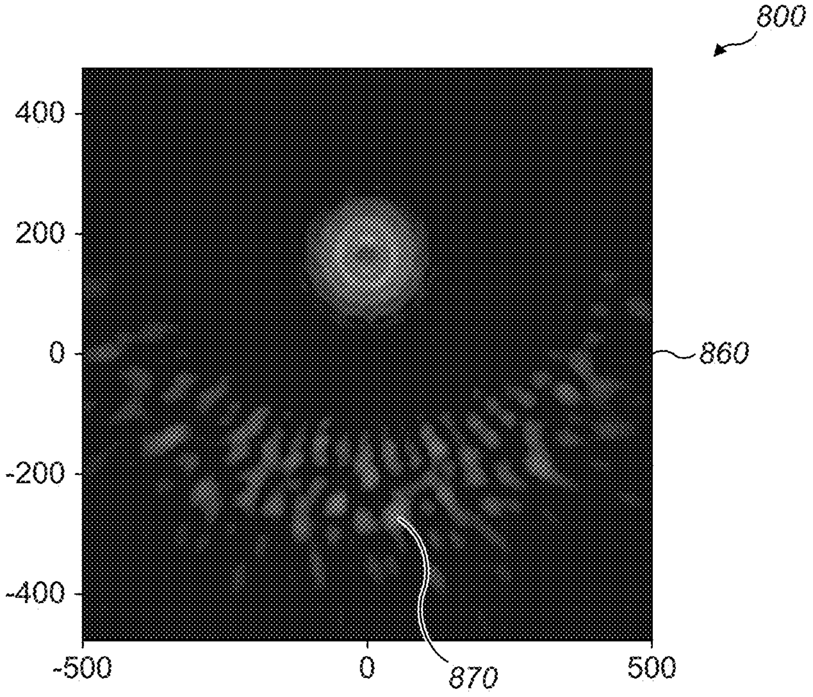

FIGS. 8A and 8B illustrate an ultrasonic acoustic simulation 800 using an array in a phyllotactic spiral arrangement with packing density comparable to a 1.2λ rectilinear array. Simulation of a phyllotactic-spiral arranged ultrasonic array above critical spacing projecting a beam in the positive-y direction at 30 degrees. In FIG. 8A, the simulation 830 shows the pseudo-random arrangement of transducers distributes the energy found in the grating lobe into a large arc. At first glance, it is not obvious that this diffuse, low-intensity, arc of ultrasound would be able to generate any significant parametric audio. In FIG. 8B, the simulation 860 shows a grating lobe 870 is distributed and directed towards in the negative-y direction but is much more diffuse when compared to the rectilinear arrangement.

Figure 9:
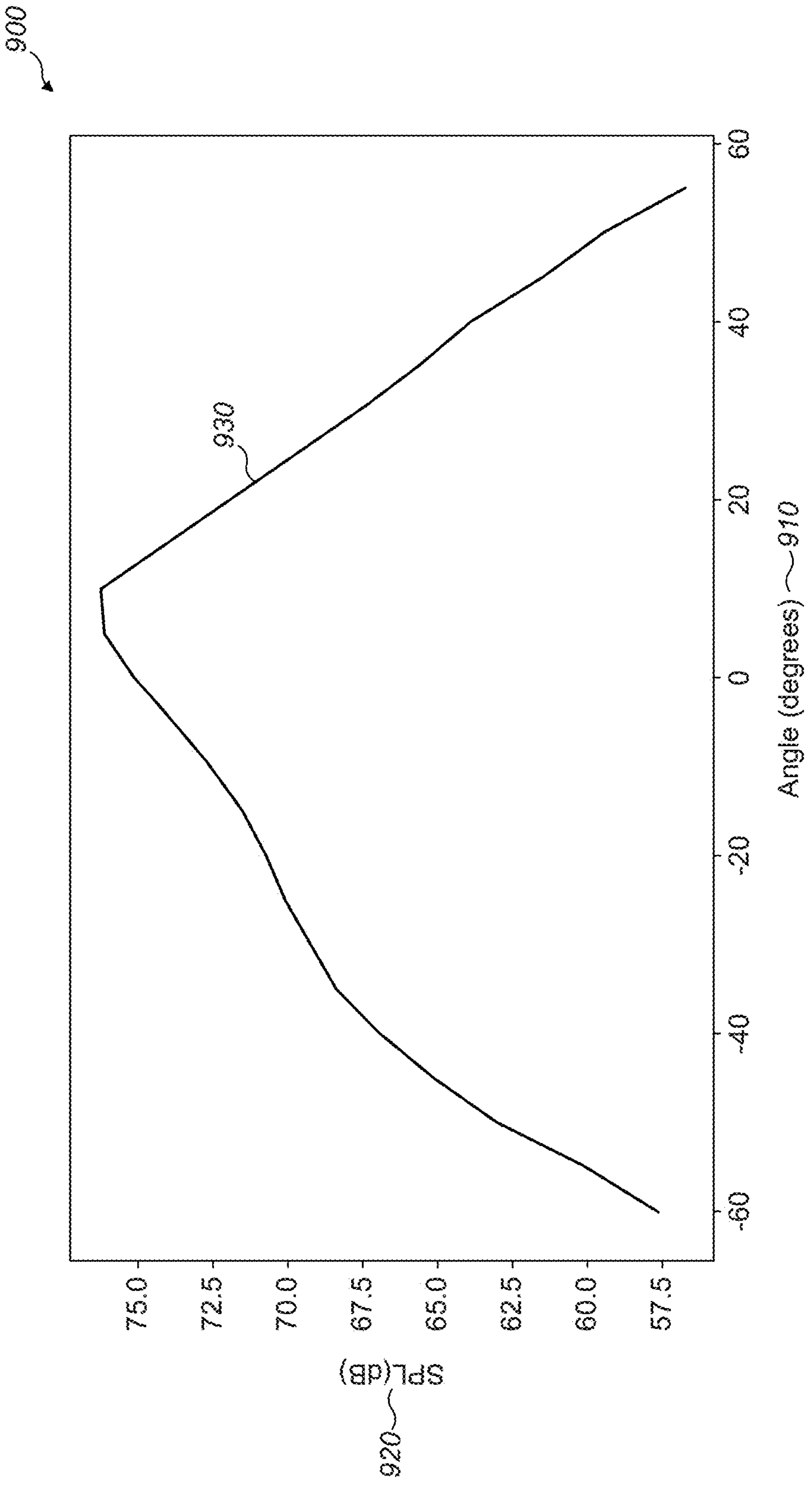
FIG. 9 shows the audio steering performance of a tone production of an array arranged in a phyllotactic spiral.
Figure 10:
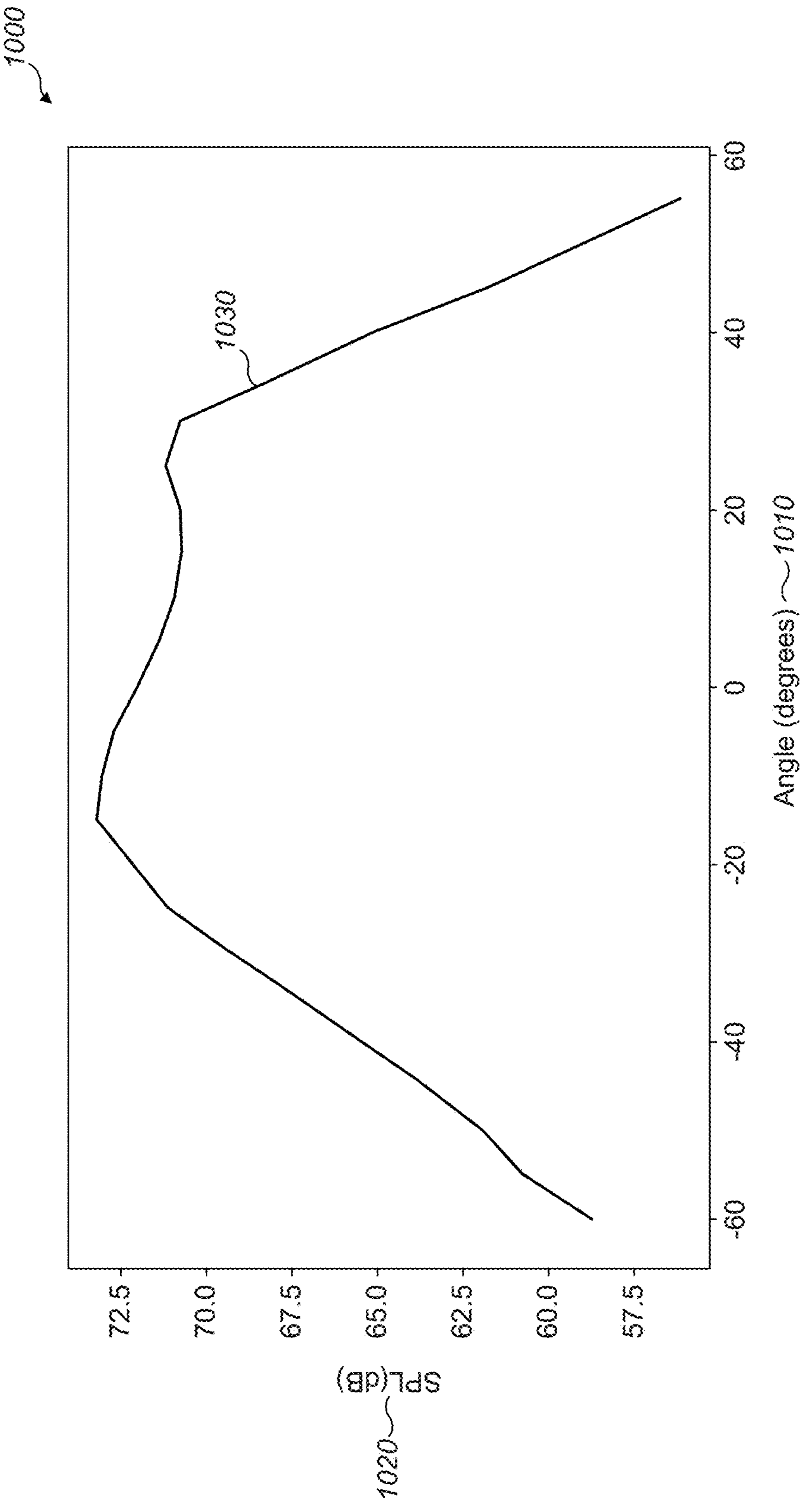
FIG. 10 shows the audio steering performance of a tone production of an array arranged in a phyllotactic spiral.

FIG. 9 and FIG. 10 show the audio steering performance of 1 kHz tone production of a 61 kHz array arranged in a phyllotactic spiral with packing density of about 1.2λ at 10° and 30° respectively. The graph 900 in FIG. 9 has a plot 930 where the x-axis 910 is angle (degrees) and the y-axis 920 is SPL (db). The graph 1000 in FIG. 10 has a plot 1030 where the x-axis 1010 is angle (degrees) and the y-axis 1020 is SPL (db).

This measurement shows the audio sound level measured at a given angle with respect to the normal of the array in a large room. Even with a relatively small 10° steering angle (FIG. 9) the measured audio emitted is not symmetric about the array, which one would expect if the grating beam were not present. When steered to a more extreme angle such as 30° (FIG. 10), the polar profile shows sound is coming out at unintended angles, at around about −20°, and at a greater amplitude than even the intended +30° steering. This roughly corresponds to the angle of the grating beam/arc simulated in FIG. 8. This unexpected result is created because while the grating beam has a lower peak pressure spatially, its size and spatial extent make up for this lack of intensity. As discussed above, when parametric audio is generated, due to its larger wavelength, it diffracts and spreads out more readily than the ultrasound. Therefore, at any given cross-section, and entire arc of low-intensity sources in the grating beam are contributing to parametric audio in that general direction. As a result, phyllotactic spiral-arranged arrays not only do not help, but actively hurt parametric audio steering performance from ultrasonic phased arrays due to their lower packing density compared to rectilinear or hexagonal-packed arrays.

Fortunately, arrays approaching critical spacing do help with steering parametric audio due to their complete lack of grating lobe energy.

Figure 11:
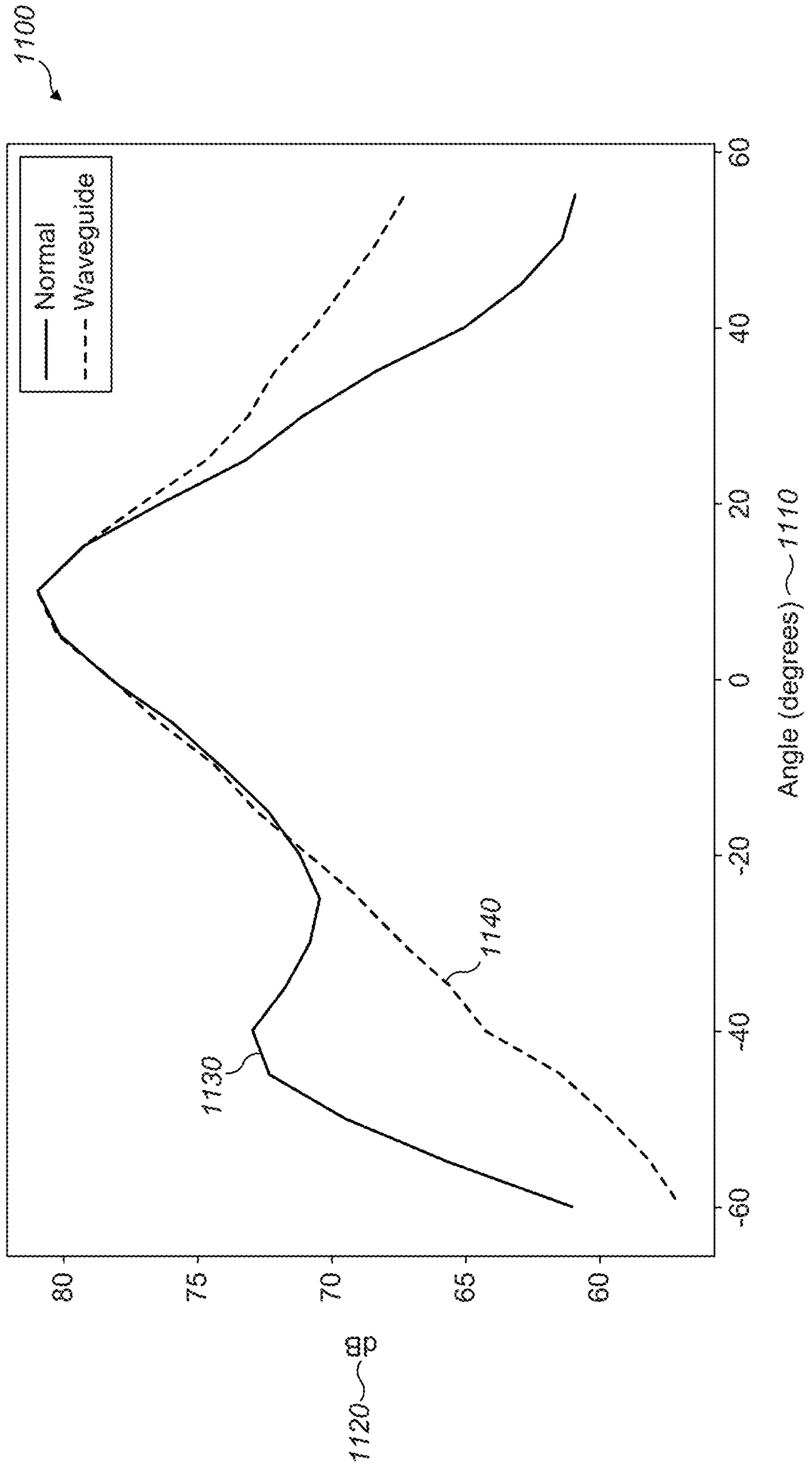
FIG. 11 shows steering of a parametric audio beam using a rectilinear array.

FIG. 11 shows a graph 1100 with an x-axis 1110 of angle (degrees) and a y-axis 1120 in dB having a normal plot 1130 and a waveguide plot 1140. Specifically, FIG. 11 shows steering of a parametric audio beam to +10 degrees using a rectilinear array at 1.2 lambda (normal) and the 0.58 lambda waveguide illustrated in FIG. 1.

Figure 12:
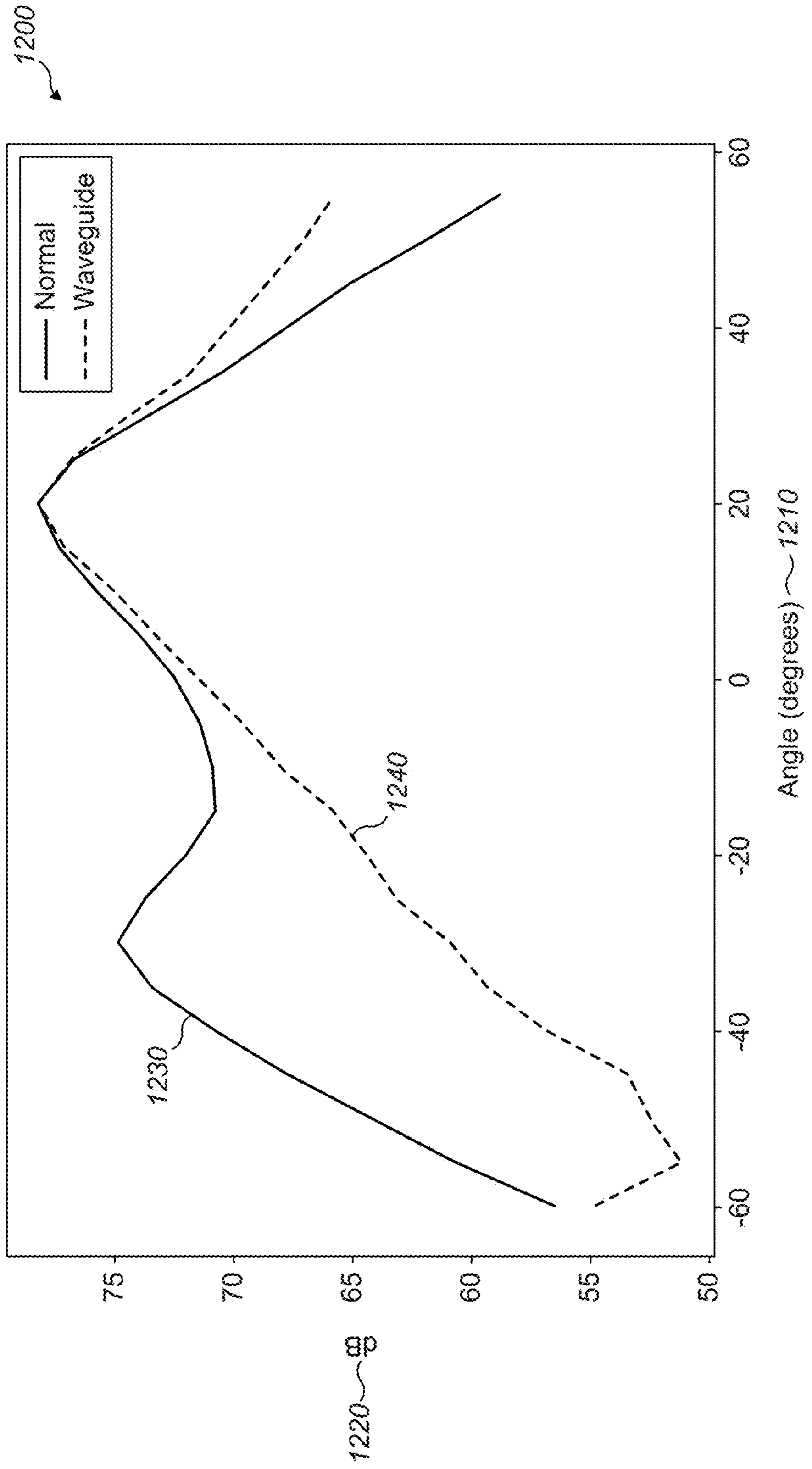
FIG. 12 shows steering of a parametric audio beam using a rectilinear array.

FIG. 12 shows a graph 1200 with an x-axis 1210 of angle (degrees) and a y-axis 1220 in dB having a normal plot 1230 and a waveguide plot 1240. Specifically, FIG. 12 shows steering of a parametric audio beam to +20 degrees using a rectilinear array at 1.2 lambda (normal) and the 0.58 lambda waveguide illustrated in FIG. 1.

Figure 13:
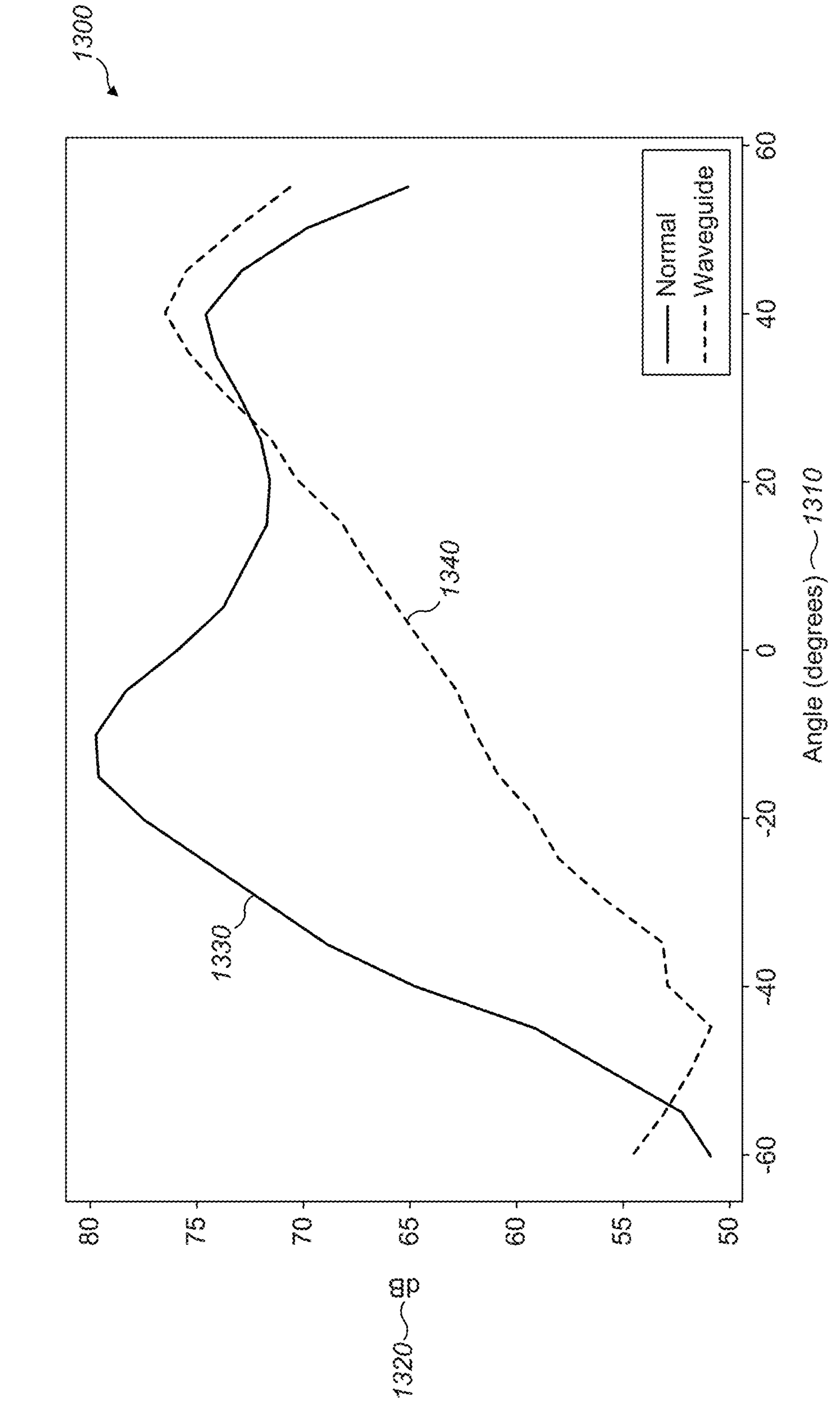
FIG. 13 shows steering of a parametric audio beam using a rectilinear array.

FIG. 13 shows a graph 1300 with an x-axis 1310 of angle (degrees) and a y-axis 1320 in dB having a normal plot 1330 and a waveguide plot 1340. Specifically, FIG. 13 shows steering of a parametric audio beam to +40 degrees using a rectilinear array at 1.2 lambda (normal) and the 0.58 lambda waveguide illustrated in FIG. 1.

Figure 14:
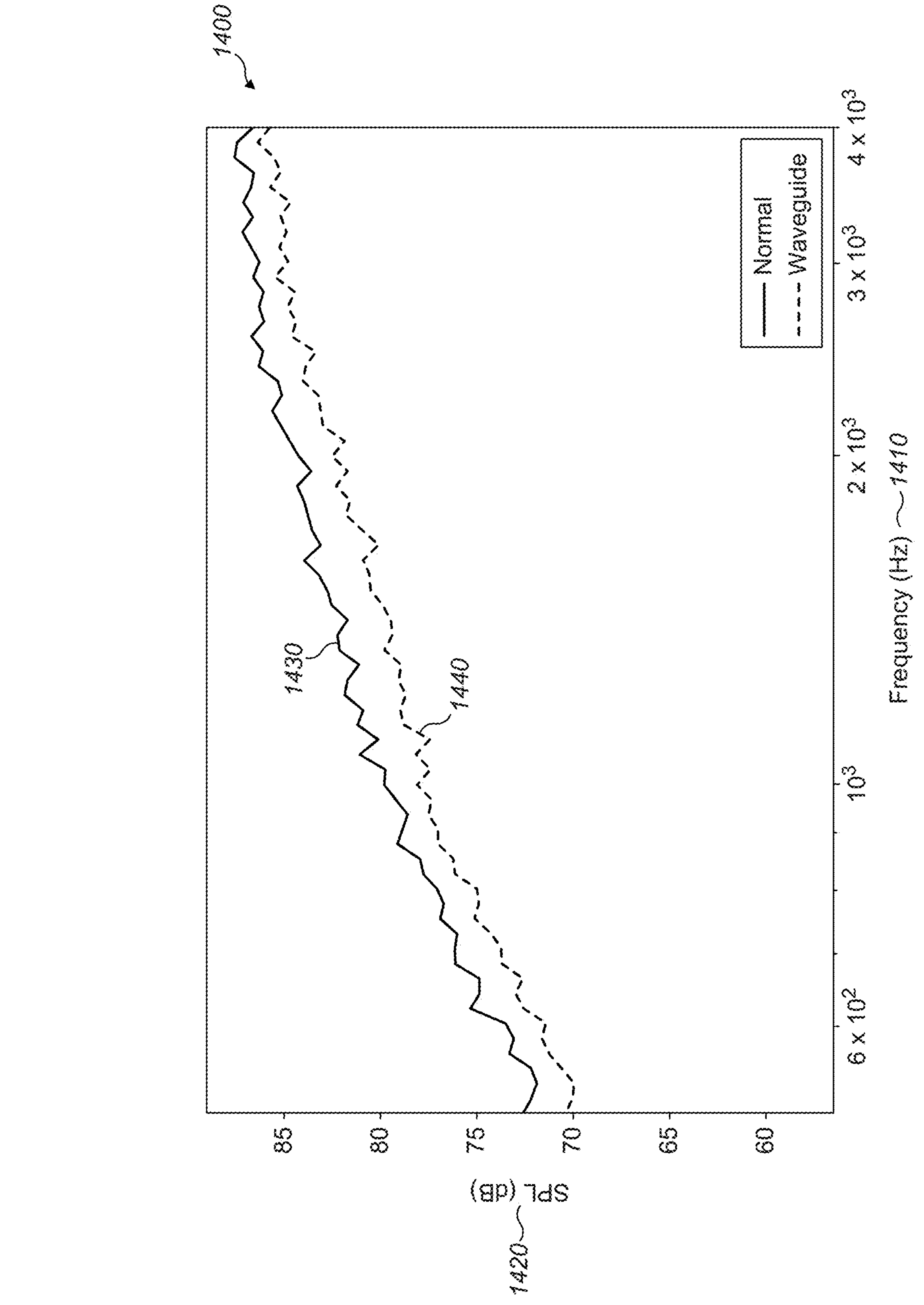
FIG. 14 shows a frequency response of parametric audio from a transducer array.

FIG. 13 shows a graph 1400 with an x-axis 1410 of frequency (Hz) and a y-axis 1420 in SPL (dB) having a normal plot 1430 and a waveguide plot 1440. Specifically, FIG. 14 shows frequency response of parametric audio from a 16×16 40 kHz transducer array with and without a waveguide.

Thus FIG. 11, FIG. 12, and FIG. 13 show the parametric audio steering performance of the waveguide shown in FIG. 1 compared to a bare 1.2λ-spaced 40 kHz array. As is readily observed, the near-critically-spaced exit apertures of the waveguide eliminate the grating lobe beam and its resulting audio. This shows that the invention presented here enables aggressive steering of parametric audio to arbitrary angles from any size transducer by enabling critical spacing. In addition, the frequency response is virtually unaffected as shown in FIG. 14.

D. Waveguide Design and Operation

Enabling proper operation of a phased array with a waveguide requires adjusting the output to compensate for the waveguide itself. In other words, just like the phase of each and amplitude for each transducer must be coordinated and driven precisely, any relative change caused by a waveguide path must also be compensated for. For instance, if one waveguide path causes a phase offset of π/4 while another in for the same array causes a π/2 shift, then this offset must be subtracted from the desired phase of each transducer respectively when calculating activation coefficients for a given field. If both amplitude and phase for each transducer are considered as a complex number, and the attenuation and phase delay of the waveguide tube a further complex number, then the application of the correction factor for the waveguide may be realized as the division of the first by the second. Without this compensation, the field will be malformed and distorted by the waveguide. In addition, if activation coefficients are produced using a model which accounts for time-of-flight, any time-delay caused by the waveguide must be compensated for as coefficients are calculated.

Phase offsets and time-delays can be derived using empirical or simulated methods. The simplest approach, albeit time-consuming, is to measure the phase offsets and time-delays associated with each waveguide path directly. In one arrangement, phase can be measured with continuous, monochromatic drive with reference to a control signal, while time delay can be measured with an impulse, chirp or comparison to a control path. Another approach is to calculate the phase and time delay with simulation. This could be done with something as sophisticated as a finite element model (FEA) or an analytic model of a pipe or appropriate structure. In the data presented in previous sections, the phase offsets were calculated using the length of each waveguide path, where this was divided through by the wavelength of the ultrasonic excitation in free air resulting in a remainder that describes the appropriate phase offset. This was then refined by measuring the strength and location of a focus generated directly above the array at 15 cm and compared to a model. Increasing the effective length of each tube by 8% resulted in a good fit to simulation. As stated above, without this compensation, the waveguide structure will not produce the expected field.

Most of the discussion here has been about waveguides for transmit, but they also work for receive. A receiver placed at one end of a waveguide will only receive and produce a signal when ultrasound is directed at the aperture at the opposing end of the waveguide. A receive system at critical spacing will be free from aliased ghost images created by grating lobe artefacts. In addition, shaping the open aperture of the waveguide into a horn or similar structure could provide increased sensitivity compared to the receive element in open air.

The waveguide shown in FIG. 1 represents only one arrangement possible from this invention. The waveguide paths, in this case decreasing radius straight-line tubes, need not be straight, decreasing radius, circular in cross-section, or even void of material. As long as the ultrasonic acoustic wave can propagate down the waveguide path and its phase offset and time delay can be well characterized and consistent, then it can be used to manipulate the array. For instance, a waveguide which transforms a rectilinear array into a phyllotactic pseudo-random arrangement will certainly not involve straight-line tubes and will likely incorporate non-circular cross-sections. In another arrangement, a waveguide could be used to bend the acoustic field around a corner with each waveguide path bending around to have an exit aperture at 90 degrees relative to the original waveguide. In another arrangement, the cross-section of the waveguide path can narrow before flaring out again near the exit aperture. This narrowing can provide increased acoustic impedance to the transducer, improving its acoustic output, as well as providing a horn-like exit aperture to increase the coupling to open air. In another arrangement, a variety of transducers could be utilized within the same array, say mixed frequency or emitting power, and a waveguide can bring them all into a unified emitting region.

The waveguide can be composed of a variety of materials. This includes metals, plastic, and even flexible polymers. The acoustic impedance of the construction material needs to be sufficiently higher than that of air to prevent ultrasound from passing from one waveguide path to another (cross talk within the array). This is not difficult as most solids are at least two orders of magnitude higher acoustic impedance compared to air. This enables the possibility of using flexible materials such as plastic tubing as a portion of the waveguide. For instance, an exit aperture array, composed of metal or hard plastic could be coupled to an input array of transducers with plastic or polymer tubing. Then each could be mounted independently, allowing the flexible tubes to bridge the connection. The polymer tubes could remain flexible during their operating life or be cured in some way (UV for instance) after installation. Given that the length and shape will be fixed during assembly, the phase offset and time delay should remain mostly unchanged regardless of the exact details of placement, within reason. Extreme angles or pinched/obstructed tubes will obviously cause distortions. If more accuracy is required, measurement or simulation could provide the $2^{nd}$-order corrections necessary.

In addition to plastic or polymers, metal can be used for a portion or all of the waveguide. Metal has the benefit of acting as a heat-sink as the waveguide can readily trap air, causing excessive heat storage.

The waveguide cross-section need not be a decreasing-radius curve or act as a simple tube. It is possible to design a relatively sudden decrease in radius along a waveguide path to produce a Helmholtz resonator-like design. Using this methodology, the larger-volume chambers could provide a boost to the output efficiency of the transducers while the exit apertures could be packed together to approach critical spacing.

The volume within the waveguide paths need not be completely empty. Filling material such as Aerogel could be packed into the waveguide to provide a different acoustic impedance if so desired. Besides acoustic impedance matching, different materials could provide environmental proofing like water resistance.

Manufacturing the waveguides can be done with a variety of techniques. The array design shown in FIG. 1—and proven experimentally—was produced with an additive manufacturing technique (FDM 3D printing). Other possible options include injection molding, where each waveguide path is formed by a removable pin. Symmetry can be exploited for waveguide production as well. For instance, the waveguide shown in FIG. 1 has 4-fold symmetry and 4 identical pieces could be connected together to form the final product. Another manufacturing arrangement involves connecting many straight polymer tubes of appropriate lengths into a form then heating them near their glass transition temperature. Then a form can be applied externally to push the collection of tubes into their final waveguide form. This external force can be similar to a vacuum bag or even water pressure in the case of metal tubing. It is also possible to produce one waveguide tube at a time and then glue/fuse them into the final result.

The disclosure presented here allows for the transformation of ultrasonic phased arrays to transform from one arrangement to another without significant loss of output or field-synthesis ability. This enables critically spaced or pseudo-random arrangements from arbitrary-sized transducing elements.

The goal of this disclosure is to produce an estimate of the acoustic pressure from an ultrasound phased array which reasonably matches the measurement of a stationary or slow-moving microphone at a similar location.

There are methods that detail ways to calculate instantaneous pressure or intensity or other metrics in the field. Here a series of algorithms efficiently use computational resources to calculate time-averaged metrics. These are useful for determining and regulating hot spots and higher-than desired pressure.

Estimating the field strength from an ultrasonic phased array can be done by summing the contribution of each transducer to the point of interest. This contribution is already calculated when creating a converging spherical wave. We can reuse this calculation to add a virtual microphone to the system. By monitoring this microphone and moving it along with new focus points, a robust system of field estimates and regulation can be established.

E. Additional Disclosure

1. An ultrasonic array consisting of:
A) A plurality of ultrasonic transducers;
B) An operating acoustic wavelength;
C) A plurality of acoustic cavities;
D) Wherein each cavity has a input opening and an exit opening;
E) Wherein each input opening accepts ultrasound from a single transducer;
F) Wherein at least 2 of the geometric centers of the cavity exit openings are situated less than one wavelength from one another;
G) Wherein the ultrasound emerging from the exit opening has a phase offset relative to when it entered the input opening; and
H) Wherein at least 2 cavities have different phase offsets.
2. The apparatus as in ¶1, wherein the phase offset for at least one cavity is inverted and applied to the phase of at least one transducer drive before emission.
3. The apparatus as in ¶2, wherein the ultrasound is modulated to produce audible sound.
4. The apparatus as in ¶2, wherein the ultrasound is modulated to produce a mid-air haptic effect.
5. The apparatus as in ¶2, wherein the ultrasound is used to levitate an object.
6. The apparatus as in ¶2, wherein the ultrasound emerging from the exit opening has a different amplitude relative to when it entered the input opening.
7. The apparatus as in ¶6, wherein the amplitude offset is used to modify the amplitudes of at least one transducer before emission.

8. The apparatus as in ¶3, wherein the exit openings are substantially co-planar.
9. The apparatus as in ¶8, wherein the audio is directed at an angle greater than 15 degrees from the normal to the plane.
10. The apparatus as in ¶8, wherein the audio is directed at an angle greater than 30 degrees from the normal to the plane.
11. The apparatus as in ¶8, wherein the audio is directed at an angle greater than 45 degrees from the normal to the plane.
12. The apparatus as in ¶8, wherein the audio is directed at an angle greater than 60 degrees from the normal to the plane.
13. The apparatus as in ¶6, wherein the amplitude offset is within 2 dB.
14. The apparatus as in ¶1, wherein the cavities consist of straight cylinders with a decreasing radius from input to exit opening.
15. The apparatus as in ¶14, wherein the wavelength is less than 9 mm.
16. The apparatus as in ¶14, wherein the pitch of the exit cavities is less than 6 mm.
17. The apparatus as in ¶2, wherein the phase offsets are stored in memory on the apparatus.
18. The apparatus as in ¶6, wherein the amplitude offsets are stored in memory on the apparatus.

II. Transducer Sub-Tiles of Different Chirality

Figure 15:
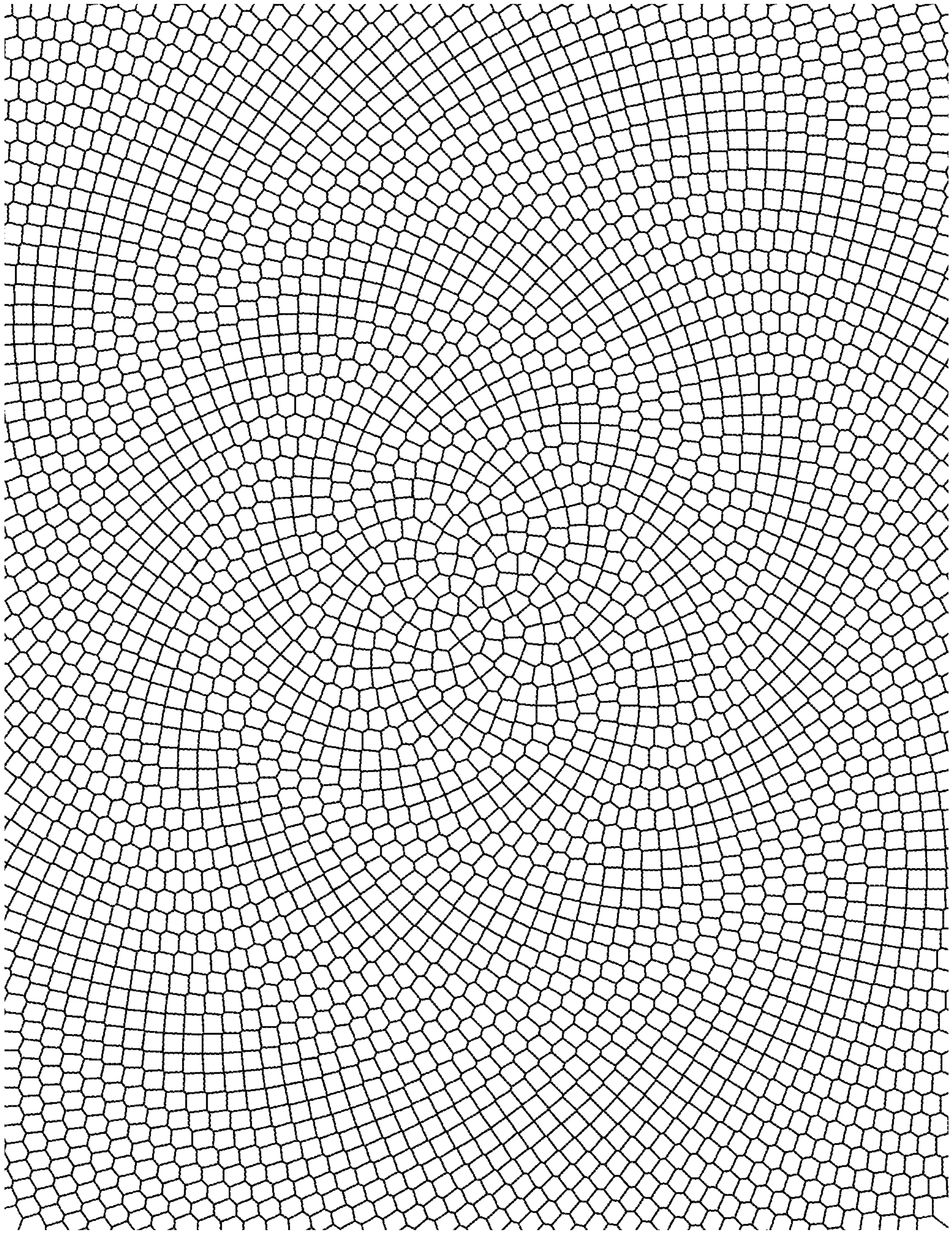
FIG. 15 shows a Voronoi diagram of a point set in a phyllotactic spiral.

Previous disclosures have described the phyllotactic spiral as an example of a non-uniform structure that splits the grating lobe structures into many pieces. However, for ease of manufacture it is difficult to use, as can be seen when looking at the Voronoi diagram of the point set 1500, as shown in FIG. 15.

As can be seen form this Voronoi diagram of a point set in a phyllotactic spiral, the 'seed shape' moves between a diamond-like shape and a hexagon-like shape in bands that appear to roughly follow the Fibonacci sequence in thickness. As there is no one single shape in the limit, it is clear that there is no one optimal transducer shape for a design based on this approach.

While the continuously changing shape of the Voronoi cells results in a reasonable design for an array of transducing elements which are non-resonant with a broadband response as the function of output will then vary little with this small change in shape, when narrowband resonant structures are considered, this would require careful tuning of each structure which is currently commercially infeasible. Resonant devices cover a large proportion of existing technologies, including devices based on the piezoelectric effect; passing electricity through crystal structures to create mechanical bending.

Figure 16:
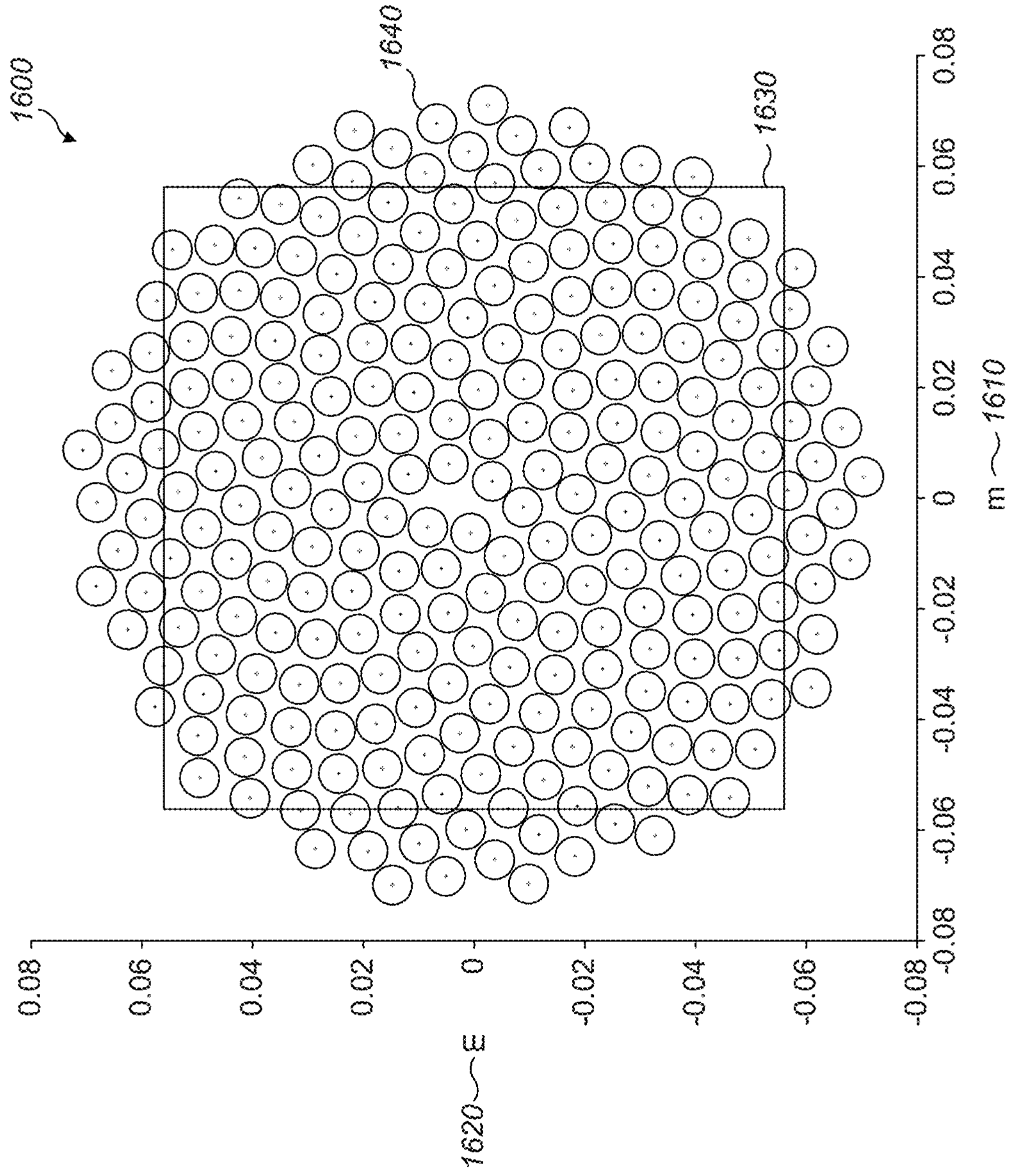
FIG. 16 shows a plot having circular transducers arranged in a phyllotactic spiral.

Shown in FIG. 16 is a plot 1600 showing circular transducers 1640 arranged in a phyllotactic spiral are relatively densely packed in the center square 1630, but circular transducers may be more expensive to manufacture. The x-axis 1610 is in meters; the y-axis 1620 is in meters. Previous disclosures have also shown how circular transducers may be arranged in a phyllotactic spiral as in FIG. 16, but to reduce cost transducers are more likely to have rectilinear elements in their design or layout.

Figure 17:
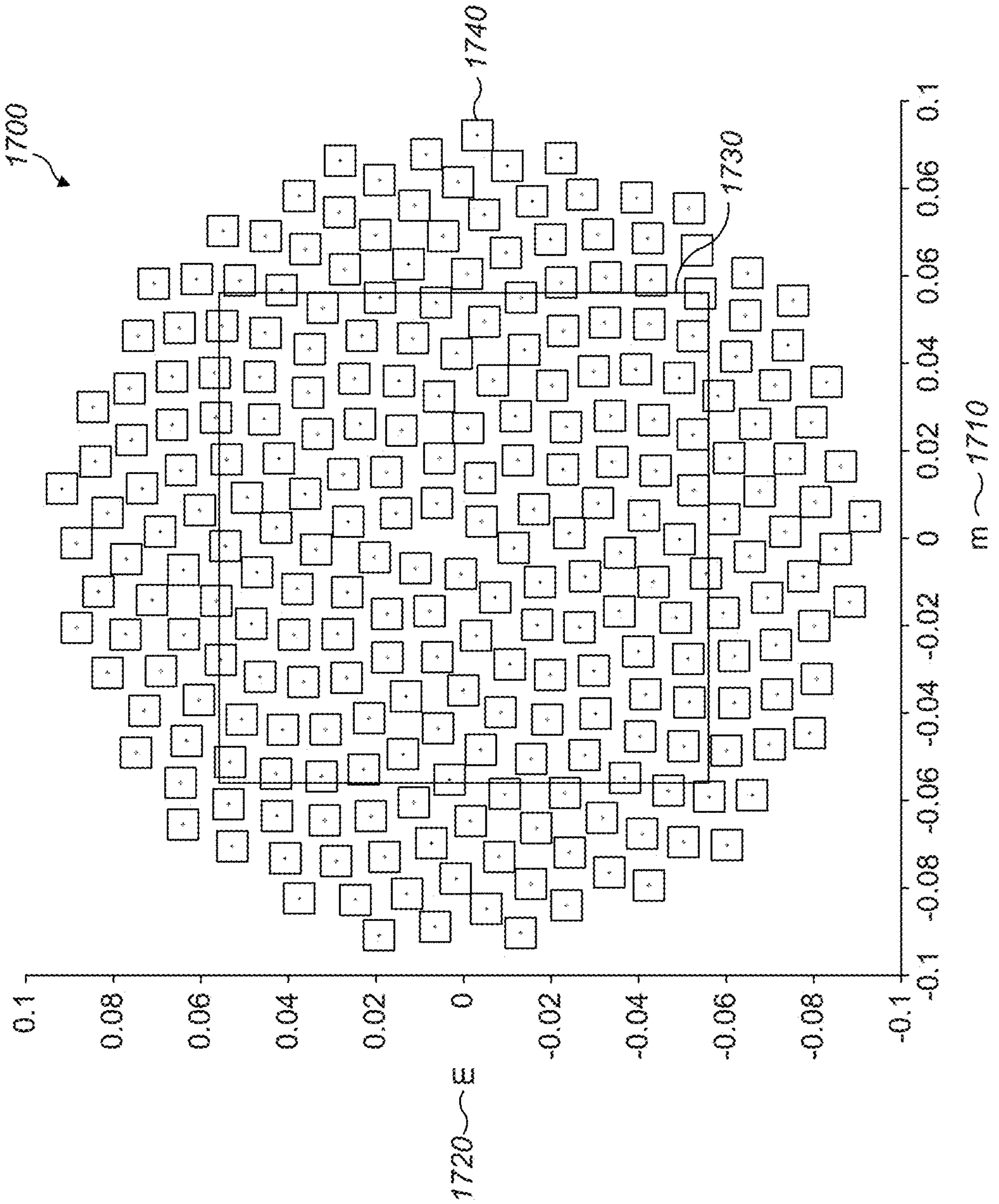
FIG. 17 shows a plot having square transducers arranged in a phyllotactic spiral.

Square transducers are more difficult to position as a simple arrangement that does not require rotation yields the arrangement shown in FIG. 17.

Shown in FIG. 17 is a plot 1700 showing square transducers 1740 arranged in a phyllotactic spiral that are relatively densely packed in the center square 1730. The x-axis 1710 is in meters; the y-axis 1720 is in meters. The result of a rectilinear positioning of square transducers in the configuration of a phyllotactic spiral. The uniform packing without gaps is overlaid as the larger square 1730.

Using singulated unit transducers in a phyllotactic arrangement, only allowing rectilinear alignment of the set of square transducers, results in a configuration that is over twice the area of the equivalent uniform square packing that has no wasted space. This is a problem, because the power output of the array is reduced by this factor per unit area. The greater the packing density, the less energy per unit area is lost to the unoccupied regions.

Figure 18:
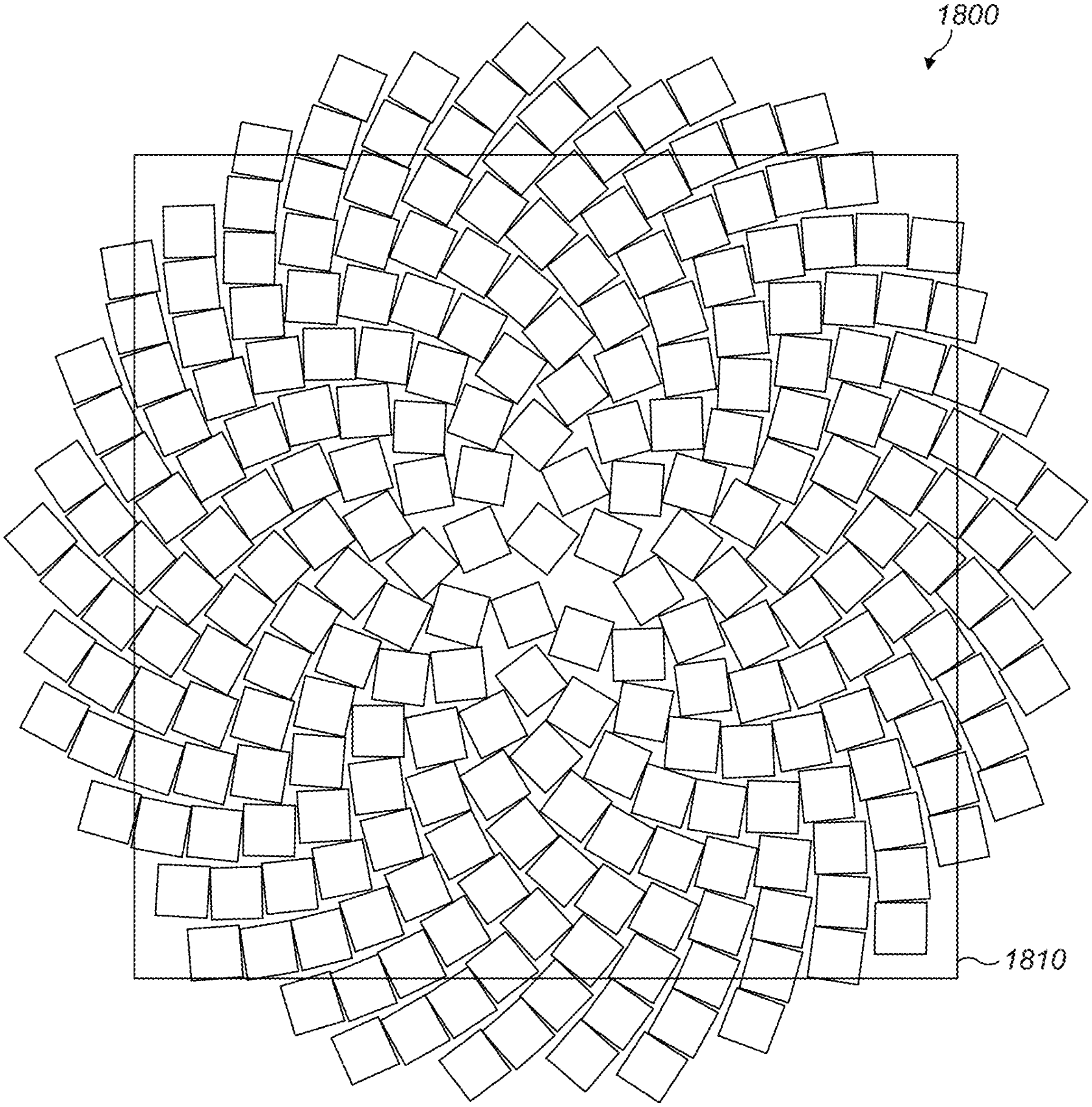
FIG. 18 shows a rectilinearly aligned arrangement of transducers.

This can be improved if the singulated units are allowed to rotate, breaking the rectilinearly aligned arrangement, as shown in FIG. 18. Here, the simulation 1800 shows results of positioning transducers with corners pointing towards the center of the spiral within square 1810. To increase the density further, the phyllotactic pattern has been built inwards and in cases where the square elements overlap, the angular position has been incremented until the overlap is resolved. The power has also been modified slightly downwards to an exponent of 0.4392 rather than the 0.5 that is more traditional to describe distance from the center. However, even in this configuration, there is around 40% extra area used over the densely packed alternative, leading to a drop in output at a focus from an area limited array of around 3 dB. As this is unwanted, finding an entirely dense packing of transducers is preferred. This would be beneficial from a manufacturing perspective as it could be designed to be produced as a sheet or roll. However, it is difficult to find a dense packing that also fulfils the requirement of a non-uniform arrangement.

A dense packing of transducers mounted on a surface is equivalent to a tiling of the plane. As the grating effects that need to be reduced or removed are effectively the result of wave phenomena interacting with the 'lattice' of transducer emission locations, so the effect can be determined ahead of time by taking the Fourier transform of the arrangement, yielding an equivalent to a modelled Bragg diffraction pattern. Then, to find a pattern that is effective, a 'lattice' of transducer emission locations must be found that has a weak and disperse Bragg diffraction pattern.

Figure 19:
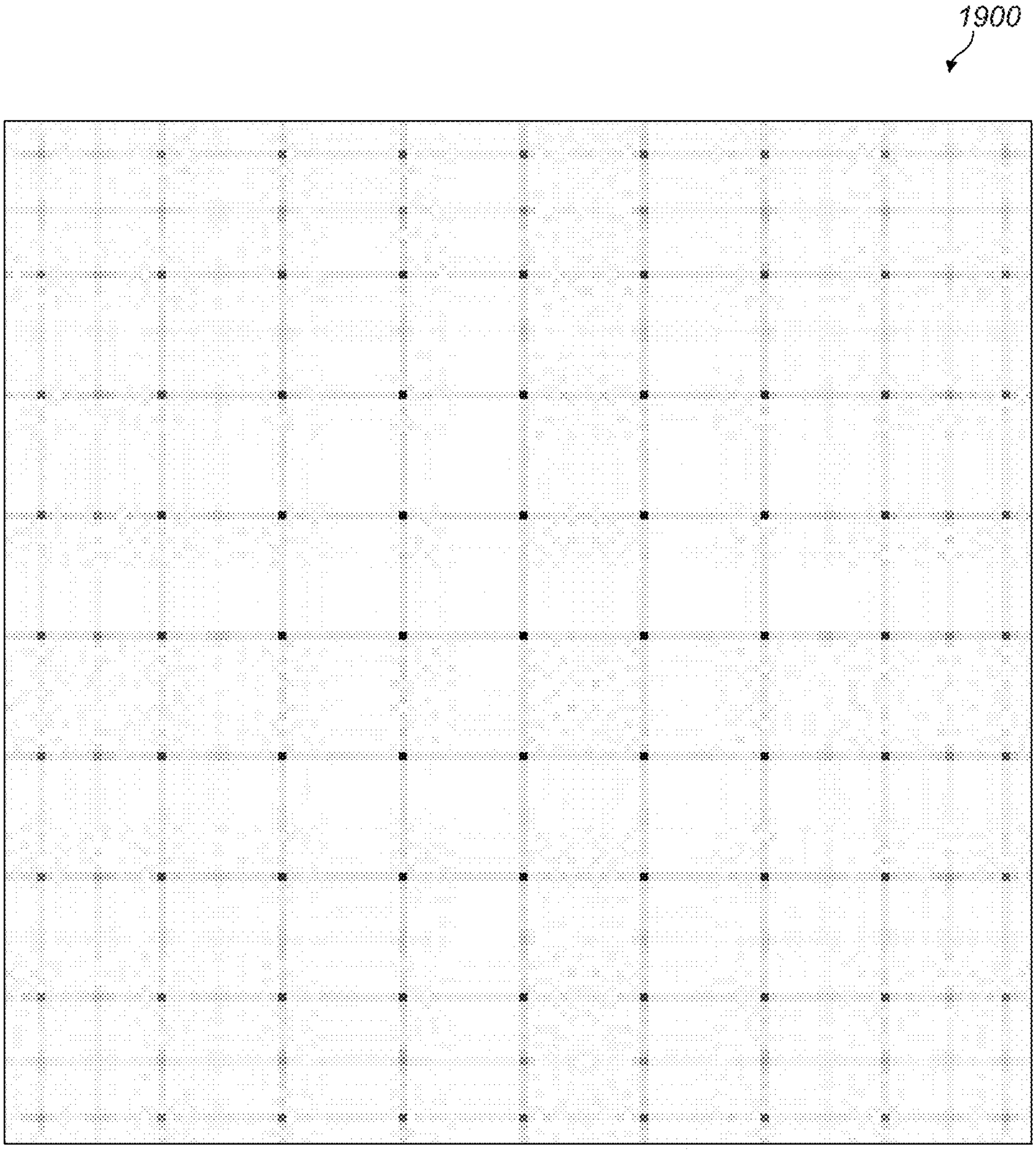
FIG. 19 shows a Bragg diffraction of a square lattice of transducer elements.

The Bragg diffraction of the rectilinear system yields the corresponding grating lobe configuration with the central focus surrounded by extra false images separated again by the rectilinear grid, as shown in FIG. 19. FIG. 19 shows a Bragg diffraction 1900 of a square lattice of transducer elements, showing the grating lobe configuration produced by this geometric layout.

As many interesting planar aperiodic tilings of the plane have been studied due to their properties as molecular models of crystalline systems and especially as models of quasi-crystals and mixtures of metals, there is literature that describes the Bragg diffractions of tilings as analogues of problems in X-ray crystallography. Due to this, considering the paper, Senechal, M. "Tilings, Diffraction and Quasicrystals", the most interesting two tiling systems studied alongside their Bragg diffractions are the binary and pinwheel systems for tiling the plane.

Figure 20:
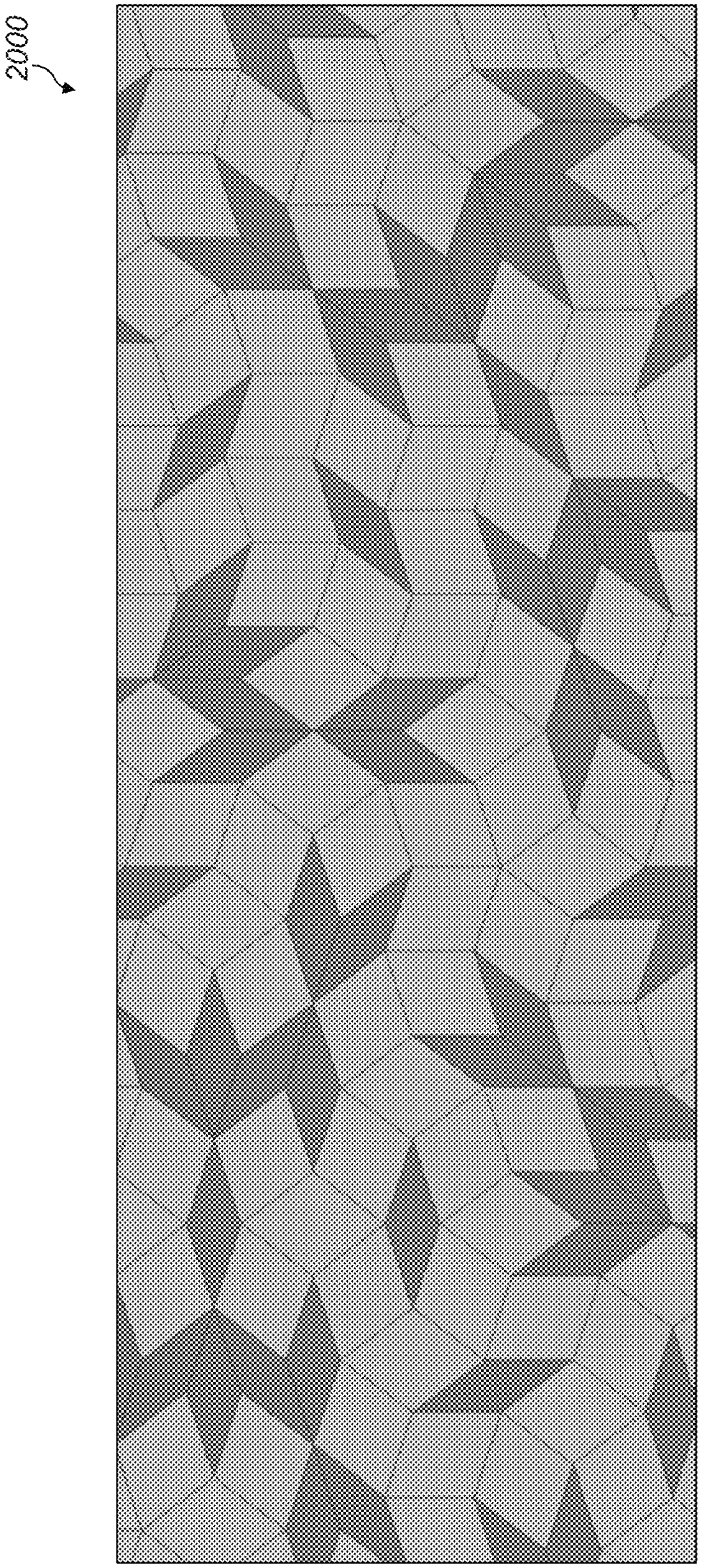
FIG. 20 shows binary tiling of transducers.

The first system considered is that of the 'binary' tiling, where transducing elements may take the two shapes of the fat and thin rhombus present in the tiling, as shown in FIG. 20. FIG. 20 shows "binary" tiling 2000. An aperiodic tiling with pentagonal symmetries, related to the Penrose rhombus tilings. Used originally to model chemical mixtures, it is made of two different types of rhombus'.

Figure 21B:
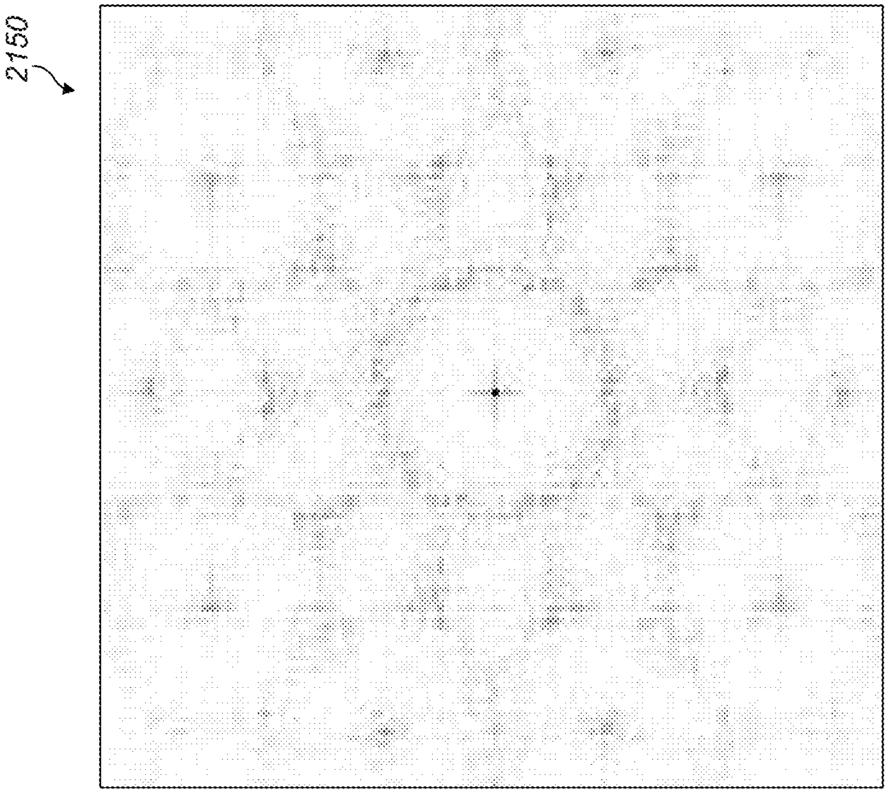
FIGS. 21A and 21B show Bragg diffractions of binary tiling.
Figure 21A:
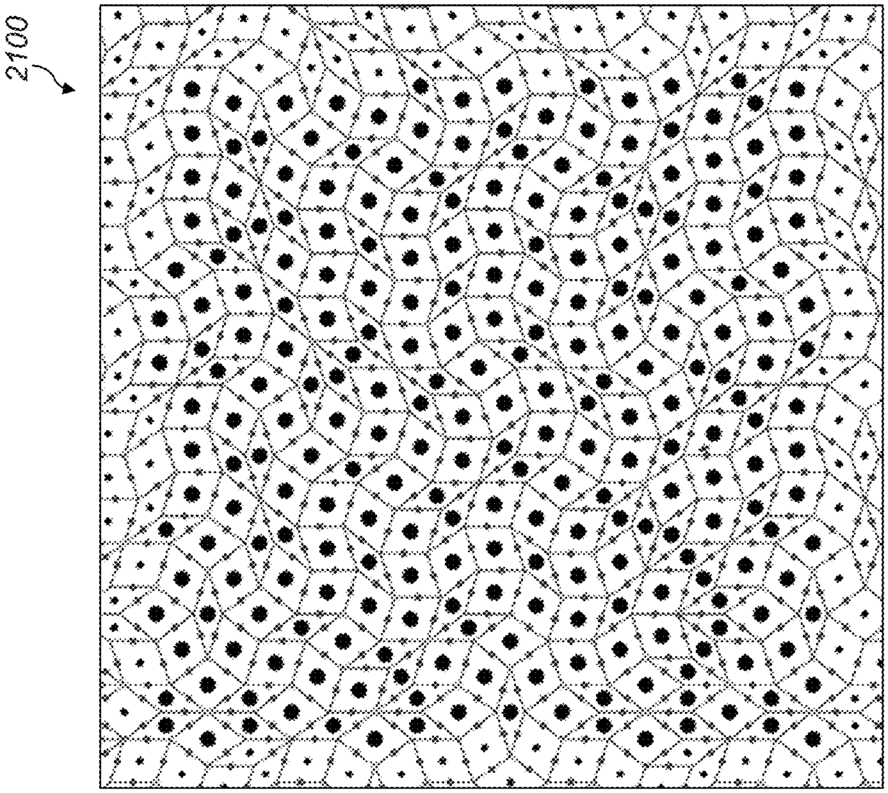

Shown in FIGS. 21A and 21B are Bragg diffraction of the "binary" tiling. FIG. 21A shows binary tiling and choice of elements 2100 for a potential transducer array. FIG. 21B shows five-fold pentagonal symmetry in the diffraction 2150 that appears here to be more decagonal symmetry. When considering the Bragg diffraction of the system shown in FIG. 21, it is mostly well spread out. However, manufacturing two different fat and thin rhombus transducer designs, in terms of their different acoustic properties, as well as tuning their frequency responses may prove time consuming and could involve different processes, e.g., thicknesses of bending structure. Furthermore, there is no pattern that can be easily tiled to construct larger sets of elements.

Figure 22B:
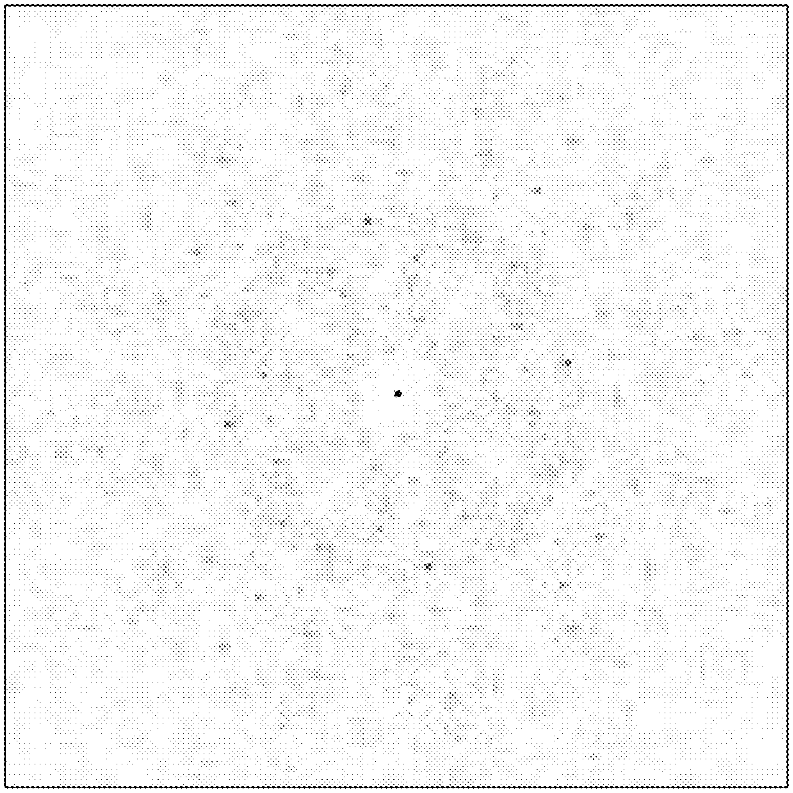
FIGS. 22A and 22B show pinwheel tiling and its Bragg diffraction.
Figure 22A:
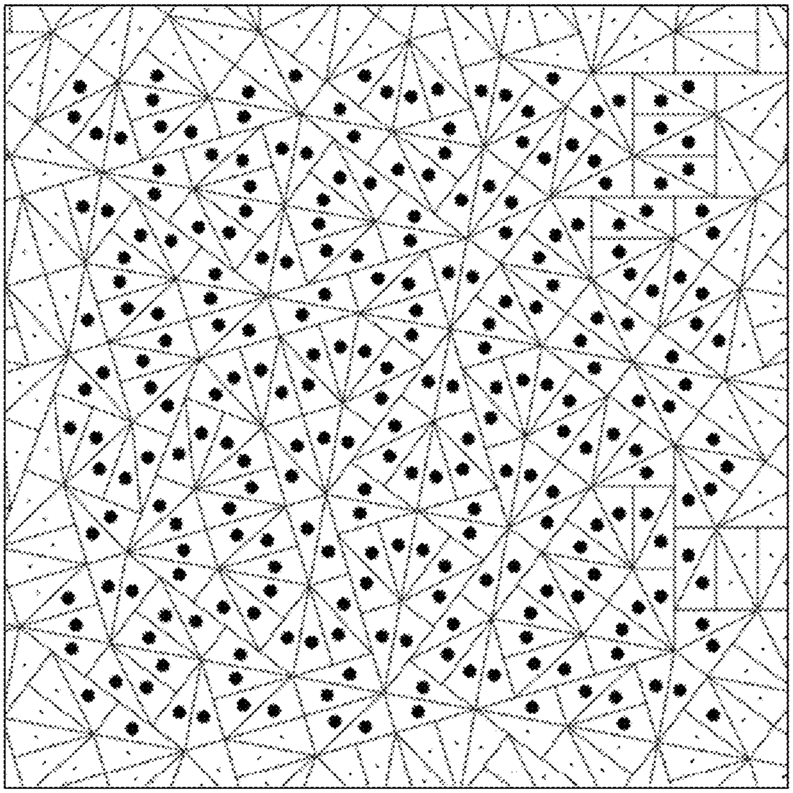

Shown in FIGS. 22A and 22B are pinwheel tiling and its Bragg diffraction. FIG. 22A shows pinwheel tiling 2200 and the element chosen as representative transducer tiles. FIG. 22B shows the Bragg diffraction 2250 of this configuration. This second system is the pinwheel tiling, where each transducing element is comprised of a right-angle triangle with sides measuring 1, 2 and √5 in ratio as shown in FIG. 22. As can be seen from the Bragg diffraction, the frequency distribution of elements of the pinwheel tiling is substantially disordered in the frequency domain. Of the two finalist tilings described earlier, this is more attractive for manufacture. This is firstly because there is only one species of shape to be produced in this design, but also secondly because the right-angled triangle can be realized as a rectangle with aspect ratio 1:2 cut diagonally, which can allow for manufacture in aspect ratio 1:2 rectangles and cut, allowing for processes for rectilinear elements to be used for the most part.

The pinwheel tiling is also a fractal in that there is a set of five right angle triangles with sides measuring ratios of 1, 2 and √5 which fit perfectly in the area of a single triangle of the same shape but with five times the area of one of these fitted triangles.

Figure 23:
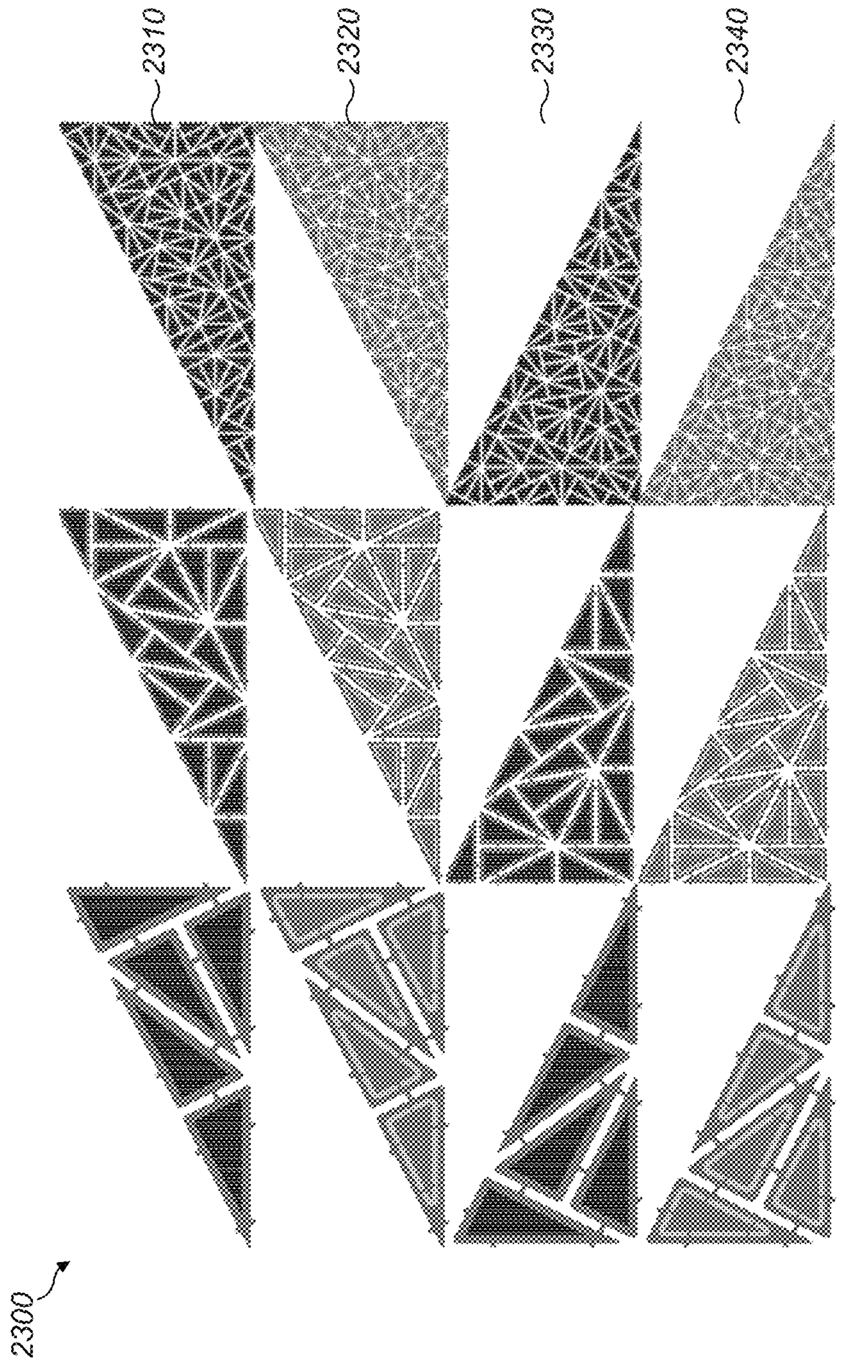
FIG. 23 shows a right-angled triangle motif present in the pinwheel fractal construction.

Shown in FIG. 23 are triangles 2300 that may also be set again inside of those, any integer power of five may be constructed into a right-angle triangle in this way (5, 25, 125, etc.), to produce a larger array in the shape of the right-angled triangle motif present in the pinwheel fractal construction. These are designs for left- and right-handed triangular arrays. The top-most 2310 and mid-bottom 2330 rows show possible piezoelectric material positioning while the mid-top 2320 and bottom-most 2340 rows show potential top plate structures.

Also shown are the left and right chiral constructions of the fractal pinwheel tiling, and also shown is the format that allows for complete structures to be potentially fabricated from a single sheet or attached together at the points shown. Further shown are lightly shaded locations to which a vibrating plate may be attached to generate a wave or may alternatively topologically illustrate a potential method to choose vent locations. If they are manufactured singly, then these right-angle triangle fractal tiles have the drawback that they do not use an equal number of left and right-handed right angle single elements, which may cause logistical difficulties if not considered.

Figure 24:
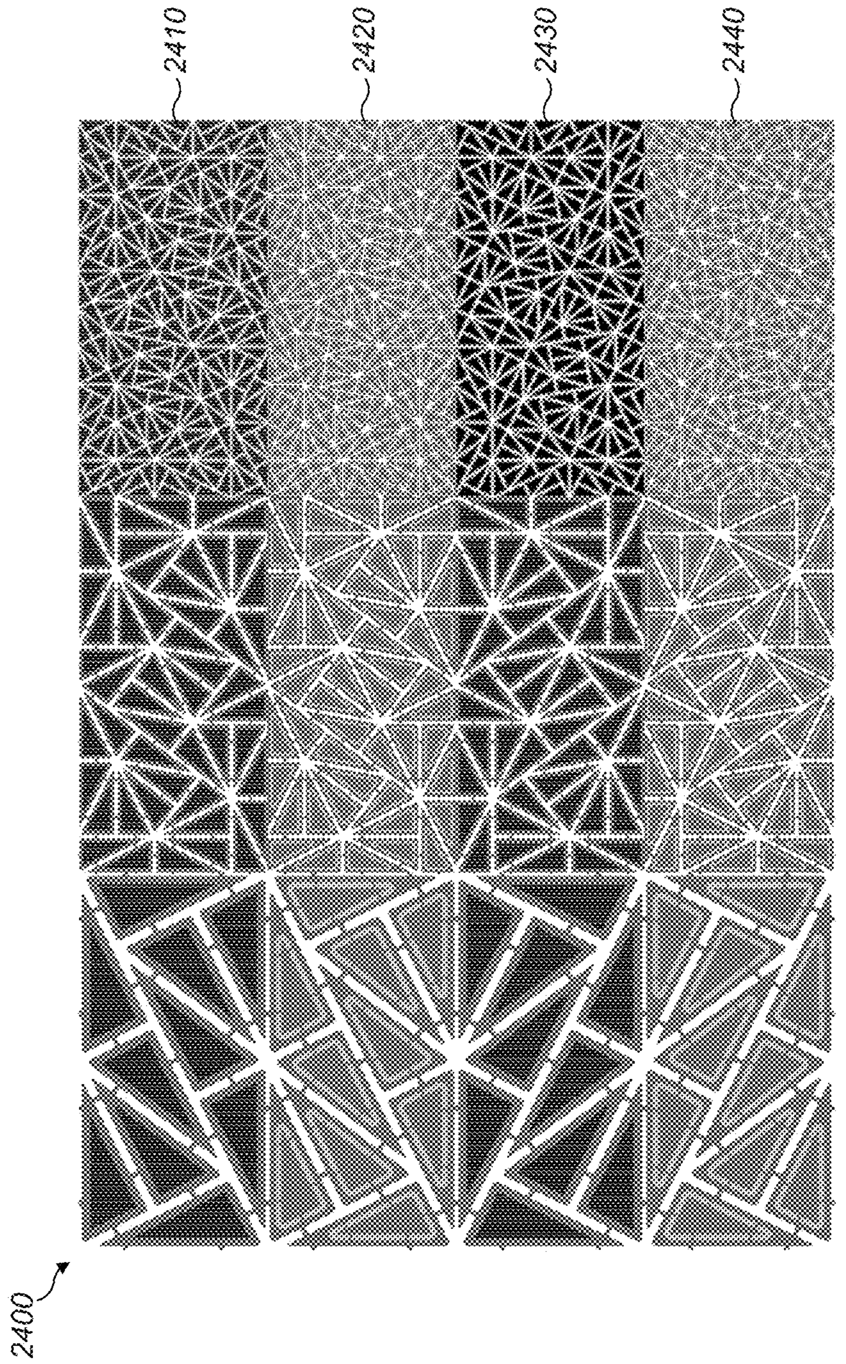
FIG. 24 shows rectangular arrays designs for left- and right-handed 'domino' arrays having 1:2 aspect ratio.

The larger fractal tiles which by nature also have sides measuring ratios of 1, 2 and √5 may be reconstructed into rectangular arrays with 1:2 aspect ratio as shown in FIG. 24. FIG. 24 shows designs 2400 for left- and right-handed 'domino' arrays. The name 'domino' is appropriate because the configuration is involved in a related tiling pattern colloquially named 'kite & domino' (and kite shaped arrays may instead be created by flipping the direction of one of the two right angle triangle array elements along their shared hypotenuse, to produce arrays with the same number of elements). The top-most 2410 and mid-bottom 2430 rows show possible piezoelectric material positioning while the mid-top 2420 and bottom-most 2440 rows show potential top plate structures.

These arrays may contain an integer power of five multiplied by two elements (10, 50, 250 etc.) as shown and because they are purely asymmetric must require an equal number of left and right-handed triangles. This is preferable in the case of single element manufacture, as there are then fewer special cases to consider during processing.

Figure 25:
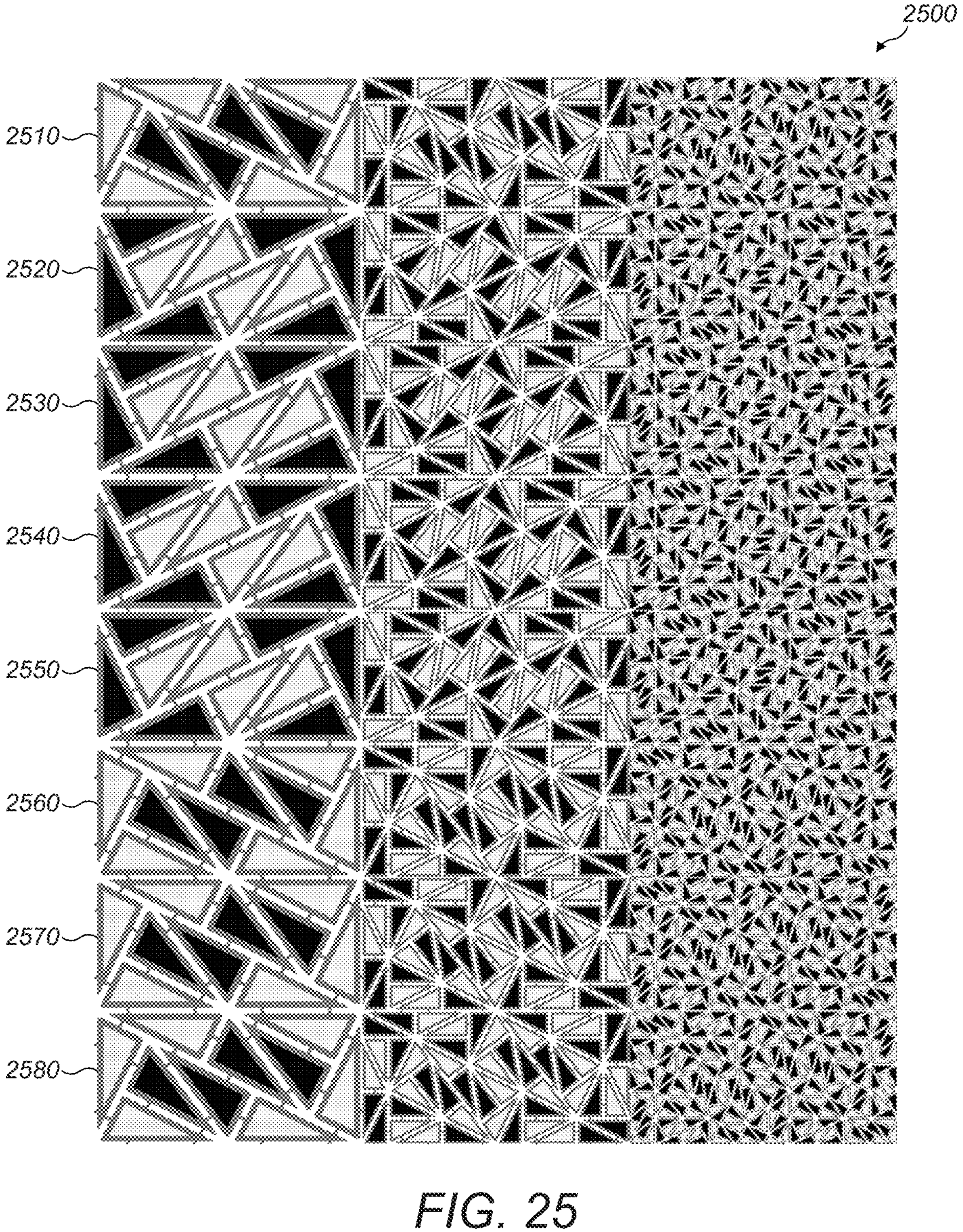
FIG. 25 shows designs for four variants of the 'square' arrays.

FIG. 25 shows designs 2500 for all four variants of the 'square' arrays. Notice that the achiral antisymmetric designs require very different numbers of left- and right-handed elements which are highlighted via the difference in shading between single elements.

From these rectangular sub-tiles of different chirality 2510 2520 2530 2540 2550 2560 2570 2580 shown in FIG. 25, there may be four different square array configurations symmetric and asymmetric variants of a left- and right-handed configuration. However, there is a trade-off in that the asymmetric variant uses a different number of individual elemental left and right chirality transducers, but only left sub-tiles, but the symmetric variants uses left and right sub-tiles, but an equal number of left and right elements. These effects may be traded off to achieve an optimized manufacturing procedure depending on the relative cost of each step in the required processing. These square arrays result in an element count that is four multiplied by an integer power of five elements (20, 100, 500, etc.). The result of this is that either left and right sub-tiles must be manufactured, or the amount of piezoelectric crystal pieces consumed with different chirality is different, although with a native pinwheel tiling piezoelectric crystal cutting approach this would not be a problem.

These aforementioned array tiling designs should not preclude any partial tessellations as produced by taking a subsection of the pinwheel tiling to use for its superior diffraction characteristics.

The one remaining barrier to this design is that if the edges of the transducing element are clamped and there is a boundary condition, the structure bonded to the piezoelectric crystal may not flex with sufficient displacement to produce efficient output.

Figure 26:
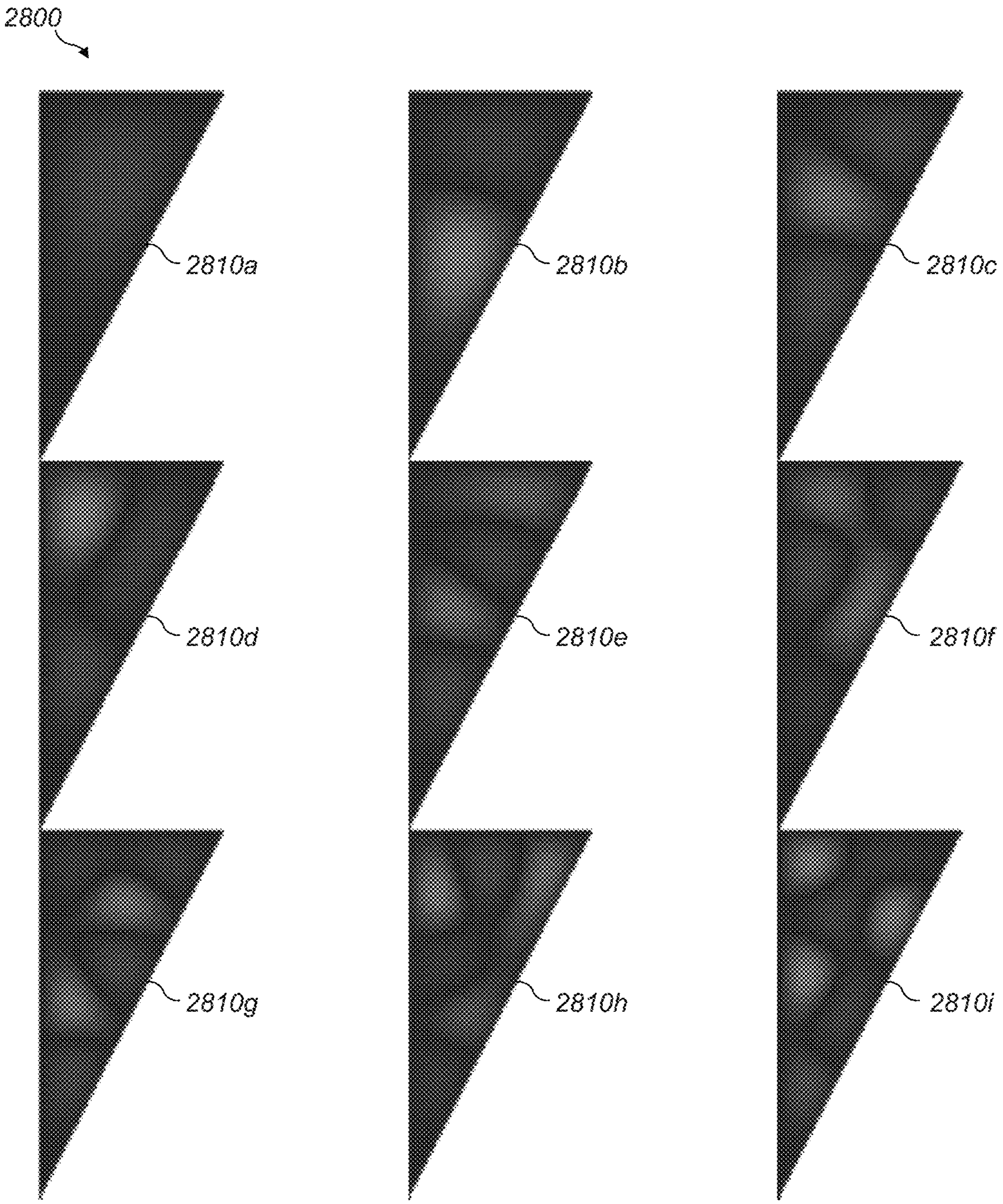
FIG. 26 shows a simulation of eigenmodes using the Helmholtz equation.
Figure 27:
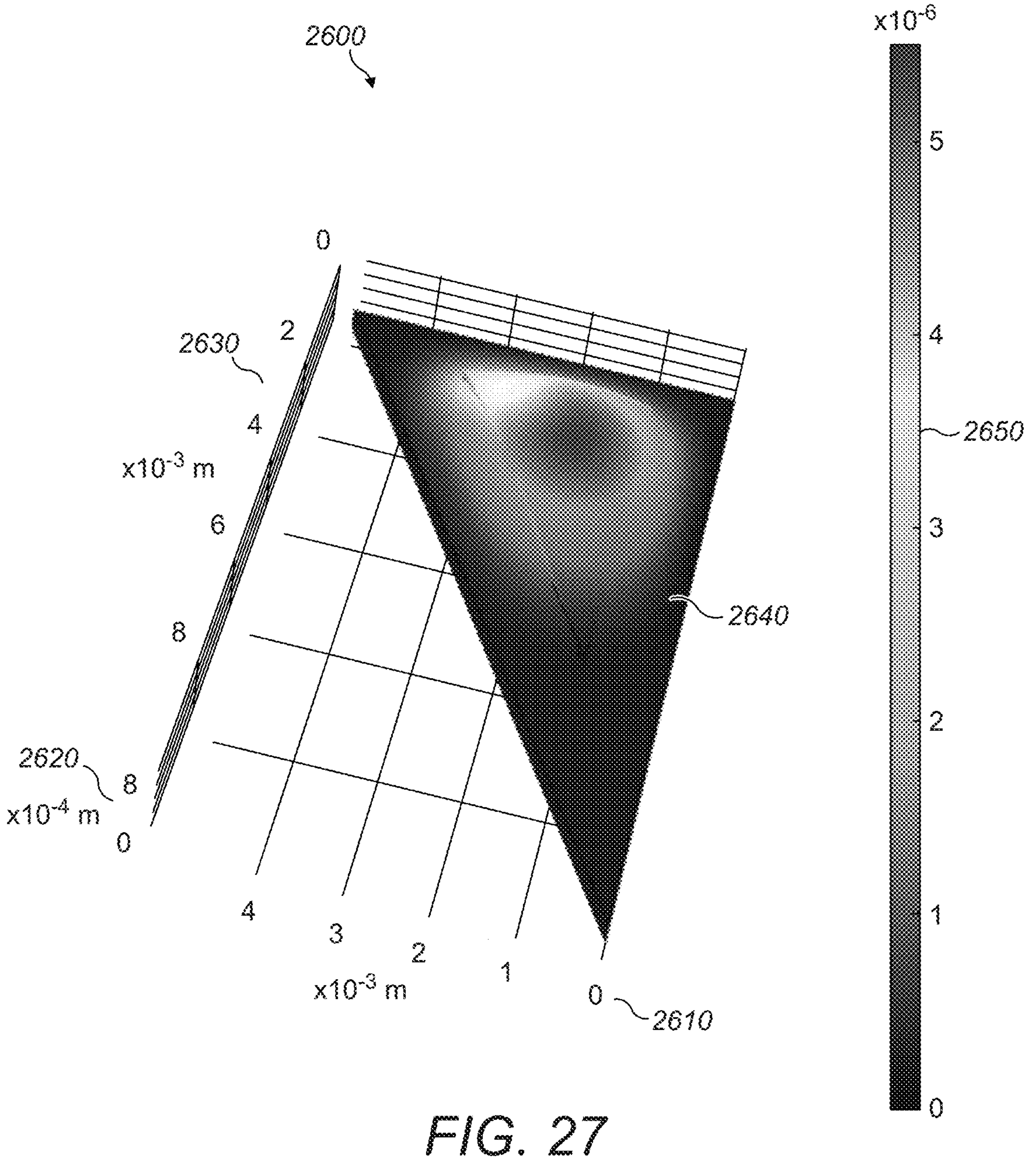
FIG. 27 shows a simulation of maximum z-deflection for a bending mode of piezoelectric actuator.

By simulating the eigenmodes using the Helmholtz equation as shown in FIG. 26 we can consider the displacement generated by a unit impulse. Simulating the displacement of a piezoelectric plate makes it clear that it is viable to create a piezoelectric transducer that fits the desired shape, as shown in FIG. 27. Cutting a slot makes the displacement increase, but decreases the resonant frequency as shown in FIG. 28.

Specifically, FIG. 26 shows eigenmodes 2800 of the solutions to the Helmholtz equation on the triangle 2810*a* 2810*b* 2810*c* 2180*d* 2180*e* 2180*f* 2180*g* 2180*h* 2180*i* which yield the harmonic modes of vibration. For each mode, the shape of the Helmholtz solution may be extrapolated to describe the acoustic far field actuated by the mode. This may also be used in reverse, as a pattern of directivity of a receiving element at a similar frequency. As it can be seen that each mode may generate a field that is complicated, taking the combination of multiple harmonics spanning different frequencies, the reception or transmission into the far field can identify spatial offsets into the far field, especially in angle, which may be parameterized into azimuth and elevation. Due to the nature of the asymmetry in the individual transducer element this is possible, but the effect may be strengthened further by coupling this with the irrational and non-repeating frequency behavior of the tiling. By actuating and/or receiving using these shapes, their tilings and their harmonics, potentially across multiple elements, exact positions of objects intersecting the far field of the acoustic generated by such an element or group of elements may be deduced by algorithmically or otherwise examining signals received by these elements or by microphones. Equally, the signal may be emitted by a simple transducer and received by an array such as is earlier described. The result of this is that by using all of the harmonics and receiver can track its angular location relative to potentially even an individual transducer.

Shown in FIG. 27 is a simulation 2600 of maximum z-deflection for bending mode of piezoelectric actuator in the right-angle triangle shape 2640 for insertion into the pinwheel tiling. The x-axis 2610 is in millimeters; the y-axis 2630 is in millimeters; the z-axis 2620 is in micrometers. The scaling is shown on the right bar 2650.

Figure 28:
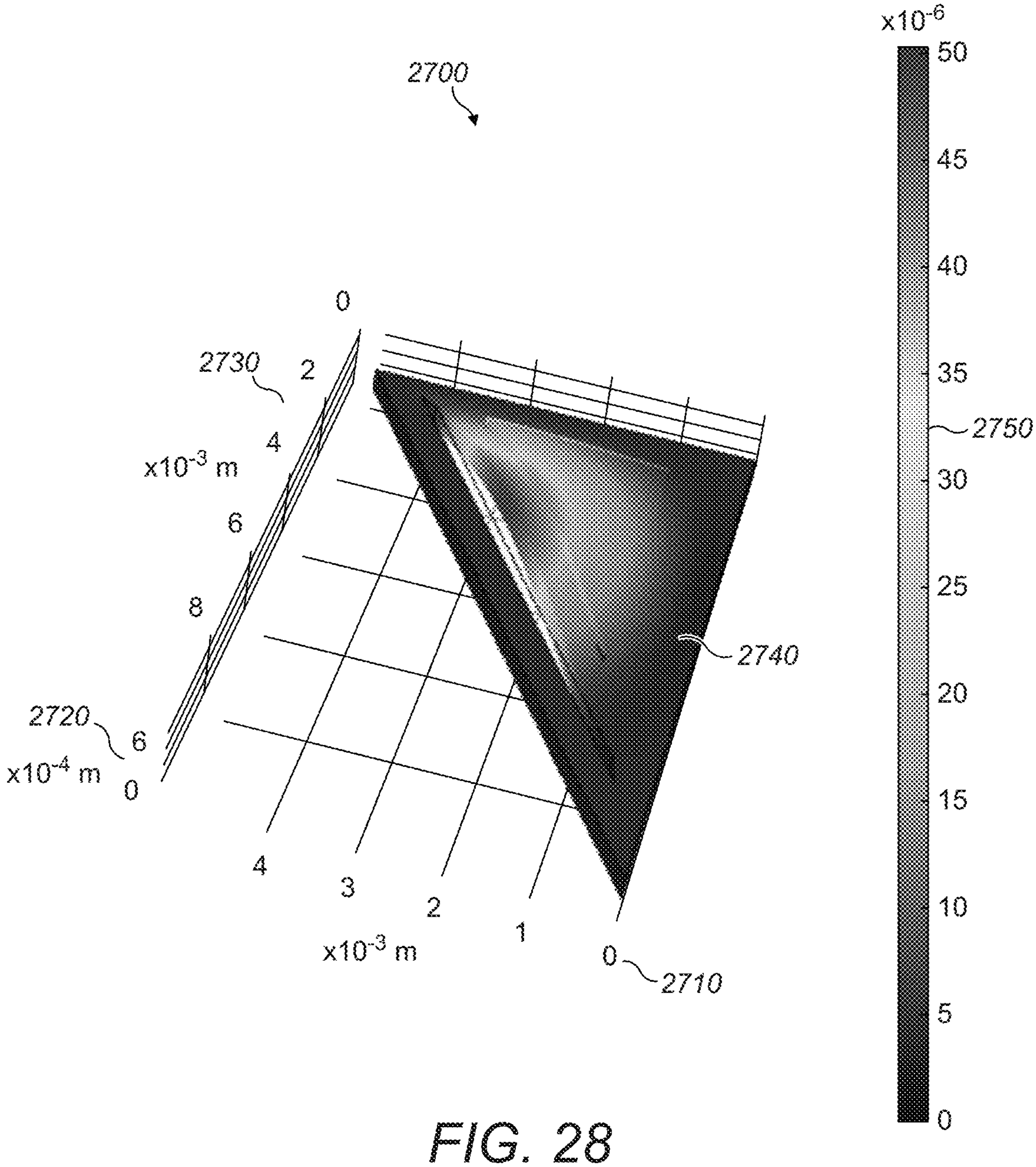
FIG. 28 shows a simulation of maximum z-deflection for a bending mode of piezoelectric actuator.

Shown in FIG. 28 is a simulation of maximum z-deflection for bending mode of piezoelectric actuator in the right-angle triangle shape 2740 for insertion into the pinwheel tiling. This has a slot cut to accentuate the bending mode but reducing the resonant frequency of the tile. The x-axis 2710 is in millimeters; the y-axis 2730 is in millimeters; the z-axis 2720 is in micrometers. The scaling is shown on the right bar 2750.

As any device that behaves with the correct center of mass may make use of this tiling procedure, it is in this case only required to create a wave generating technology with this physical footprint. The exact technology is not required to be piezoelectric transducing elements, and may be electrostatic, MEMs, CMUTs, PMUTs or any other prevailing technology or process. This invention may be applied to any transducer process to produce a complete or partial spatial packing of a two-dimensional plane with substantially reduced or eliminated element-to-element gaps.

Additional disclosure includes: 1. An array of triangular transducers wherein the locations of physical features can be described by barycentric coordinates applied to a triangle with sides forming the ratio 1:2:√5.

2. The array of ¶1, wherein the transducers comprise acoustic transducers.
3. The array of ¶1, wherein the transducers comprise an array of antennae for beamforming electromagnetic signals.
4. The array of ¶1, wherein the triangles whose sides form the ratio 1:2:√5 to which the barycentric coordinates are applied to yield the feature locations are themselves subdivisions of other triangles whose sides form the ratio 1:2:√5.
5. An array comprising one or more tiles of transducers each comprised of many square transducers in a partial phyllotactic spiral pattern wherein two opposite corners of the transducer and a point in space common to the acoustic transducer elements on the tile are collinear.
6. The array of ¶5, wherein the transducers comprise acoustic transducers.
7. The array of ¶5, wherein the transducers comprise an array of antennae for beamforming electromagnetic signals.
8. The array of ¶5, wherein the common point in space collinear to opposite corners of each transducer does not lie on the tile of transducer elements.
9. A device comprising one or more asymmetric transducers, wherein the field generated at a plurality of frequencies from a plurality of stable asymmetric resonant modes is used to localize a transducer detecting the field at a plurality of frequencies.
10. The device of ¶9, wherein the transducers comprise acoustic transducers.
11. The device of ¶9, wherein the transducers comprise an array of antennae for beamforming electromagnetic signals.
12. The device of ¶9, wherein the transducer is of a triangular shape, wherein the locations of physical features can be described by barycentric coordinates applied to a triangle with sides forming the ratio 1:2:√5.
13. The device of ¶9, wherein the transducer detecting the field is also an asymmetric transducer with a plurality of stable asymmetric resonant modes which are capable of detecting the field at a plurality of frequencies.
14. The device of ¶9, wherein the acoustic field detected using a plurality of stable asymmetric resonant modes at a plurality of resonant frequencies of the detector may be any arbitrary acoustic field.

III. Transducer Placement Using Recursive Techniques

Square shaped transducers are ideal for rectilinear arrangements resulting in zero wasted area. They can suffer from grating lobes, however, if they are of comparable size to the emitted wavelength. Placing square transducers into a phyllotactic spiral can break up secondary foci but necessities a reduction in packing density of at least 40%. To achieve the 40% parameter, individual transducers need to be singulated which increases cost of manufacture.

The invention presented here details a recursive technique to adjust the placement of square transducers in order to achieve an adjustable balance between packing density and effectiveness of reducing grating lobe magnitude.

Figure 29:
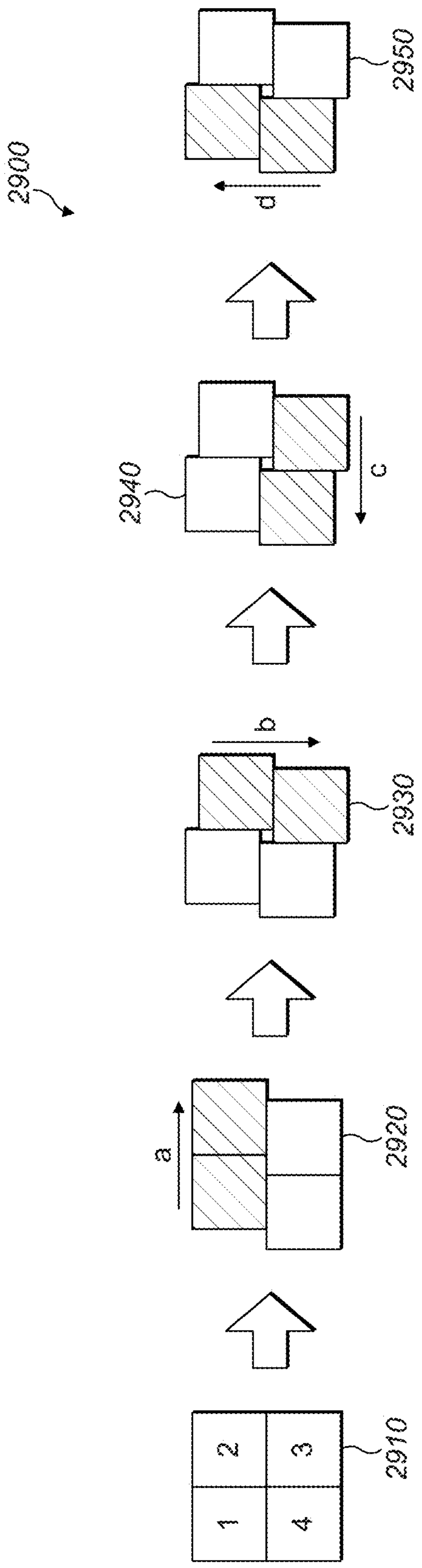
FIG. 29 shows a simulation that details the basic steps for arranging a square unit cell into a new arrangement.

Shown in FIG. 29 is a simulation 2900 that details the basic steps for arranging a square unit cell into a new arrangement. Starting with rectilinear placing 2910, cells 1 and 2 are displaced to the right by an amount 'a' 2920. Next, unit cells 2 and 3 are adjusted down by amount 'b' 2930. This is followed by 3 and 4 moving left by 'c' 2940 and 1 and 4 moving up by 'd' 2950. With the size of one edge of the square unit cell given by 2r, this changes the location of unit cell centers to:

Unit 1=[−r+a,r+d]
Unit 2=[r+a,r−b]
Unit 3=[r−c, −r−b]
Unit 4=[−r−c, −r+d], where the notation is given by [x-location, y-location]. Careful choices of the adjustment parameters (a,b,c,d) can give arrangements of all the elements which breaks symmetry.

Figure 30:
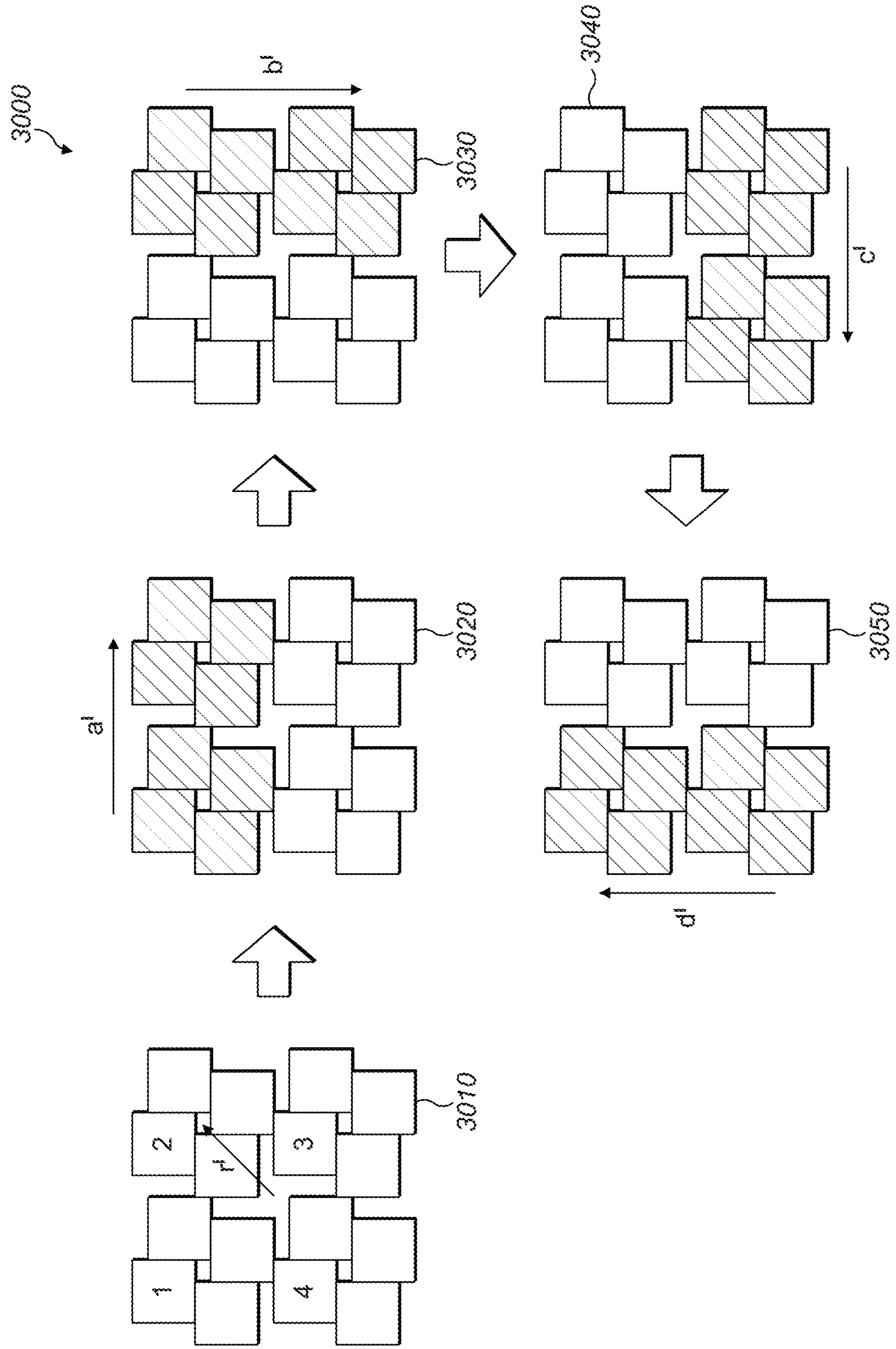
FIG. 30 shows a simulation that illustrates how FIG. 29 may be recursively extended to build larger arrays of elements.

Shown in FIG. 30 is a simulation 3000 that illustrates how this method is recursively extended to build larger arrays of elements. Specifically, this is an illustration of a 4×4 tile recursively enumerated into a 16×16 element array 3010. The offset values (a' 3020, b' 3030, c' 3040, d' 3050) can be repeated from the previous round of recursion or generated anew.

Figure 31:
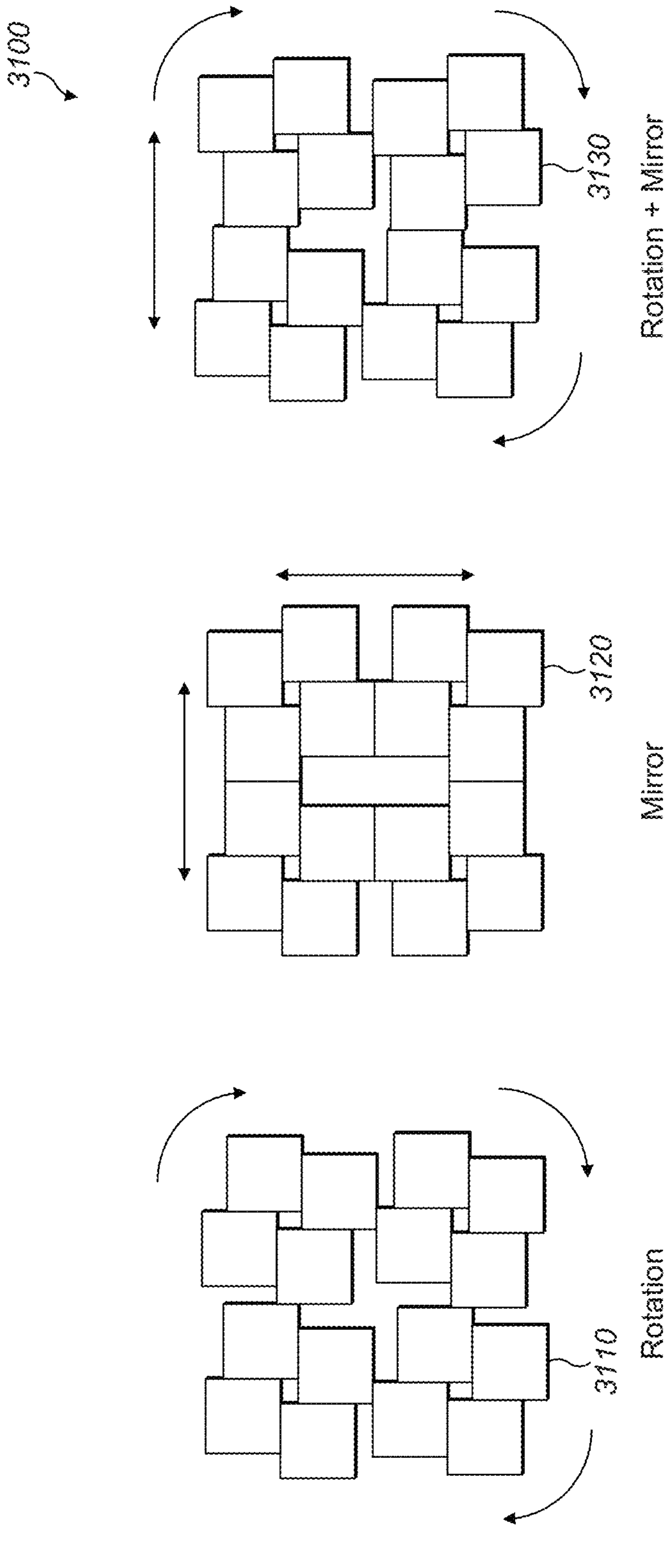
FIG. 31 shows a simulation that illustrates variation possibilities provided by rotation or mirroring or both.
Figure 32A:
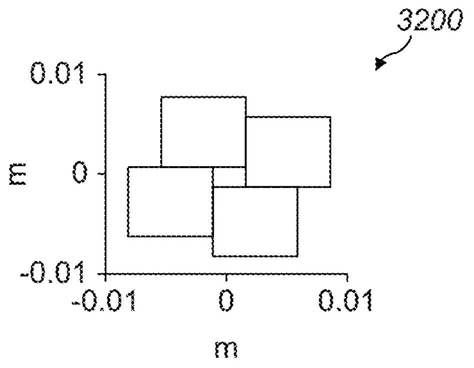
FIGS. 32A, 32B, 32C, and 32D show an example element array of square transducers constructed using rotation.
Figure 32B:
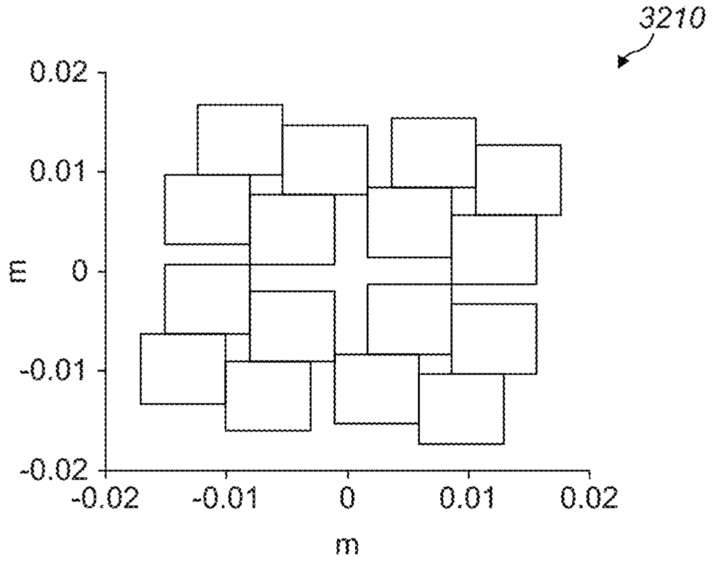
Figure 32C:
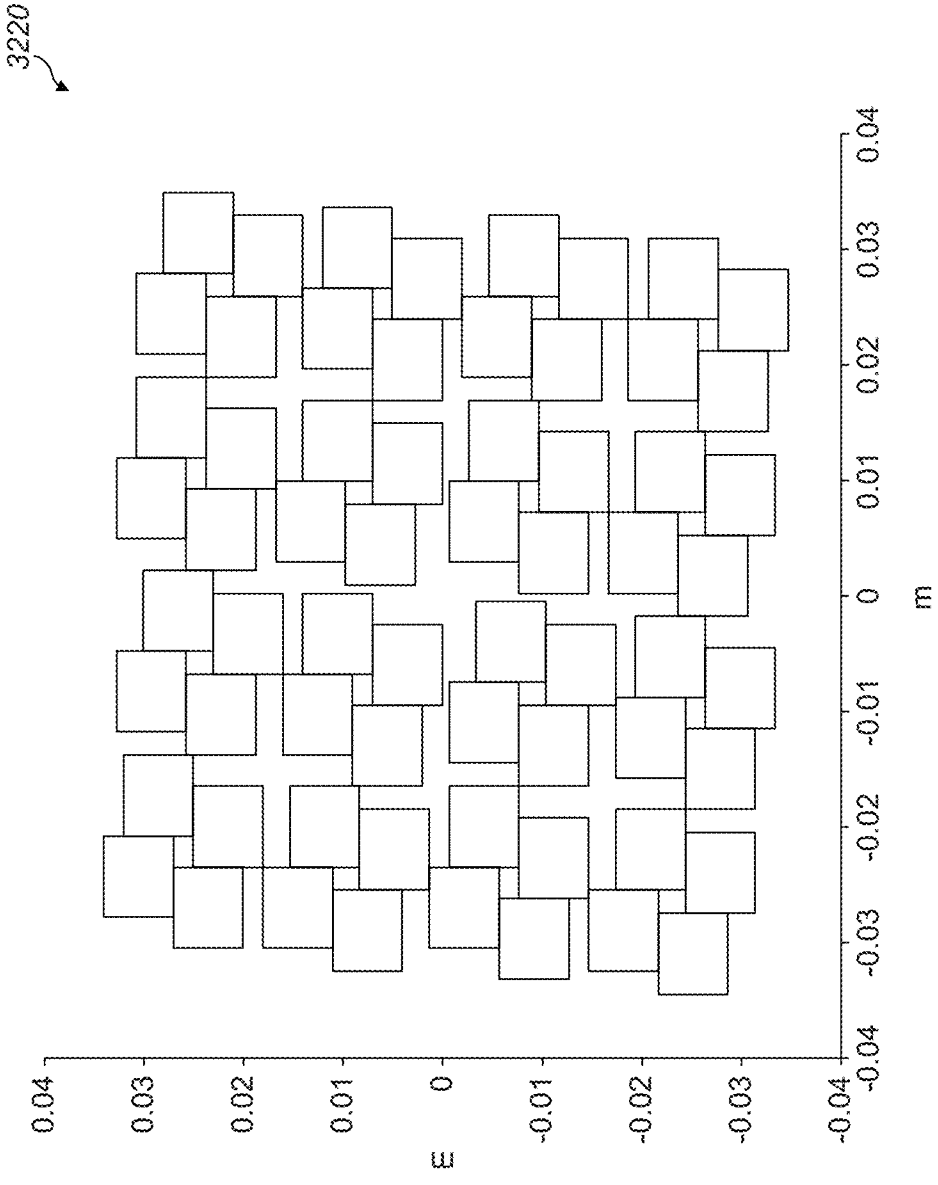
Figure 32D:
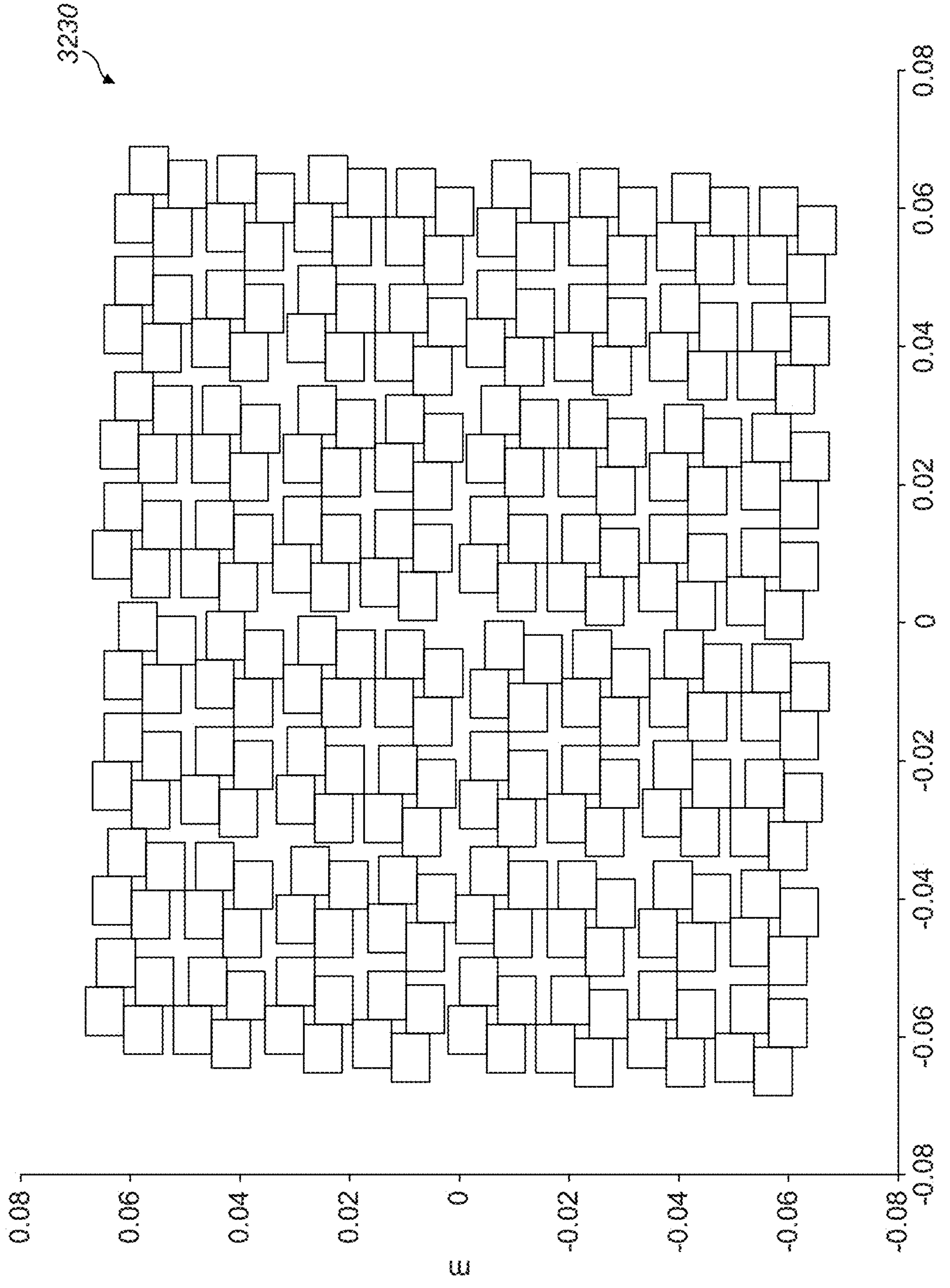
Figure 33A:
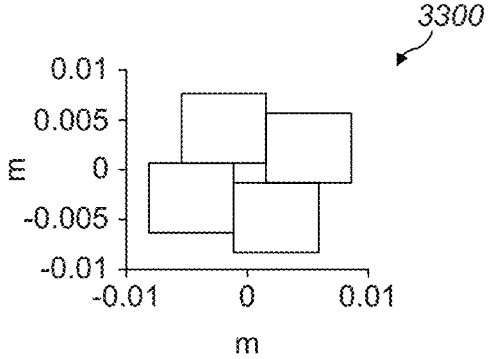
FIGS. 33A, 33B, 33C, and 33D show an example element array of square transducers constructed using mirroring.
Figure 33B:
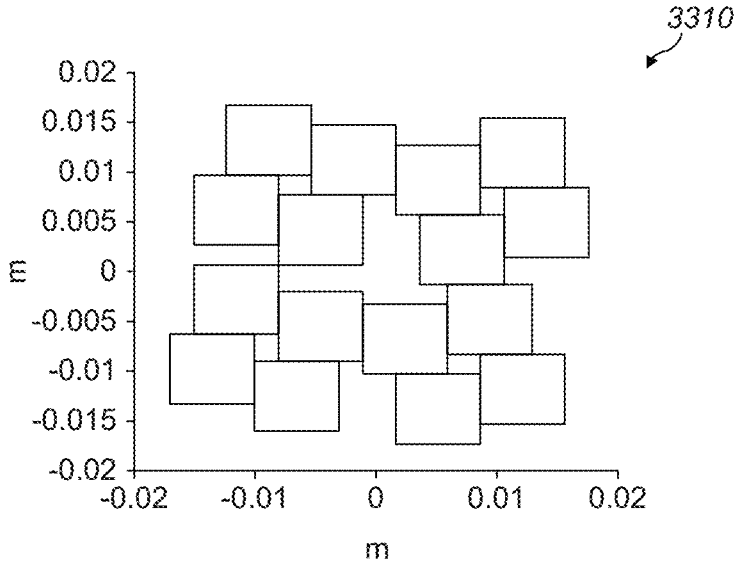
Figure 33C:
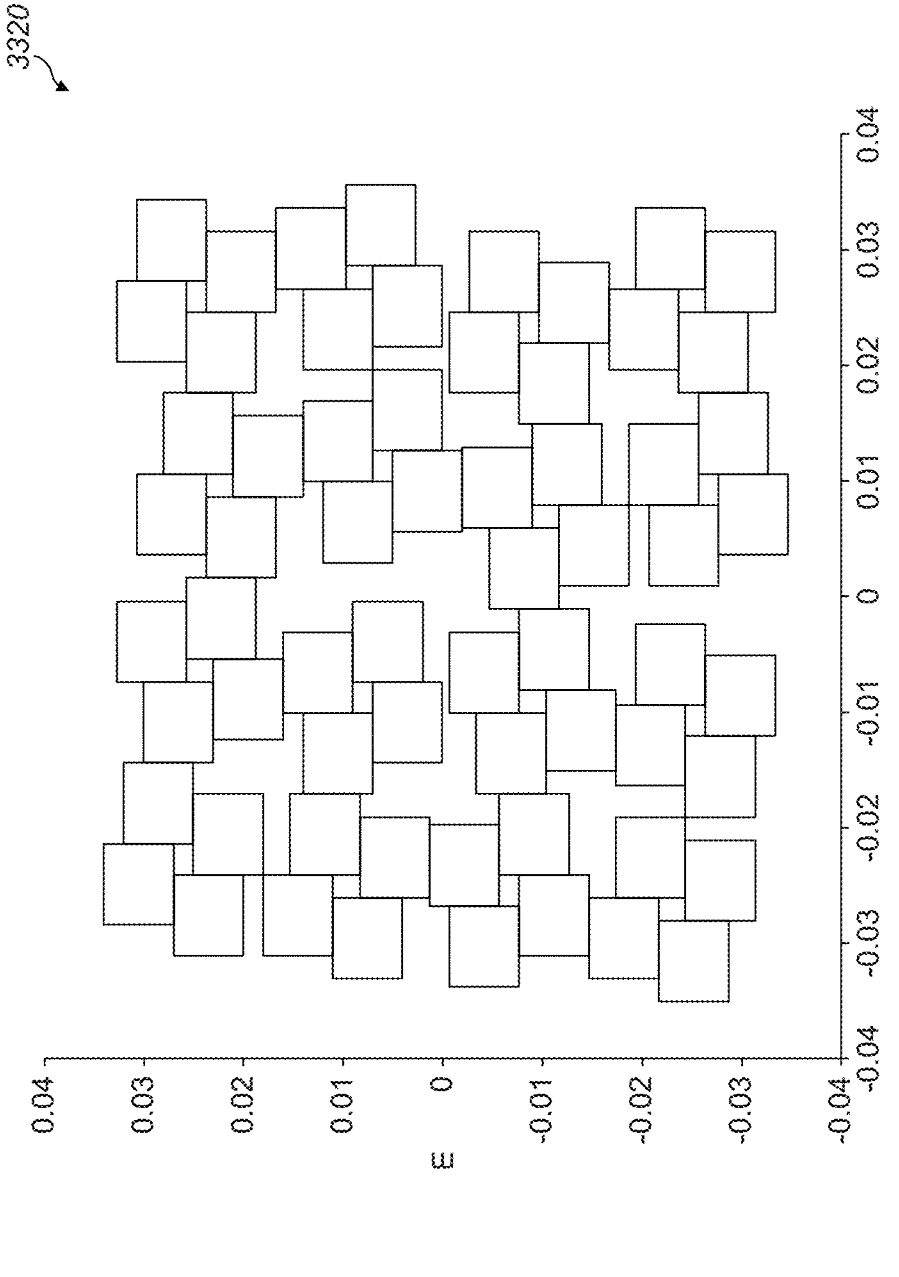
Figure 33D:
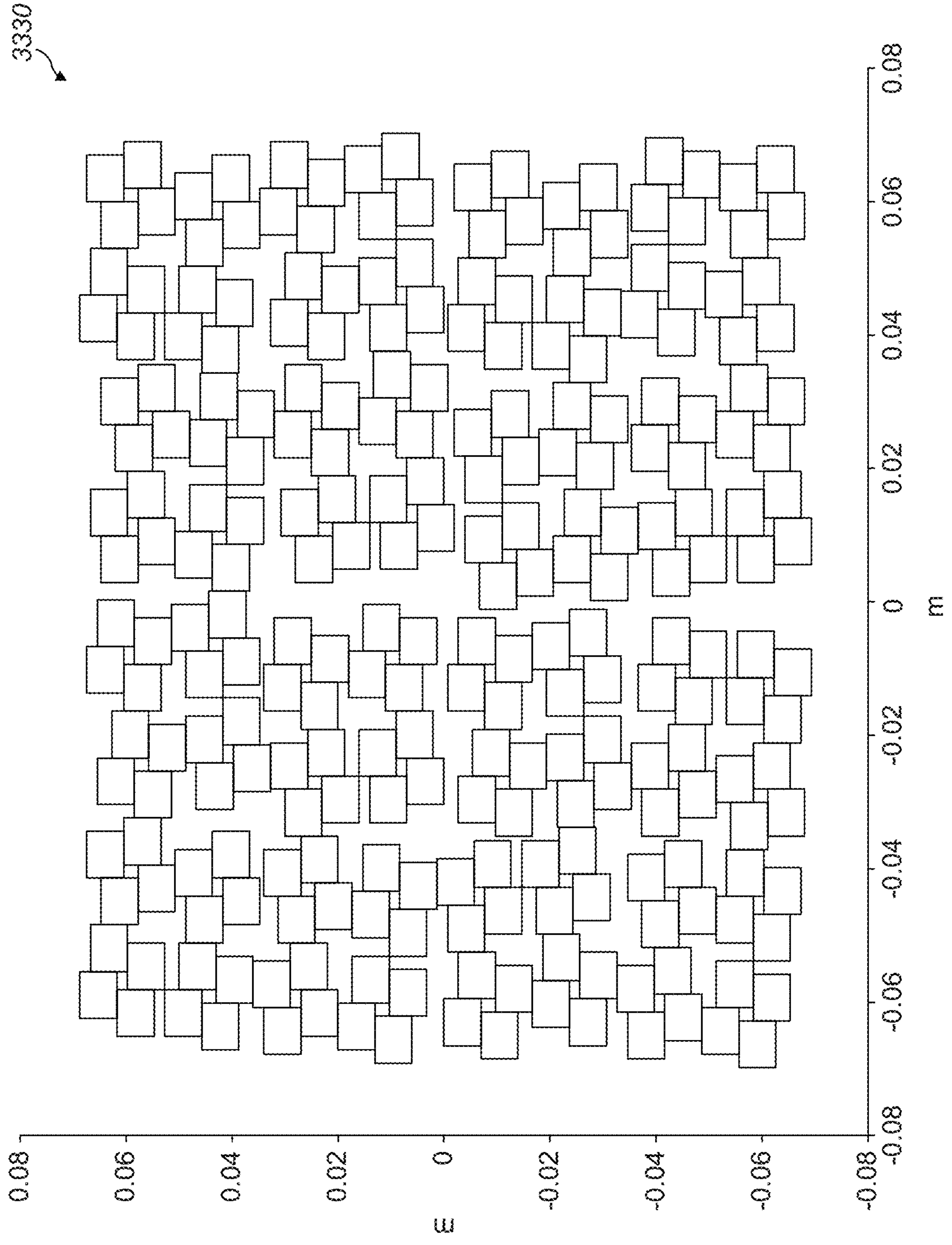
Figure 34A:
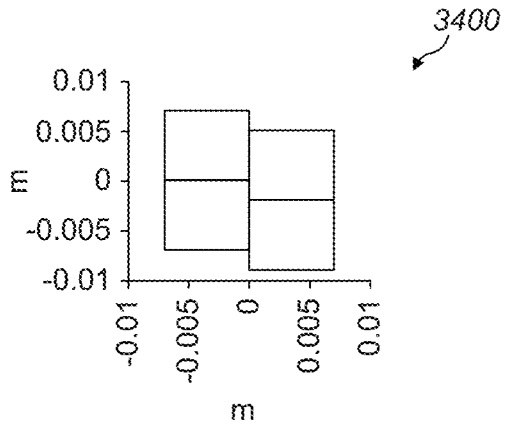
FIGS. 34A, 34B, 34C, and 34D show an example element array of square transducers constructed using rotation and mirroring.
Figure 34B:
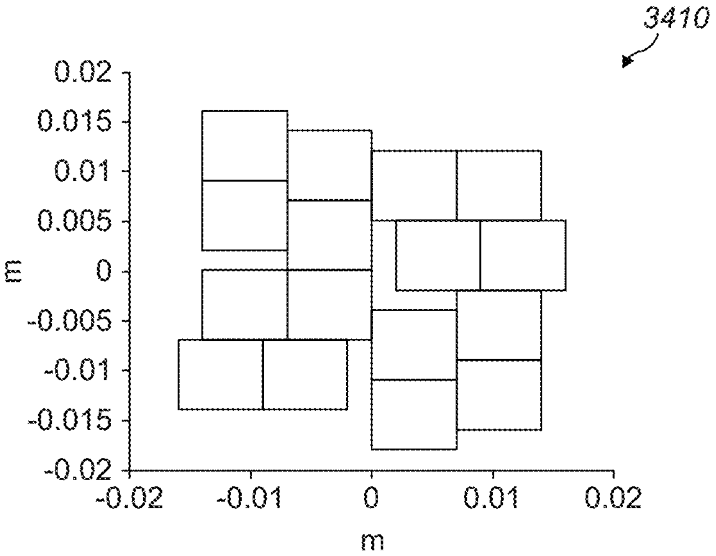
Figure 34C:
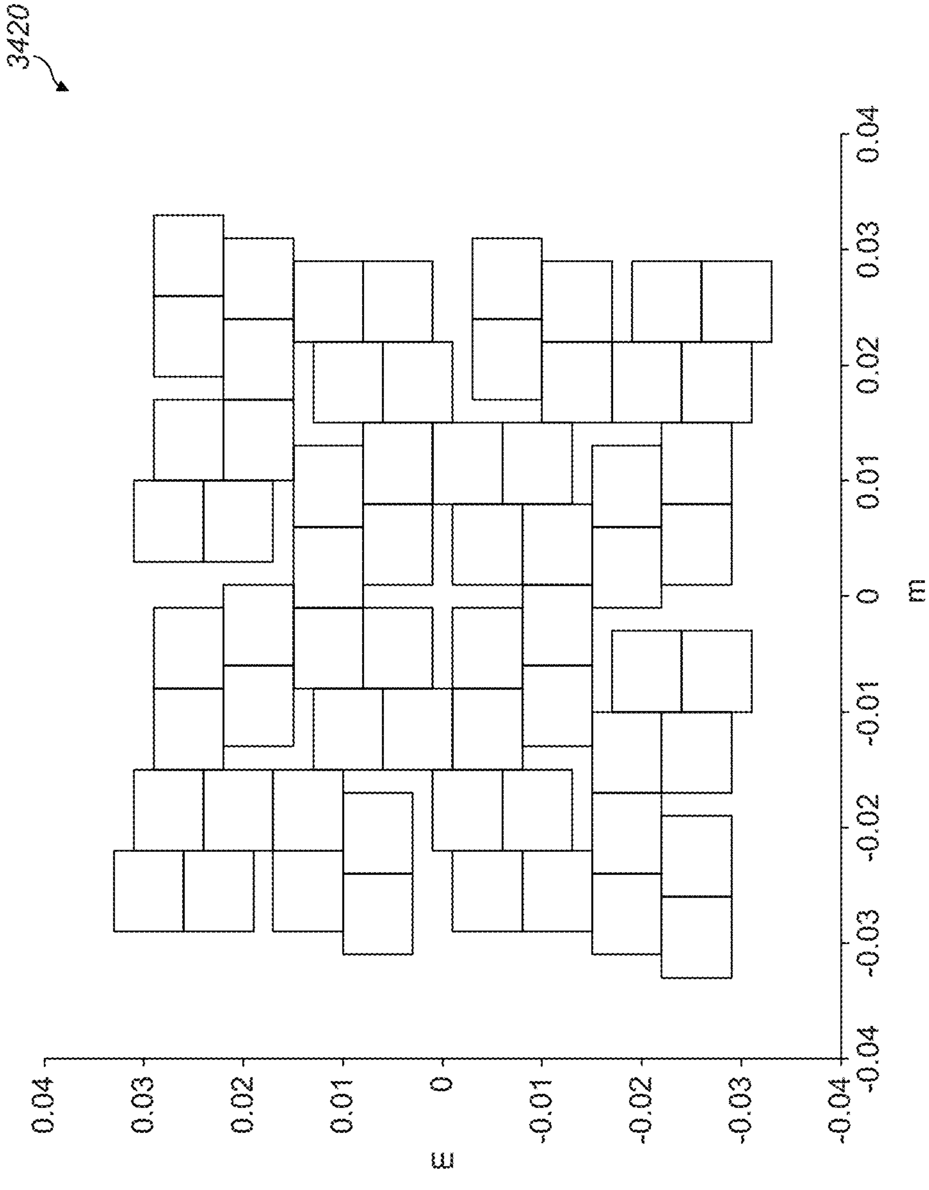
Figure 34D:
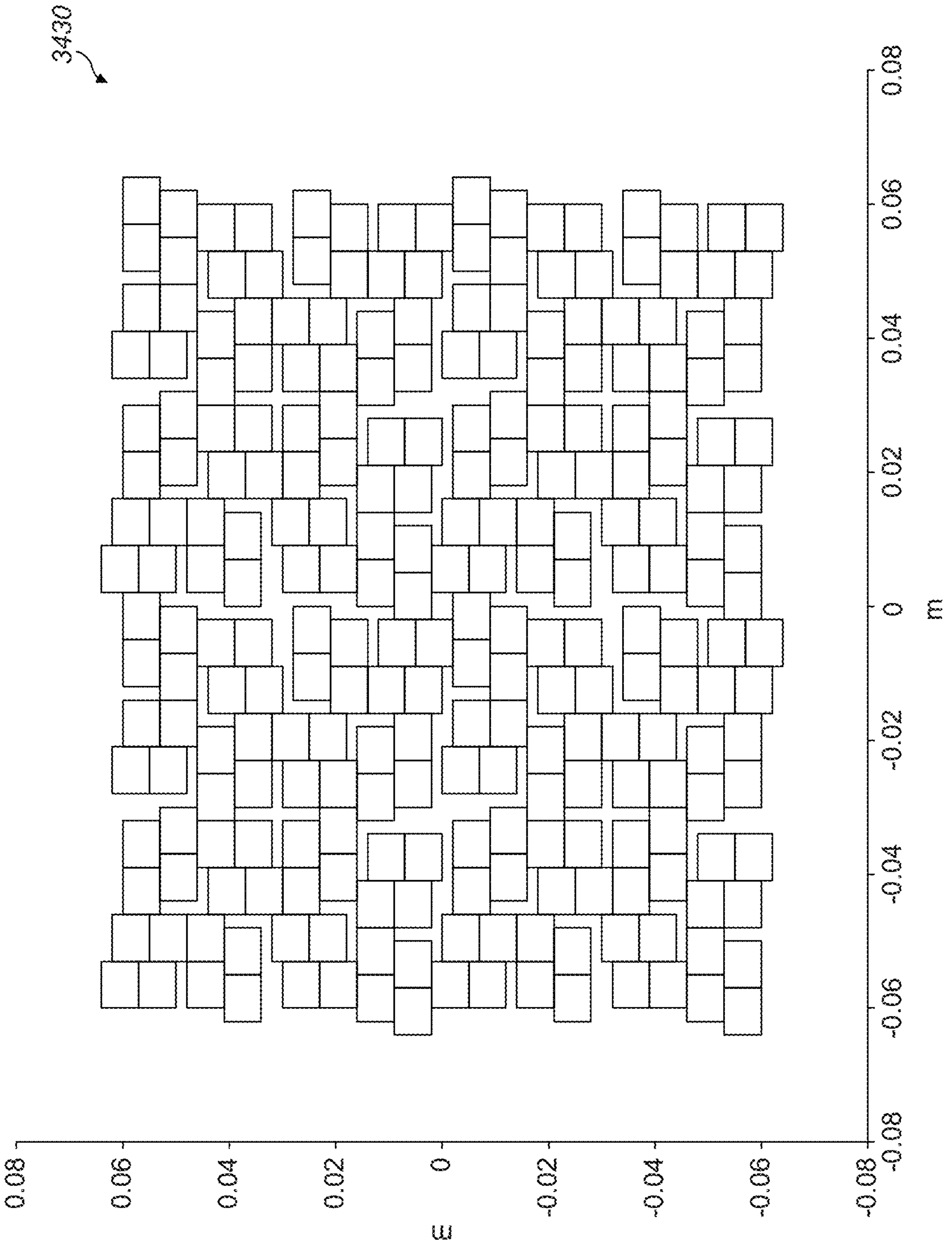

Shown in FIG. 31 is a simulation 3100 that illustrates some variation possibilities provided by rotation 3110 or mirroring 3120 or both 3130. This can provide more randomness into the arrangement to increase performance at a given packing density. This shows variation on simple offset tiling. As each tile is duplicated it can be mirrored or rotated. Like the offset values, these techniques can be recursively repeated to larger and larger arrays.

Determining which arrangements are most effective must be done through simulation. This can be as computationally sophisticated as a full non-linear finite-element approach or as simple as a linear Huygens model. As an example, array activation coefficients can be calculated so that a focus is steered to [x,y,z]=[40 mm, 0,200 mm], and a Huygens model calculates the field to some large extent in that plane. If the array is less dense than critical-spacing, a grating lobe secondary focus will appear somewhere in that plane. If the array arrangement is effective, this focus will be distributed in space and the peak secondary pressure (not the focus) will be low compared to the focus. The contrast between the focus pressure and the peak secondary pressure forms a metric for comparison of different arrangements. One can search through a large number of skew values with and without rotation or mirroring and pick the best performer for a given packing density.

FIGS. 32-34 illustrate a few examples of pseudo-random arrangements which effectively distribute grating lobe energy and prevent secondary foci using 7 mm square transducers operating at 61 kHz.

FIGS. 32A, 32B, 32C, and 32D show an example 256 element array of 7 mm square transducers constructed using rotation 3200 3210 3220 3230. In this example [a,b,c,d]=[1.6 mm, 1.3 mm, 1.1 mm, 0.7 mm] for each round of recursion.

FIGS. 33A, 33B, 33C, and 33D show an example 256 element array of 7 mm square transducers constructed using rotation and mirroring 3300 3310 3320 3330. In this example [a,b,c,d]=[1.6 mm, 1.3 mm, 1.1 mm, 0.7 mm] for each round of recursion just as FIG. 17 but with improved results.

FIGS. 34A, 34B, 34C, and 34D show an example 256 element array of 7 mm square transducers constructed using rotation and mirroring 3400 3410 3420 3430. In this example [a,b,c,d]=[0, 1.9 mm, 0,0] for the first two rounds of recursion then no added offsets and only rotation for the last two.

One advantage of this technique compared to a phyllotactic spiral arrangement is that the array can be built in tiles. Each recursive arrangement step which quadruples the array size uses the previous unit cell as its basis—only rotating, mirroring, and skewing the arrangement as its placed into a new square. As a result, this unit cell (and its mirror, if used) can be manufactured as a unit and assembled into the larger array.

While this technique generates square arrays, when a satisfactory square arrangement is found, it can be sectioned to non-square sub-arrays which will be nearly as effective at spreading out grating lobe foci as the original square arrangement. These non-square arrangements can be used together to make larger non-square shapes. Only when the number of sub-units starts is comparable to the number of transducers within each sub-unit does the possibility of grating lob problems resurfacing become an issue.

The key advantage of the invention presented here is that the search space for effective solutions is far reduced compared to random, arbitrary placement. The parameters which can vary in this system are the offsets for each round of recursion and the decision to mirror, rotate, or both. This allows for a tightly bounded search space and reduces the computation required to a manageable subset.

Figure 35:
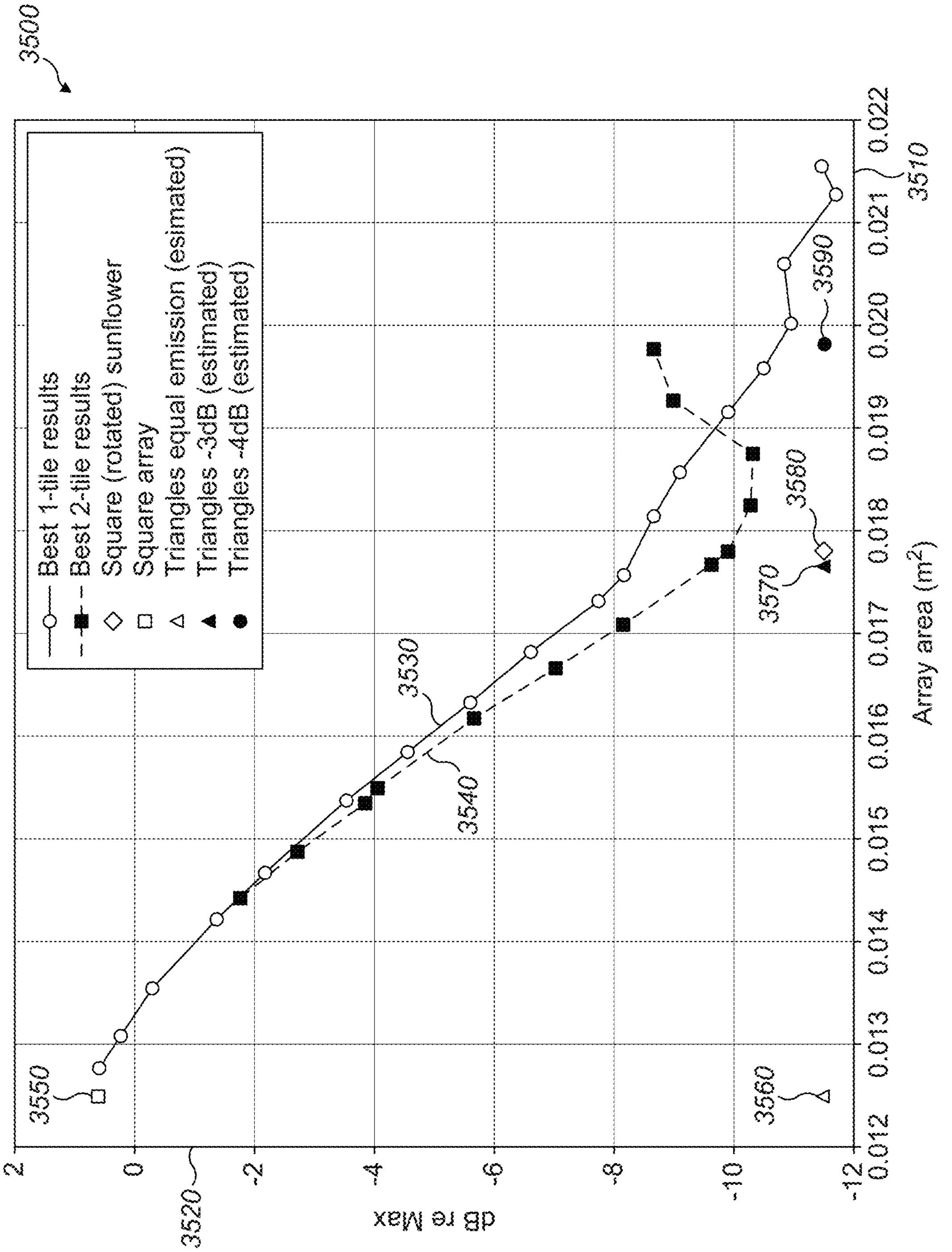
FIG. 35 shows is a graph showing the simulated recursive offset arrays using square transducers.

FIG. 35 is a graph 3500 showing the best simulated recursive offset arrays using 256, 7 mm square transducers at 61 kHz. The y-axis 3520 is the difference between the focus pressure and peak grating lobe pressure. The x-axis 3510 shows the total area of each array. The 'best 1-tile results' line 3530 shows that through only rotation (as mirroring would require a 'second-tile' to be manufactured) solutions can be found whose performance ranges from closely-packed rectilinear to phyllotactic spiral-performance, albeit with lower density. The 'best 2-tile results' line 3540 shows that by adding mirroring, solutions within 1.5 dB of phyllotactic-spiral performance can be achieved at similar packing density, without the necessity of singulation or rotating individual elements. In addition, if space is limited for the array, for a given area an effective solution is generated which distributes grating lobe energy.

Other points included on the plot are closely-packed rectilinear (square array 3550), a phyllotactic spiral with rotated square elements (square rotated sunflower 3580), and estimates 3 triangle-element arrays 3560 (discussed elsewhere) with equal emission to the squares, as well as decreased emission at −3 dB 3570 and −4 dB 3590.

Additional disclosure includes: 1. An array comprising of many tiles comprising of a plurality of transducers wherein the physical transducer locations are perturbed through rigid transformations such that the new footprint of each element intersects the footprint before the transformation is applied, wherein the original footprint of each comprises a uniform layout of acoustic transducers.

2. The array of ¶1, wherein the transducers comprise acoustic transducers.
3. The array of ¶5, wherein the transducers comprise an array of antennae for beamforming electromagnetic signals.
4. The array of ¶1, wherein the physical tile locations are perturbed through rigid transformations, wherein the new footprint of each tile intersects the footprint before the transformation is applied.
5. The array of ¶1, wherein the transformations are applied recursively to smaller tile arrangements that make up larger tile arrangements.
6. The array of ¶1, wherein a single tile is replicated to produce a plurality of tiles, which are then arranged using rigid transformations to produce an array.
7. The array of ¶1, wherein the transformed arrangement reduces grating lobe intensity.

IV. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An array of triangular transducers, wherein the locations of physical features can be described by barycentric coordinates applied to a triangle with sides forming the ratio 1:2:√5.

2. The array of claim 1, wherein the array of triangular transducers comprise acoustic transducers.

3. The array of claim 1, wherein the array of triangular transducers comprise an array of antennae for beamforming electromagnetic signals.

4. The array of claim 1, wherein the array of triangles whose sides form the ratio 1:2:√5 to which the barycentric coordinates are applied to yield feature locations are themselves subdivisions of other triangles whose sides form the ratio 1:2:√5.

5. An array comprising:

at least one tile of transducers, wherein each of the at least one tile of transducers comprises a plurality of square transducers in a partial phyllotactic spiral pattern;

wherein two opposite corners of a transducer and a point in space common to an acoustic transducer elements on the at least one of the tile of transducers are collinear.

6. The array of claim 5, wherein the at least one tile of transducers comprise acoustic transducers.

7. The array of claim 5, wherein at least one tile of the transducers comprise an array of antennae for beamforming electromagnetic signals.

8. The array of claim 5, wherein the common point in space collinear to opposite corners of each transducer does not lie on at least one tile of transducer elements.

9. A device comprising:

at least one asymmetric acoustic transducer;

wherein a field generated at a plurality of frequencies from a plurality of stable asymmetric resonant modes is used to localize a transducer detecting the field at the plurality of frequencies.

10. The device of claim 9, wherein the at least one asymmetric acoustic transducer comprises an array of antennae for beamforming electromagnetic signals.

11. The device of claim 9, wherein the at least one transducer is of a triangular shape;

and wherein locations of physical features can be described by barycentric coordinates applied to a triangle with sides forming the ratio 1:2:√5.

12. The device of claim 9, wherein the at least one transducer detecting the field is also an asymmetric transducer with a plurality of stable asymmetric resonant modes which are capable of detecting the field at a plurality of frequencies.

13. The device of claim 9, wherein the acoustic field detected using a plurality of stable asymmetric resonant modes at a plurality of resonant frequencies of the detector may be any arbitrary acoustic field.

14. An array comprising:

a plurality of tiles comprising of a plurality of transducers;

wherein physical transducer locations are perturbed through rigid transformations such that a new footprint of each element intersects the footprint before the transformation is applied, wherein the original footprint of each element comprises a uniform layout of acoustic transducers.

15. The array of claim 14, wherein the transducers comprise acoustic transducers.

16. The array of claim 14, wherein the transducers comprise an array of antennae for beamforming electromagnetic signals.

17. The array of claim 14, wherein the physical tile locations are perturbed through rigid transformations, wherein the new footprint of each tile intersects the footprint before the transformation is applied.

18. The array of claim 14, wherein the transformations are applied recursively to smaller tile arrangements that make up larger tile arrangements.

19. The array of claim 14, wherein a single tile is replicated to produce a plurality of tiles, which are then arranged using rigid transformations to produce an array.

20. The array of claim 14, wherein the transformed arrangement reduces grating lobe intensity.

* * * * *